US012220381B2

(12) United States Patent
Lafauci et al.

(10) Patent No.: US 12,220,381 B2
(45) Date of Patent: Feb. 11, 2025

(54) DRUG SECURITY SYSTEMS AND METHODS

(71) Applicant: MIDAS Healthcare Solutions, Inc., Center Moriches, NY (US)

(72) Inventors: Michael A. Lafauci, Center Moriches, NY (US); Jeffrey R. Wahl, Beachwood, OH (US); Andrew M. Brown, Hackensack, NJ (US); Jonathan Pinsky, Bedford, NY (US)

(73) Assignee: MIDAS Healthcare Solutions, Inc., Center Moriches, NY (US)

( * ) Notice: Subject to any disclaimer, the term of this patent is extended or adjusted under 35 U.S.C. 154(b) by 536 days.

(21) Appl. No.: 17/509,691

(22) Filed: Oct. 25, 2021

(65) Prior Publication Data

US 2022/0142862 A1 May 12, 2022

Related U.S. Application Data

(63) Continuation of application No. PCT/US2020/029588, filed on Apr. 23, 2020.

(Continued)

(51) Int. Cl.

| | |
|---|---|
| ***A61J 1/14*** | (2023.01) |
| ***A61J 1/16*** | (2023.01) |
| ***A61J 1/20*** | (2006.01) |

(52) U.S. Cl.

CPC ........... *A61J 1/1437* (2013.01); *A61J 1/1406* (2013.01); *A61J 1/16* (2013.01); *A61J 1/201* (2015.05); *A61J 1/2096* (2013.01); *A61J 2205/10* (2013.01)

(58) Field of Classification Search

CPC .......... A61J 1/1437; A61J 1/1406; A61J 1/16; A61J 1/201; A61J 1/2096; A61J 2205/10;

(Continued)

(56) References Cited

U.S. PATENT DOCUMENTS

| | | | |
|---|---|---|---|
| 3,711,683 | A | 1/1973 | Hamisch |
| 5,230,429 | A | 7/1993 | Etheredge, III |

(Continued)

FOREIGN PATENT DOCUMENTS

| | | | |
|---|---|---|---|
| DE | 19807232 | C1 | 7/1999 |
| DE | 102013011238 | A1 | 1/2015 |

(Continued)

OTHER PUBLICATIONS

EP20795518.8 Extended European Search Report dated Nov. 30, 2022.

(Continued)

*Primary Examiner* — Susan S Su
*Assistant Examiner* — Erin A Kim
(74) *Attorney, Agent, or Firm* — Wilson Sonsini Goodrich & Rosati

(57) ABSTRACT

The present disclosure provides an injectable medication security device. The device may comprise a recess on a first portion of the device. The recess may be configured to receive and couple to a neck portion of a vial containing the injectable medication. The device may comprise an opening on a second portion of the device, to permit access to a penetrable cover of the vial. The device may comprise at least one aperture configured to control access to the opening. The device may comprise a depressible switch. The depressible switch may be configured to cause the at least one aperture to open and provide access to the opening when the depressible switch is depressed, thereby permitting the medication to be drawn from the vial. The depressible switch may be configured to cause the at least one aperture to lock and close the opening when the depressible switch is released.

18 Claims, 46 Drawing Sheets

Related U.S. Application Data

(60) Provisional application No. 62/873,617, filed on Jul. 12, 2019, provisional application No. 62/839,361, filed on Apr. 26, 2019.

(58) Field of Classification Search
CPC . A61J 2205/30; A61J 2205/20; A61J 2205/00
See application file for complete search history.

(56) References Cited

U.S. PATENT DOCUMENTS

| | | | | |
|---|---|---|---|---|
| 5,384,947 | A | 1/1995 | Kildal et al. | |
| 5,852,590 | A * | 12/1998 | de la Huerga ... | G06K 19/07762 368/10 |
| 6,259,654 | B1 * | 7/2001 | de la Huerga ........ | A61J 7/0481 368/10 |
| 8,251,290 | B1 | 8/2012 | Bushman et al. | |
| 10,628,647 | B1 | 4/2020 | Rossier et al. | |
| 2005/0285377 | A1 | 12/2005 | Meyendorff et al. | |
| 2007/0145140 | A1 | 6/2007 | Yoshimura et al. | |
| 2011/0186623 | A1 | 8/2011 | Truesdale | |
| 2012/0046635 | A1 * | 2/2012 | Hedgepeth ............ | A61J 1/1425 604/414 |
| 2013/0031623 | A1 | 1/2013 | Sanders | |
| 2013/0126601 | A1 | 5/2013 | Lee | |
| 2013/0312373 | A1 | 11/2013 | Bogle et al. | |
| 2014/0196136 | A1 | 7/2014 | Hill et al. | |
| 2014/0284382 | A1 | 9/2014 | Park | |
| 2015/0105745 | A1 * | 4/2015 | Banik ................... | A61J 1/1412 604/414 |
| 2015/0224028 | A1 * | 8/2015 | Carrel ....................... | A61J 1/22 604/407 |
| 2015/0367230 | A1 | 12/2015 | Bradford et al. | |
| 2017/0046548 | A1 | 2/2017 | Kamijo et al. | |
| 2017/0068785 | A1 | 3/2017 | Experton et al. | |
| 2017/0189270 | A1 | 7/2017 | Nazzaro et al. | |
| 2017/0287184 | A1 | 10/2017 | Pettersson | |
| 2017/0351909 | A1 | 12/2017 | Kaehler | |
| 2019/0262230 | A1 * | 8/2019 | Bentkovski ........... | A61J 1/1418 |
| 2022/0215216 | A1 | 7/2022 | Wahl et al. | |

FOREIGN PATENT DOCUMENTS

| | | | |
|---|---|---|---|
| EP | 0275578 | A1 | 7/1988 |
| EP | 2913086 | A2 | 9/2015 |
| EP | 3410340 | A1 | 12/2018 |
| JP | 2009183390 | A | 8/2009 |
| WO | WO-2020172471 | A1 | 8/2020 |
| WO | WO-2020206154 | A1 | 10/2020 |
| WO | WO-2020219724 | A1 | 10/2020 |

OTHER PUBLICATIONS

International Search Report and Written Opinion for PCT Application No. PCT/US2020/029588 issued Jul. 14, 2020.
EP20759289.0 Extended European Search Report dated Sep. 29, 2022.
PCT/US2020/019122 International Search Report and Written Opinion dated Jul. 16, 2020.
Ruth et al. Secure Multi-User Content Sharing for Augmented Reality Applications. Proceedings of the 28th USENIX Security Symposium, pp. 141-158, Santa Clara, CA, USA (Aug. 14-16, 2019). Available at URL: https://www.usenix.org/system/files/sec19-ruth.pdf.
U.S. Appl. No. 17/407,601 Office Action dated Aug. 3, 2023.
Co-pending U.S. Appl. No. 18/768,622, inventors Wahl; Jeffrey R. et al., filed Jul. 10, 2024.
U.S. Appl. No. 17/407,601 Notice of Allowance dated Jun. 3, 2024.
Tarng, Wernhaur, et al., Development of a Virtual Butterfly Ecological System Based on Augmented Reality and Mobile Learning Technologies. Virtual Reality 19:253-266 (2015).
U.S. Appl. No. 17/407,601 Notice of Allowance dated Apr. 19, 2024.

* cited by examiner

DRUG SECURITY SYSTEMS AND METHODS

CROSS-REFERENCE

This application is a continuation of International Patent Application No. PCT/US20/29588, filed Apr. 23, 2020, which claims the benefit of U.S. Provisional Patent Application No. 62/839,361, filed Apr. 26, 2019, and U.S. Provisional Patent Application No. 62/873,617, filed Jul. 12, 2019, each of which is entirely incorporated herein by reference.

BACKGROUND

A plethora of drugs (e.g., controlled and/or non-controlled substances) are stored, transported, and/or discarded in a vial. A vial containing a drug (e.g., an injectable drug) can be sealed with a cover (e.g., a penetrable entry, such as a rubber stopper), through which a drug loading device (e.g., a syringe comprising a needle) may be inserted to withdraw a dose of the drug from the vial. Such cover may be protected by a lid (e.g., a cap) prior to use of the drug inside the vial. The cover may re-seal (e.g., by expansion of the cover's material) an entry created by the drug loading device to prevent leakage of any excess drug out of the vial. However, the drug loading device may be inserted through the cover again for a subsequent withdrawal of the drug. Thus, diversion of the drug from the vial (e.g., prior to, simultaneously, and/or subsequent to a prescribed withdrawal of the drug) for an illicit collection, sales, and/or use of the drug may be possible.

SUMMARY

The present disclosure describes systems and methods relating to a security system for a drug. Systems and methods of the present disclosure can be used to secure at least a portion of a vial containing an injectable drug (e.g., a drug suspend in a solution). In an example, a casing can be used to secure (e.g., seal) a cover of the vial. In another example, a casing can be used to secure (e.g., seal) the vial in its entirety. Such casing can comprise a reconstructable visual code that is divided into a plurality of portions and is readable by a reader. The casing can comprise a switch that, upon engagement, activates the plurality of portions of the visual code to be combined to form the visual code that is readable by the reader (e.g., to track usage of the drug). Additionally, the reconstructed visual code can seal the cover that serves as a penetrable entry of the vial, thereby to prevent illicit withdrawal of the drug from the vial. The present disclosure describes software and hardware configurations for using such injectable drug security system.

An aspect of the present disclosure provides an injectable medication security device, comprising: a recess provided on a first portion of the device, wherein the recess is configured to receive and couple to a neck portion of a vial containing the injectable medication; an opening provided on a second portion of the device, wherein the opening permits access to a penetrable cover located near the neck portion of the vial; at least one aperture located at the opening and configured to control access to the opening; and a depressible switch operatively coupled to the at least one aperture, wherein the depressible switch is configured to (1) cause the at least one aperture to open and provide access to the opening when the depressible switch is depressed, thereby permitting the medication to be drawn from the vial, and (2) cause the at least one aperture to lock and close the opening when the depressible switch is released, thereby preventing further access to any residual medication within the vial.

In some embodiments, the at least one aperture comprises a scannable visual code that is revealed when the depressible switch is released.

In some embodiments, the at least one aperture comprises a first aperture and a second aperture, wherein the first aperture is closed and the second aperture is open prior to administering of the medication to a patient; and wherein the depressible switch is configured to (1) cause the first aperture to open and provide access to the opening when the depressible switch is depressed, and (2) cause the second aperture to lock and close the opening when the depressible switch is released. In some embodiments, the second aperture comprises a scannable visual code. In some embodiments, the visual code is segmented into a plurality of partial codes. In some embodiments, the plurality of partial codes are disposed on a plurality of movable segments of the second aperture. In some embodiments, the plurality of partial codes are reconstructed to form a scannable visual code when the second aperture is closed.

In some embodiments, the injectable medication security device further comprises a cap removal device configured to remove a cap of the vial to permit access to the penetrable cover of the vial.

In some embodiments, the injectable medication security device further comprises a removable safety device configured to prevent movement of the depressible switch.

In some embodiments, the injectable medication security device further comprises a sensor configured to detect a frequency of insertion of a needle (1) through the penetrable cover or (2) into the vial.

Another aspect of the present disclosure provides a method of monitoring a use of a vial containing an injectable medication, comprising: (a) providing an injectable medication security device, comprising: a recess provided on a first portion of the device, wherein the recess is configured to receive and couple to a neck portion of the vial; an opening provided on a second portion of the device, wherein the opening permits access to a penetrable cover located near the neck portion of the vial; at least one aperture located at the opening and configured to control access to the opening; and a depressible switch operatively coupled to the at least one aperture, wherein the depressible switch is configured to (1) cause the at least one aperture to open and provide access to the opening when the depressible switch is depressed, thereby permitting the medication to be drawn from the vial, and (2) cause the at least one aperture to lock and close the opening when the depressible switch is released, thereby preventing further access to any residual medication within the vial; (b) coupling the recess of the injectable medication security device to the neck portion of the vial; (c) depressing the depressible switch to direct the at least one aperture to open; and (d) releasing the depressible switch to direct the at least one aperture to close.

In some embodiments, the at least one aperture comprises a scannable visual code that is revealed when the depressible switch is released, and wherein the method further comprises, subsequent to (d), scanning the scannable visual code.

In some embodiments, the at least one aperture comprises a first aperture and a second aperture, wherein the first aperture is closed and the second aperture is open prior to administering of the medication to a patient; and wherein the depressible switch is configured to (1) cause the first aperture to open and provide access to the opening when the depressible switch is depressed, and (2) cause the second aperture to lock and close the opening when the depressible switch is released. In some embodiments, the second aperture comprises a scannable visual code, and wherein the method further comprises, subsequent to (d), scanning the scannable visual code. In some embodiments, the visual code is segmented into a plurality of partial codes. In some embodiments, the plurality of partial codes are disposed on a plurality of movable segments of the second aperture. In some embodiments, the method further comprises reconstructing the plurality of partial codes into a scannable visual code.

In some embodiments, the method further comprises removing, with aid of a cap removal device, a cap of the vial to permit access to the penetrable cover of the vial.

In some embodiments, the method further comprises removing a removable safety device, wherein the removable safety device is configured to prevent movement of the depressible switch when coupled to the injectable medication security device.

In some embodiments, the method further comprises detecting, with aid of a sensor, a frequency of insertion of a needle (1) through the penetrable cover or (2) into the vial.

Another aspect of the present disclosure provides a drug security system, comprising: a drug vial and a security housing configured to contain the drug vial, wherein the drug vial contained in the security housing is accessible through an opening of the security housing; and a visual code provided on the security housing, which visual code is separated into a plurality of individual portions configured to transform between two or more states, wherein, (i) in a first state, the plurality of individual portions are spaced apart to form a non-functional visual code and to provide access through the opening of the security housing, and (ii) in a second state, the plurality of individual portions are moved relative to each other to form a functional visual code and to prevent access through the opening of the security housing, wherein the security housing (1) permits a needle of a syringe to be inserted through the opening to access the drug vial when the visual code is in the first state, and (2) prevents the access of the needle of the syringe to the drug vial through the opening when the visual code is in the second state.

In some embodiments, the security housing further comprises one or more switches configured to activate the transformation of the visual code (i) from the first state to the second state, and/or (ii) from the second state to the first state.

In some embodiments, the drug vial contained in the security housing is only accessible through the opening of the security housing.

In some embodiments, the drug vial is capable of holding an injectable drug.

In some embodiments, in the second state, the plurality of individual portions are (i) directly adjacent to each other, and/or (ii) overlapping over one another to form the functional visual code.

In some embodiments, each of the plurality of individual portions is disposed on one of a plurality of individual bases of the security housing. In some embodiments, at least one of the plurality of individual bases is movable.

In some embodiments, the visual code is operatively coupled to a visual scanning system, wherein the visual scanning system is configured to extract information from the functional visual code based, in part, on an image and/or a video of the functional visual code.

In some embodiments, the visual code can be used for tracking, accountability, security, authentication, and/or transaction of the security housing containing the drug vial.

Another aspect of the present disclosure provides a method of monitoring a use of a drug vial, comprising: (a) providing the drug vial and a security housing configured to contain the drug vial, wherein the security housing comprises a visual code; and (b) installing the drug vial in the security housing, wherein the drug vial contained in the security housing is accessible through an opening of the security housing, wherein the visual code is separated into a plurality of individual portions configured to transform between two or more states, wherein, (i) in a first state, the plurality of individual portions are spaced apart to form a non-functional visual code and to provide access through the opening of the security housing, and (ii) in a second state, the plurality of individual portions are moved relative to each other to form a functional visual code and to prevent access through the opening of the security housing, and wherein the security housing (1) permits a needle of a syringe to be inserted through the opening to access the drug vial when the visual code is in the first state, and (2) prevents the access of the needle of the syringe to the drug vial through the opening when the visual code is in the second state.

A different aspect of the present disclosure provides a method of monitoring a use of a drug vial, comprising: (a) providing a security housing containing the drug vial, wherein the drug vial contained in the security housing is accessible through an opening of the security housing; and (b) transforming a visual code of the security housing between a first state and a second state, wherein the visual code is separated into a plurality of individual portions configured to transform between two or more states, wherein, (i) in the first state, the plurality of individual portions are spaced apart to form a non-functional visual code and to provide access through the opening of the security housing, and (ii) in the second state, the plurality of individual portions are moved relative to each other to form a functional visual code and to prevent access through the opening of the security housing, and wherein the security housing (1) permits a needle of a syringe to be inserted through the opening to access the drug vial when the visual code is in the first state, and (2) prevents the access of the needle of the syringe to the drug vial through the opening when the visual code is in the second state.

In some embodiments of any one of the subject methods, the method further comprises engaging one or more switches of the security housing, wherein the one or more switches are configured to activate the transformation of the visual code (i) from the first state to the second state, and/or (ii) from the second state to the first state.

In some embodiments of any one of the subject methods, the drug vial contained in the security housing is only accessible through the opening of the security housing.

In some embodiments of any one of the subject methods, the drug vial is capable of holding an injectable drug.

In some embodiments of any one of the subject methods, in the second state, the plurality of individual portions are (i) directly adjacent to each other, and/or (ii) overlapping over one another to form the functional visual code.

In some embodiments of any one of the subject methods, each of the plurality of individual portions is disposed on one of a plurality of individual bases of the security housing. In some embodiments, the transforming comprises moving at least one of the plurality of individual bases.

In some embodiments of any one of the subject methods, the visual code is operatively coupled to a visual scanning system, configured to extract information from the functional visual code based, in part, on an image and/or a video of the functional visual code.

In some embodiments of any one of the subject methods, the visual code can be used for tracking, accountability, security, authentication, and/or transaction of the security housing containing the drug vial.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
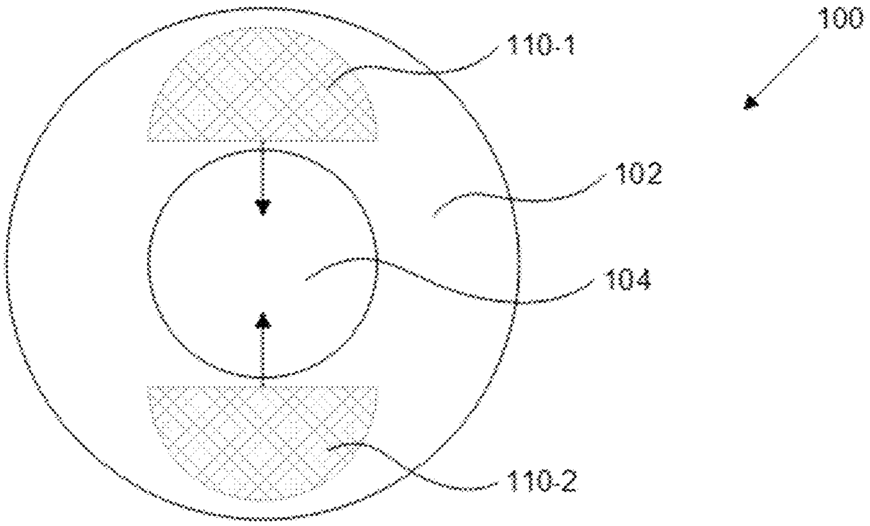
FIGS. 1A-1C schematically illustrate an example of a device comprising a reconstructable visual code with multiple segments.

The present disclosure describes systems and methods for a security system for a drug (e.g., an injectable drug security system). The systems and methods can provide mechanisms of storing or securing at least a portion of a drug vial in a casing, which casing can be utilized to control when the drug can be withdrawn from the vial and/or a number of such withdrawal from the vial. Additionally, subsequent to the withdrawal of the drug (e.g., a prescribed withdrawal of the drug), the casing can completely seal the vial, prevent any further withdrawal of the drug, and/or and activate a visual code (e.g., a reconstructable visual code). Application of such casing to the vial can be irreversible. The activated visual code of such injectable drug security system can be utilized to track identity of a medical practitioner (e.g., a nurse) responsible for the drug withdrawal and/or a time of such withdrawal from the vial. The systems and methods can provide configurations of the injectable drug security system.

Injectable Drug Security System

A. Introduction

The injectable drug security system (ISS) can be configured to enclose at least a portion of a vial containing drugs, thus to control access to the drugs inside the vial. The drugs can be injectable molecules (e.g., injectable to a subject, such as a human subject).

In some embodiments, the ISS can be applied to the vial such that the covering and the entire vial (e.g., including the drug reservoir) is contained within the ISS. In some cases, the lid that protects the covering can be contained within the ISS. In other cases, the lid may not or need not be contained within the ISS (e.g., the lid may be removed by a medical practitioner prior to the application of the ISS to the vial).

In some embodiments, the ISS can enclose the covering of the vial, but not the entirety of the vial. The lid that protects the covering can be removed (e.g., manually by a medical practitioner) prior to the application of the ISS to at least the covering of the vial. The ISS can be used to control access to the covering, and thus control access to the drug inside the vial.

In some embodiments, the ISS can be applied to the vial to enclose a covering (e.g., a penetrable entry, such as a rubber stopper) of the vial and a lid (e.g., a cap) that protects the covering, but not the entirety of the vial. Subsequent to the application, the ISS can be configured to move (e.g., mechanically remove) at least a portion of the lid (e.g., remove the lid partially or completely) relative to the covering, to control access to the covering, and thus controlling access to the drug inside the vial. In an example, the ISS can comprise one or more actuating elements (e.g., motors, gears, etc.), as provided herein, configured to move the at least the portion of the lid relatively away from the covering. The ISS can comprise a switch that is operatively coupled to the actuating element(s). Activating the switch (e.g., manually by a healthcare provider) can direct the removal of the at least the portion of the lid from the vial.

The ISS can comprise a casing that is configured to enclose at least a portion of a vial containing the injectable drug (e.g., a solution of the drug). The casing can be manufactured with the vial. Alternatively or in addition to, the casing and the vial can be manufactured separately and combined at a later time point (e.g., by a medical practitioner). The casing can have an opening. The opening can allow access to at least a portion of the vial (e.g., the lid and/or the covering of the vial). The casing can comprise a separate cover (e.g., a lid) that may be removable to expose the opening. Removal of the cover from the casing can be reversible. Alternatively, removal of the cover form the casing can be irreversible.

The drug, as provided herein, can be one or more members from the group comprising small molecules (e.g., drugs and/or imaging agents), lipids, nucleic acids (e.g., ribonucleic acids, deoxyribonucleic acids, synthetic nucleic acids, etc.), polynucleotides, amino acids (e.g., natural or synthetic), peptides, proteins (e.g., enzymes, antibodies), variations thereof, or combinations thereof. In some cases, the imaging agents may comprise magnetic contrast agents (e.g., gadolinium, iron oxide, iron platinum, manganese, etc.), radioactive contrast agents (e.g., 64Cu diacetyl-bis (N4-methylthiosemicarbazone), 18F-fluorodeoxyglucose (FDG), 18F-fluoride, 3'-deoxy-3'-[18F]fluorothymidine (FLT), 18F-fluoromisonidazole, gallium, Technetium-99m, thallium, etc.), and/or other contrast agents (e.g., iodine, barium-sulphate, gastrografin, etc.). In some cases, the imaging agents can comprise one or more fluorescent molecules (e.g., fluorescent dyes). The drugs can be costly. Alternatively, the drugs may not and need not be costly.

The drug (or medication), as provided herein, may or may not require prescription (e.g., by healthcare professionals) to obtain. In some examples, prescriptions are not needed for over-the-counter medications, such as, for example, Robitussin, Tylenol, and Sudafed. The medications, as provided here, may or may not be controlled. Examples of non-controlled substances include antibiotics, cholesterol medication, and Viagra.

Examples of controlled substances can comprise opiate and opioids, as well as central nervous system (CNS) depressants and stimulants. Examples of opioids can include morphine, codeine, thebaine, oripavine, morphine dipropionate, morphine dinicotinate, dihydrocodeine, buprenorphine, etorphine, hydrocodone, hydromorphone, oxycodone, oxymorphone, fentanyl, alpha-methylfentantyl, alfentanyl, trefantinil, brifentanil, remifentanil, octfentanil, sufentanil, carfentanyl, meperidine, prodine, promedol, propoxyphene, dextropropoxyphene, methadone, diphenoxylate, dezocine, pentazocine, phenazocine, butorphanol, nalbuphine, levorphanol, levomethorphan, tramadol, tapentadol, anileridine, any functional variant thereof, or any functional combinations thereof. Examples of CNS depressants and stimulants can include methylphenobarbital, pentobarbital, diazepam, clonazepam, chlordiazepoxide, alprazolam, triazolam, estazolam, any functional variant thereof, or any functional combinations thereof. Additional examples of the medications and the relevant therapeutic applications include scopolamine for motion sickness, nitroglycerin for angina, clonidine for hypertension, and estradiol for female hormone replacement therapy. Other examples of the drug include, but are not limited to, methylphenidate, selegiline, rivastigmine, rotigotine, granisteron, buprenorphine, oestrodiol, fentanyl, nicotine, testosterone, etc.

In some cases, the medications contained within the vial can be anesthetics, such as inhalation anesthetics (e.g., gases or vapors) and/or injectable anesthetics. Anesthetics can include GABAA receptor agonists, NMDA receptor antagonists, two-pore potassium channels ($K_{2P}$) activators, opioid receptor agonists, alpha2 adrenergic receptor agonists, and dopamine receptor antagonists. Examples of the inhalation anesthetics can include, but are not limited to, desflurane, isoflurane, sevoflurane, nitrous oxide, halothane, enflurane, and methoxyflurane. Examples of the injectable anesthetics can include, but are not limited to, propofol, etomidate, barbiturates (e.g., methohexital, thiopentone, thiopental, etc.), benzodiazepines (e.g., midazolam), ketamine, and dexmedetomidine.

The term "casing," as used herein, generally refers to an object that can be used to hold, transport, store, and/or control access to the vial. The casing can be a covering, top, lid, cap, top, cork, or plug. The casing may be a container, holder, box, receptacle, repository, tin, bin, can, canister, case, or vessel. At least a portion of the casing can be metallic, ceramic (e.g., glass), polymeric, or a combination thereof. At least a portion of the casing can be transparent, semi-transparent, or opaque. In some cases, at least a portion of the casing can be transparent or semi-transparent to allow visibility of the drug vial (e.g., a label or a visual code on a surface of the drug vial) through the casing.

In some cases, the ISS (e.g., the casing) can enclose at least 1%, 5%, 10%, 15%, 20%, 25%, 30%, 35%, 40%, 45%, 50%, 55%, 60%, 65%, 70%, 75%, 80%, 85%, 90%, 95%, or more of the vial containing the drugs. In some cases, the ISS (e.g., the casing) can enclose at most 100%, 95%, 90%, 85%, 80%, 75%, 70%, 65%, 60%, 55%, 50%, 45%, 40%, 35%, 30%, 25%, 20%, 15%, 10%, 5%, 1%, or less of the vial containing the drugs. In some cases, the ISS can enclose at least 1%, 5%, 10%, 15%, 20%, 25%, 30%, 35%, 40%, 45%, 50%, 55%, 60%, 65%, 70%, 75%, 80%, 85%, 90%, 95%, or more of the drug contained within the vial. In some cases, the ISS can enclose at most 100%, 95%, 90%, 85%, 80%, 75%, 70%, 65%, 60%, 55%, 50%, 45%, 40%, 35%, 30%, 25%, 20%, 15%, 10%, 5%, 1%, or less of the drug contained within the vial. In an example, the covering of the vial (e.g., a rubber stopper) may be plugged into a neck of the vial, and the ISS can enclose at least the neck of the vial. In another example, the ISS can enclose the vial in its entirety, such that even when the vial is broken, all contents of the vial can be contained within the ISS.

In some cases, the casing can hold, transport, store, and/or control access to at least 1, 2, 3, 4, 5, or more drug vials. In some cases, the casing can hold, transport, store, and/or control access to at most 5, 4, 3, 2, or 1 drug vial. The vial(s) may be fixed in the casing. The vial(s) may not be movable within the casing. In some cases, loading of the vial(s) into the casing may or may not be permanent.

The terms "container," "vial," and "drug vial," as used interchangeably herein, generally refer to any container typically used in healthcare to contain a drug (e.g., a liquid medication). At least a portion of the vial can be metallic, ceramic (e.g., glass), polymeric, or a combination thereof. The drug may be prescribed to be delivered to a subject (e.g., a patient) for one or more medical uses. The drug may be prescribed to be delivered to the subject through a drug loading device (e.g., a syringe comprising a needle). At least a portion of the vial may be sterile. In some cases, the container may be used to hold an object of interest that is not a drug. In some examples, the container may be used to hold an object of interest that requires security and authentication (or identification) during transaction, transfer, or handling of the object. The object of interest may be related to healthcare. Examples of such object of interest may include, but are not limited to, a biopsy, blood sample, fecal and/or urine sample, bodily hair (e.g., for genetic testing), donated organs, electronic devices, medical documents (e.g., X-ray or MRI scans), etc.

The vial can contain an access port capable of allowing direct access for the drug loading device to extract the drug for the one or more medical sues. The term "access port," as used herein, can refer to a portion of the vial containing a material allowing a needle of a drug loading device (e.g., a syringe) to push through for drug extraction and remain intact following needle piercing and medication extraction. The access port can be a cover or a stopper (e.g. a rubber stopper) of the vial. In some cases, upon (i) insertion of a portion (e.g., a needle) of the drug loading device through the cover of the vial and (ii) retraction of the portion of the drug loading device from the cover, a material of the cover (e.g., a rubber material) may expand to re-seal any entry (e.g., a hole) created by the portion of the drug loading device. Such re-sealing of the cover may prevent leakage of any excess drug out of the vial.

The drug loading device may be tube with a nozzle and a piston for sucking in and ejecting a fluid (e.g., a liquid). The drug loading device may be a syringe. The syringe may or may not comprise a needle to draw the drug from the drug vial. In some cases, the syringe may have a needle that creates a fluid communication between the syringe and the drug vial. In some cases, the syringe may not have a needle but may be configured to dock at a portion of the drug loading device (e.g., via a screw mechanism), thereby to create a fluid communication with the drug vial to draw the drug from the drug vial.

The vial can include about a single dose of the drug (e.g., the liquid medication). The term "dose, as used herein, can refer to an amount of the drug prescribed to be administered to the subject at one treatment. The one treatment may comprise a single injection at a single site. The one treatment may comprise multiple injections at the single site and/or multiple sites (e.g., 2, 3, 4, 5, or more sites). The vial may include at least about 1, 2, 3, 4, 5, or more doses of the drug. The vial may include at most about 5, 4, 3, 2, or 1 dose of the drug. The vial may be a single-dose drug vial. The vial may be a multi-dose drug vial.

B. Identifier and Sensor

The ISS can comprise an identifier (e.g., a machine readable code (MRC) or an identification device) to identify the ISS. The identifier may or may not be visible on an outer surface of the ISS. In some cases, the identifier may be used for drug and/or drug vial tracking, personal linking (e.g., recording identification of practitioner(s) responsible for extraction the drug from the drug vial and administration of the drug to the patient), patient linking, device tracking, pharmacy tracking (e.g., distributing the drug vial, receiving the ISS containing the drug vial, and/or destroying the ISS containing the drug vial), etc. In some cases, the identifier can be specific to each individual ISS. The MRC may be a barcode (e.g., a linear barcode, a matrix barcode, etc.). The identification device may be a communications device, such as a radio frequency device (e.g., a radio-frequency identification (RFID) system, a near-field communication (NFC) system, improvements thereof, etc.), Wi-Fi, or other internal integrated circuits. The identification device of the ISS may be an electronic chip. In some cases, the identifier may be scanned, recorded, and tracked by a system (e.g., electronic medication administration record (eMAR)). In some cases, the system may be in operative communication with an automated dispensing machine (ADM) (commercially available ADM include, for example the McLaughlin dispensing system, the Baxter ATC-212 dispensing system, and the Pyxis MedStation). Such identifier of the ISS may be different from the reconstructable visual code and/or the deconstructable visual code of the ISS, as provided in the present disclosure.

The identifier of the ISS may be scanned by an identifier reader, such as a barcode reader, RFID reader, a NFC reader, a Wi-Fi radar, etc. In some cases, the identifier reader may be a device in digital communication with a machine (e.g., a computer with a processor) configured to read and identify the identifier. The machine may be in digital communication with the system (e.g., eMAR). In some cases, the identifier reader may be a personal device (e.g., a smart phone with a camera) and/or a device at an institution (e.g., a hospital, pharmacy, etc.) in digital communication with the machine.

The drug vial can comprise an identifier. One or more features or embodiments of the identifier of the ISS provided herein may be utilized to generate any of the embodiments of the identifier of the drug vial provided elsewhere in the present disclosure. In some cases, once a drug vial is inserted, installed, secured, and/or sealed inside the ISS, the identifier (e.g., the identification device, such as the RFID system) of the ISS and the identifier of the drug vial may initiate digital communication with each other. The digital communication may allow transfer of information stored in the identifier of the drug vial to a memory device (e.g., random access memory) of the ISS. Alternatively or in addition to, the digital communication may trigger tracking date, time, and/or geolocation of the engagement of the drug vial and the ISS to the memory device of the ISS. In another alternative, or addition, the digital communication may trigger tracking date, time, and/or geolocation of further uses of the ISS.

The ISS can comprise a sensor. The term "sensor," as used herein, can refer to a device or a system that provides a feedback (e.g., light absorption spectroscopy, image, video, etc.) indicative of the drug vial. The feedback can include retraction of the drug from the drug vial within the ISS, such as movement (e.g., insertion and/or retraction) of a drug loading device (e.g., a syringe) into the drug vial and/or an amount of the drug in the drug vial. The sensor may be operatively coupled to a memory device of the ISS to store such feedback while the ISS is in use. The sensor may detect (1) insertion of a drug loading device (e.g., a syringe) into the drug vial within the ISS and/or (2) withdrawal of the drug loading device out of the drug vial. In an example, the sensor may direct an electromagnetic radiation (e.g., visible, infrared, and/or ultraviolet light) and detect when a path of the electromagnetic radiation is disrupted by an object, e.g., a needle of the syringe. The ISS can comprise at least 1, 2, 3, 4, 5, or more sensors. The ISS can comprise at most 5, 4, 3, 2, or 1 sensor.

Examples of the sensor may comprise a detector, vision system, computer vision, machine vision, imager, camera, electromagnetic radiation sensor (e.g., IR sensor, color sensor, etc.), proximity sensor, densitometer (e.g., optical densitometer), profilometer, spectrometer, pyrometer, force sensor (e.g., piezo sensor for pressure, acceleration, temperature, strain, force), motion sensor, magnetic field sensor (e.g., microelectromechanical systems), electric field sensor, chemical sensor, mass spectrometer (e.g., ion trap, quatdrupole, time of flight, sector, Fourier-transform ion cyclotron resonance mass spectrometer, etc.), etc.

In an example, one or more light beams (e.g., one or more laser beams) may be directed towards a target material (e.g., drug in the drug vial), and Raman scattering from the target material may be detected by any of the subject sensor or detector disclosed herein. As the photons from the laser beam(s) interact with the target material, the energy from some of the photons may be partially absorbed and the remaining energy (from the non-absorbed photons) may be re-emitted by the target material as scattered light at a different frequency than the initial laser beam(s). The shift in frequency (or wavelength) between the scattered light and the original laser beam(s) may depend on the energy absorbed by the molecular bonds. The molecular bonds associated with Raman scattering may be non-polar. Thus, the Raman scattering detection may provide information about the carbon-carbon bonds along the backbone of organic raw contents in the target material. Alternatively or in addition to, near-infrared (NIR) detection may be used to analyze the target material. The NIR detection may be configured to analyze polar molecular bonds within the target material, and thus, in some cases, the NIR detection and Raman scattering detection may complement each other.

The electromagnetic radiation can comprise one or more wavelengths from the electromagnetic spectrum including, but not limited to x-rays (about 0.1 nanometers (nm) to about 10.0 nm; or about $10^{18}$ hertz (Hz) to about $10^{16}$ Hz), ultraviolet (UV) rays (about 10.0 nm to about 380 nm; or about $8\times10^{16}$ Hz to about $10^{15}$ Hz), visible light (about 380 nm to about 750 nm; or about $8\times10^{14}$ Hz to about $4\times10^{14}$ Hz), infrared light (about 750 nm to about 0.1 centimeters (cm); or about $4\times10^{14}$ Hz to about $5\times10^{11}$ Hz), and microwaves (about 0.1 cm to about 100 cm; or about $10^{8}$ Hz to about $5\times10^{11}$ Hz). Within the wavelength range of the UV rays, wavelengths of about 300 nm to about 380 nm may be referred to as "near" ultraviolet, wavelengths of about 200 nm to about 300 nm as "far" ultraviolet, and 10 about to about 200 nm as "extreme" ultraviolet. In some cases, within the wavelength range of the visible light, wavelengths of about 380 nm to about 490 nm may be referred to as "blue" light. The infrared light may comprise one or more ranges selected from the group consisting of: (i) near-infrared (NIR; from about 750 nm to about 1.4 micrometer (μm)), (ii) short-wavelength infrared (SWIR; from about 1.4 μm to about 3 μm), (iii) mid-wavelength infrared (MWIR; from about 3 μm to about 8 μm), (iv) long-wavelength infrared (LWIR; from about 8 μm to about 15 μm), and (v) far infrared (FIR; from about 15 μm to about 1,000 μm).

As described herein, the ISS can comprise a memory device (e.g., random access memory) that is operatively in communication with one or more components of the ISS (e.g., the identifier of the ISS, the identifier of the drug vial, the sensor, etc.). In some cases, the memory device can store data comprising the information collected from the identifier of the drug vial. In some cases, the memory device can store data comprising the measured and/or detected feedback by the sensor. Additionally, the communications device (e.g., RFID, NFC, Bluetooth, Wi-Fi, etc.) can transfer (e.g., wirelessly) the data stored in the memory device to an external device (e.g., a computer or a mobile device).

C. Visual Code

The ISS (e.g., the casing) can comprise a visual code. The visual code can be a non-segmented visual code. Alternatively, the visual code can be a segmented visual code comprising a plurality of parts, which parts can be removed relative to each other to form a functional visual code and/or hide the functional visual code. As such, the segmented visual code can be referred to as a reconstructable and/or deconstructable visual code. In some cases, a segmented visual code can be moved relatively apart from each other to create an opening, e.g., an opening to expose and allow access to the covering (e.g., a rubber stopper) of the drug vial. The segmented visual code can be moved relatively closer to each other to close such opening and prevent access to, for example, the covering of the drug vial.

In an example, the visual code can be (1) reconstructed when the segmented parts are moved closer to each other and (2) deconstructed when the segmented parts are moved away from each other.

In another example, the visual code can be (1) reconstructed when the segmented parts are moved away from each other and (2) deconstructed when the segmented parts are moved closer to each other.

Yet in a different example, the ISS can comprise two different visual codes, in which (1a) a first visual code can be reconstructed when the segmented parts are moved closer to each other, (1b) the first visual code can be deconstructed when the segmented parts are moved away from each other, (2a) a second visual code can be deconstructed when the segmented parts are moved closer to each other, and (2b) the second visual code can be reconstructed when the segmented parts are moved away from each other.

The reconstructable visual code may comprise a visual code that is readable by a visual code reader. The reconstructable visual code can be a visual code that is segmented to a plurality of individual segments of the visual code. The plurality of individual segments may be moved relative to each other (e.g., closer towards each other), and combined to from the visual code (e.g., a functional visual code). The reconstructable visual code may transform from a non-functional visual code into a functional visual code. The relative movement of the individual segments towards each other may close an opening (e.g., a hole), thereby preventing an object (e.g., a syringe) to pass through. The ISS can comprise at least about 1, 2, 3, 4, 5, or more reconstructable visual codes. The ISS can comprise at most about 5, 4, 3, 2, or 1 reconstructable visual code.

Alternatively or in addition to, the reconstructable visual code of the ISS can be a deconstructable visual code. In such a case, the plurality of individual segments of a functional visual code may be moved relative to each other (e.g., away from each other) and separated into individual segments of the visual code, thereby to transform from a functional visual code into a form a non-functional visual code. The relative movement of the individual segments away from each other may hide the individual segments from a view. The relative movement of the individual segments away from each other may create an opening (e.g., a hole) for an object (e.g., a syringe) to pass through. The ISS can comprise at least about 1, 2, 3, 4, 5, or more deconstructable visual codes. The ISS can comprise at most about 5, 4, 3, 2, or 1 deconstructable visual code.

In some cases, a reconstructable visual code can function as both reconstructable and deconstructable visual codes. In some cases, a reconstructable visual code may be configured to reconstruct from a non-functional visual code into a functional visual code. In some cases, a deconstructable visual code may be configured to deconstruct from a functional visual code to a non-functional visual code.

In some cases, the ISS can comprise a reconstructable visual code and a deconstructable visual code. The reconstructable visual code and the deconstructable visual code may be disposed adjacent to each other or stacked over each other. The deconstructable visual code may be deconstructed to create an opening that provides access to the drug vial inside the ISS. Scanning of the visual code of the deconstructable visual code may be required to activate such deconstruction. After usage (e.g., extraction of the drug from the drug vial), the reconstructable visual code may be reconstructed to seal the opening and prevent any further access to the drug vial inside the ISS. Scanning of the visual code of the reconstructable visual code may be required of the performer (e.g., the medical practitioner) for collection and/or tracking of the used drug vial.

The ISS can comprise one or more switches for controlling operation of one or more components of ISS or one or more devices operatively coupled to the ISS. In some cases, the one or more switches of the ISS can activate reconstruction of the reconstructable visual code and/or activate deconstruction of the deconstructable visual code. The one or more switches of the ISS may be in operative communication with the reconstructable visual code and/or the deconstructable visual code. Reconstruction of the reconstructable visual code and deconstruction of the deconstructable visual code may be activated by a same switch or different switches of the ISS. When activated by the same switch, the same switch may activate the reconstructable visual code and the deconstructable visual code simultaneously or sequentially (e.g., activate the deconstructable visual code first, then activate the reconstructable visual code, or vice versa). In some cases, engagement of a switch (e.g., pressing or clicking on the switch) may activate deconstruction of the deconstructable visual code, while disengagement of the switch (e.g., not pressing/clicking on the switch or releasing the switch) may activate reconstruction of the reconstructable visual code. In some cases, the engagement of the switch may comprise clicking the switch for at least 1, 2, 3, 4, 5, or more times. In some cases, the engagement of the switch may comprise clicking the switch for at most 5, 4, 3, 2, or 1 time. In some cases, the engagement of the switch may comprise clicking the switch for a plurality of times with a specific time interval. The specific time interval may be defined by a predetermined range of time intervals. In some cases, the engagement of the switch may comprise pressing on the switch for a specific duration of time. The specific duration of time may be defined by a predetermined range of the duration of time.

The term "switch," as used herein, can refer to any type of response-inducing device, such as, for example, mechanical and/or electrical switches. At least a portion of the switch may be disposed on an outer surface of the ISS to allow engagement of the switch by a user. The mechanical switch may be a device comprising a spring (e.g., a coil spring). Upon engagement, such spring may activate the reconstructable visual code and/or the deconstructable visual code. In an example, engagement of the spring may snap a piece (e.g., a string, bar, etc.) of the ISS that is mechanically coupled to the reconstructable visual code and/or the deconstructable visual code to activate one or both of them. Examples of electrical switches can include silicon controlled rectifier (SCR), insulated gate bipolar junction transistor (IGBT), bipolar junction transistor (BJT), field effect transistor (FET), junction field effect transistor (JFET), switching diode, electrical relay, reed relay, solid state relay, insulated gate field effect transistor (IGFET), DIAC, and TRIAC. Another example of the switch can include an electromechanical switch, such as, for example, a piezoelectric switch. The ISS can comprise at least 1, 2, 3, 4, 5, or more switches. The ISS can comprise at most 5, 4, 3, 2, or 1 switch. The ISS can comprise at least 2 switches that need to be in sync during engagement (e.g., pressed down at a same time).

In some cases, the switch for controlling operation of one or more components of ISS or one or more devices operatively coupled to the ISS may not be part of the ISS. In some cases, such switch may be provided as part of a remote controller. In some cases, the switch may be provided in a user interface (e.g., a graphical user interface, or "GUI") of a user device that is in digital communication with the ISS. Examples of the user device may include, but are not limited to, a computer, mobile device, smart watch, smart glasses, etc. In an example, a user may press a digital button on a GUI on the user's mobile device (e.g., within a mobile application) to activate and/or deactivate the ISS.

A switch of the ISS can comprise one or more units (e.g., buttons) operatively coupled to each other. In an example, a switch of the ISS can be a single unit. The single unit can be handled (e.g., to activate the reconstructable visual code and/or the deconstructable visual code) by a user's single hand (e.g., a single finger). In other examples, a switch of the ISS can comprise at least 2, 3, 4, or more units. The switch of the ISS can comprise at most 4, 3, or 2 units. The plurality of units of the switch can be handled (e.g., to activate the reconstructable visual code and/or the deconstructable visual code) by a user's single hand or both hands.

The term "visual code," as used herein, can refer to optical, machine-readable, representation (e.g., marking) of data, where the data usually describes something about the article(s) carrying the visual code. In some cases, the article(s) may comprise one or more devices. The visual code can comprise one or more graphical visual elements (e.g., one or more pictorial and/or textual datagrams), including, but are not limited to, one-dimensional (1D) visual codes representing the data by varying the width or spacing of parallel lines, two-dimensional (2D) visual codes which represents the data as a geometrical pattern, such as Quick Response (QR) codes, and/or three-dimensional (3D) visual codes. In some cases, the 3D visual codes may be a layer comprising a plurality of 1D and/or 2D visual codes, or a plurality of 1D and/or 2D visual codes that are at different depths with respective to one another. The visual code may or may not be visible by the naked eye.

In some cases, the visual code can be read by a visual scanning system (e.g., a sensor), such that the visual scanning system can extract information (e.g., information about the article(s) carrying the visual code) stored in the visual code. In some cases, the visual code can be read by the visual scanning system, such that the visual scanning system can be operatively connected to an external database that contains such information. In some cases, the visual code can be read by a user.

The visual code can comprise a linear (1D) visual code. The linear visual code can be static and/or dynamic (e.g., static and dynamic at different time points). The linear visual code can comprise one or more lines (e.g., one or more static lines) that create a unique linear pattern. The line(s) that create the unique linear pattern may be of a common color (i.e., monochromatic) or different colors (i.e., multichromatic). In an example, the linear visual code may be a black and white (B&W) pattern. In another example, the linear visual code may be a multichromatic colored pattern. In a different example, the linear pattern may be a multichromatic infrared pattern, wherein different portions of the linear pattern are configured to emit different temperatures that emit different infrared radiations that can be read by an infrared sensor. Alternatively or in addition to, the color of the line(s) may change over time (i.e., metachromatic). The line(s) of the linear visual code may be printed (or manufactured) on a surface of an article (e.g., an object) using a material, such as, for example, ink. Alternatively or in addition to, the surface of the article may be machined to create the line(s) of the linear visual codes on the surface of the article, such that the line(s) may project outwards or inwards of the surface of the article. The line(s) may lie in-plane or out-of-plane. The machined line(s) or the portion of the surface excluding the line(s) may be colored (with one or more colors). The line(s) may be parsed out by one or more spaces (e.g., one or more static spaces) to create the unique 1D linear pattern. The line(s) may be straight or not straight (e.g., curved, bent, angled, etc.).

The visual code may change continuously, periodically, according to a schedule, or in response to a detected event or condition.

A common linear visual code can comprise two or more sub-visual codes. The sub-visual codes may be on or adjacent to one another. The sub-visual codes may be overlapping with at least a portion of one another. In some cases, the sub-visual codes may be on a same plane (e.g., a same horizontal plane). Alternatively or in addition to, two or more sub-visual codes (or all of the sub-visual codes) may be on different planes (e.g., different horizontal planes). In some cases, the sub-visual codes can comprise an "invisible" (e.g., invisible to the naked eye) visual code and a visible (e.g., visible to the naked eye) visual code. The invisible visual code may be embedded within the visible visual code. In some cases, the visible visual code may be used as a decoy, while the invisible visual code may comprise or be operatively linked to data comprising information of the article(s) carrying the linear visual code. In an example, the line(s) of the linear visual code may appear black to the naked eye, but may appear to exhibit multiple and distinguishable wavelengths of the electromagnetic spectrum (e.g., distinguishable using an infrared (IR) or ultraviolet (UV) visual scanning system).

In some cases, dynamically changing line(s), with or without static or dynamically changing space(s), can create a unique 1D linear pattern in real-time. The dynamically changing line(s) can create a plurality of 1D linear patterns (e.g., different 1D linear patterns) at a plurality of time points. In some examples, each of the plurality of different 1D linear patterns may be a unique, time-dependent 1D linear pattern that is readable by the visual scanning system. In some examples, only a portion of the plurality of different 1D linear patterns may be a unique time-dependent 1D linear pattern that is readable by the visual scanning system.

Examples of the linear visual code include Australia Post barcode, Codabar, Code 25 (interleaved or non-interleaved), Code 11, Code 32 (or Farmacode), Code 39, Code 49, Code 93, Code 128, Digital indeX (DX), European Article Numbers (EAN), Facing Identification Mark, Intelligent Mail barcode, Interleaved 2 of 5 (ITF), Modified Plessey, Pharmacode, Postal Alpha Numeric Encoding Technique (PLANET), PostBar, Postal Numeric Encoding Technique, Universal Product Code (e.g., UPC-A and UPC-E), a modification thereof, or a combination thereof.

One or more features or embodiments of the 1D visual code provided herein (e.g., static and/or dynamic visual codes; monochromatic, multichromatic, and/or metachromatic visual codes; sub-visual codes, etc.) may be utilized to generate any of the embodiments of visual codes (e.g., 2D and/or 3D visual codes) provided elsewhere in the present disclosure.

The visual code can comprise a matrix (2D) visual code. In some cases, the matrix visual code can contain more data (or information) per unit area of the visual code than the linear visual code. The matrix visual code can comprise a plurality of lines that are not parallel to each other. The matrix visual code may comprise at least 2, 3, 4, 5, 6, 7, 8, 9, 10, or more lines that are non-parallel. The matrix visual code may comprise at most 10, 9, 8, 7, 6, 5, 4, 3, or 2 lines that are non-parallel. An angle between two lines of the matrix visual code may be acute, perpendicular, or obtuse. At least a portion of the lines of the matrix visual code may or may not intersect at one or more points. The matrix visual code may comprise a plurality of areas. The plurality of areas may be of a same shape or different shapes, such as, for example, circular, triangular, square, rectangular, pentagonal, hexagonal, or any partial shape or combination of shapes thereof. The plurality of areas may be of a same color or different colors, such as, for example, indicative of different wavelengths of the electromagnetic radiation spectrum. At least a portion of the areas of the matrix visual code may or may not overlap with each other.

The matrix visual code can be a static and/or dynamic matrix visual code. The matrix visual code can be monochromatic, multichromatic (e.g., in the visible and/or infrared spectrum), and/or metachromatic matrix visual codes. The matrix visual code can comprise two or more sub-visual codes. The sub-visual codes of the matrix visual code may be matrix visual codes or a combination of a matrix visual code and a non-matrix visual code, such as, for example a linear visual code. In some cases, at least one of the sub-visual codes of the matrix visual code may be invisible (e.g., invisible to the naked eye).

Examples of the matrix visual code include Aztec, ColorCode, Color Construct Code, CrontoSign, CyberCode, d-touch, DataGlyphs, Data Matrix, Datastrip Code, Digimarc Barcode, DotCode, DWCode, EZcode, High Capacity Color Barcode, Han Xin Barcode, HueCode, InterCode, MaxiCode, Mobile Multi-Colored Composite (MMCC), NexCode, PDF417, Qode, QR code, ShotCode, Snapcode, SPARQCode, VOICEYE, a modification thereof, or a combination thereof. Other examples of the matrix visual code include one or more images and/or one or more texts.

The matrix visual code (e.g., the QR code) can have various symbol sizes as long as the matrix visual code can be scanned from a reasonable distance by the imaging device. The matrix visual code can be of any image format (e.g. EPS or SVG vector graphs, PNG, GIF, or JPEG raster graphics format).

The visual code can comprise a 3D visual code. In some cases, the 3D visual code can contain more data (or information) per unit area of the visual code than the linear visual code or the matrix visual code. The terms "2.5 dimension (2.5D)," and "3D," as used herein interchangeably, can refer to a visual code that provides a perception of depth. The 3D visual code can have a pattern that gives a perception of depth. The 3D visual code can have two or more portions that are disposed at different depths. In some cases, a first portion of the 3D visual code may be disposed at a position higher than a second portion of the 3D visual code (e.g., at higher position relative to a reference position in an article that carries the 3D visual code). In an example, the 3D visual code includes a holographic pattern. The holographic pattern may be an interference pattern that, when suitably illuminated, produces a 3D image.

The 3D visual code can be a static and/or dynamic 3D visual code. The 3D visual code can be monochromatic, multichromatic (e.g., in the visible and/or infrared spectrum), and/or metachromatic matrix visual codes. The 3D visual code can comprise two or more sub-visual codes. The sub-visual codes of the 3D visual code may be linear visual codes, matrix visual codes, 3D visual codes, or combinations thereof. In some cases, at least one of the sub-visual codes of the 3D visual code may be invisible (e.g., invisible to the naked eye). In some cases, a plurality of portions of the 3D visual code may be of different heights (and/or depths), whereby each group of one or more portions of a same height (and/or depth) can generate a unique sub-visual 3D code.

Examples of the 3D visual code include 3D variants of 1D and/or 2D visual codes, such as, for example, 3D variants of one or more barcodes, one or more images, one or more texts, or combinations thereof.

The visual code can be segmented into a plurality of portions. The visual code can be divided into at least 2, 3, 4, 5, 6, 7, 8, 9, 10, or more portions. The visual code can be divided into at most 10, 9, 8, 7, 6, 5, 4, 3, or 2 portions. The plurality of portions of the segmented visual code may be movable relative to each other, utilizing a mechanism similar to an aperture of a photographic camera. The terms "segmented," "divided," "separated," "furcated," "forked," "split," "portioned," and "sectioned," as used interchangeably herein, can refer to such segmentation of the visual code into the plurality of portions. The terms "portion", "leaf," "leaflet," "part," "piece," "base," "bit," "segment," "partition," "section," and "allocation," as used interchangeably herein, can refer to each portion of the plurality of portions of the segmented visual code. The plurality of portions of the visual code may have a same or different shape(s), size(s), depth(s), texture(s), color(s), temperature(s), motion (e.g., static or moving), magnetic field(s), electric field(s), composition(s) (e.g., metallic, ceramic, and/or polymeric materials that make up the visual code, such as ink, or a base layer that carries the visual code).

The visual code may be substantially flat, raised, indented, or have any texture.

The segmented visual code can be reconstructed to form a unified visual code that is readable by the visual scanning system. The terms "reconstructed," "combined," "generated," "re-generated," "created," "re-created," "completed," and "united," as used interchangeable herein, can refer to such unified visual code from the segmented visual code. The segmented (and non-reconstructed) visual code may not be readable by the visual scanning system. The reconstruction of the segmented visual code (e.g., combination of the plurality of portions of the visual code) may be reversible (i.e., non-permanent) or irreversible (i.e., permanent). The irreversible reconstruction of the segmented visual code may comprise utilizing a locking (e.g., automatic or manual) mechanism.

Alternatively or in addition to, both the segmented and reconstructed visual code may be readable by the visual scanning system. In such a case, the segmented visual code may encode a first visual code, the reconstructed visual code may encode a second visual code, and the first and second visual codes may be different such that the visual scanning system can distinguish the segmented visual code and the reconstructed visual code from each other.

In another alternative, or addition, the first visual code of the segmented visual code may be readable by a first visual scanning system, the second visual code of the reconstructed visual code may be readable by a second visual scanning system, wherein the first and second visual scanning systems are different such that the first and second visual codes may be distinguishable.

The visual code may be added (e.g., printed, machined, glued, etc.) on an article. The plurality of portions of the segmented visual code may be on a common base layer or a plurality of base layers (e.g., at least 2, 3, 4, 5, 6, 7, 8, 9, 10 or more base layers, or at most 10, 9, 8, 7, 6, 5, 4, 3, or 2 base layers). The common base layer comprising the plurality of portions of the visual code can undergo a shape shift (e.g., folding), thereby resulting in reconstruction of the visual code. Alternatively or in addition to, the plurality of base layers may be brought together (e.g., by a mechanical force), thereby resulting in reconstruction of the visual code. When brought together, the plurality of base layers may or may not overlap with each other. In some cases, the plurality of base layers may be brought together side-by-side without an overlap. When side-by-side, the base layers may or may not be in contact with each other. When side-by-side, the base layers may or may not be separated by a gap. In some cases, the plurality of base layers may be brought together while at least a portion of a first base layer overlaps with at least a portion of a second base. In such a case, one or both of the first and second base layers may comprise a portion of the plurality of portions of the visual code. In an example, the visual code may be a hidden visual code, wherein the segmented portions of the visual code may be brought together and overlapped to reveal a hidden, unique visual code. The hidden, unique visual code can then be read by the visual scanning device(s). Reconstruction of the segmented visual code may comprise overlapping at least a portion of at least 2, 3, 4, 5, 6, 7, 8, 9, 10, or more portions of the segmented visual code. Reconstruction of the segmented visual code may comprise overlapping at least a portion of at most 10, 9, 8, 7, 6, 5, 4, 3, or 2 portions of the segmented visual code.

The segmented visual codes can be reconstructed to create a 1D, 2D, or 3D visual code.

The segmented visual code can be reconstructed to create one or more images (e.g., a same image or different images) of one or more objects (e.g., a same object or different objects). The image(s) may comprise a photographic image and/or a stereoscopic image. The photographic image may be an image that does not provide a perception of depth (e.g., a 1D and/or 2D image). The stereoscopic image (i.e., a stereo-pair image) may comprise at least two images that provide a perception of depth (e.g., a "left eye" image intended for a left eye of an observer and a "right eye" image intended for a right eye of the observer). Observance of the stereoscopic image by both the left and right eyes of the observer may be required to process the left eye and right eye images into a unique visual code. In an example, the left eye and right eye images may be different leaflets of the segmented visual code, and reconstruction by overlapping at least a portion of each of the left eye and the eye may provide the readable stereoscopic image. The image(s) of the visual code may be symbols (e.g., mathematical symbols).

The segmented visual code may comprise one or more text codes. The text code(s) may comprise numbers and/or alphabets. In some cases, the segmented visual codes may comprise allocated or sequenced numbers and/or letters (e.g., numbers, letters, words, or alphanumeric combinations), such that upon reconstruction, a readable or scannable visual code can be generated. Alphabets may comprise one or more letters from Afrikaans, Albanian, Amharic, Arabic, Armenian, Assamese, Assyrian, Avar, Azerbaijani, Balinese, Bamara Bantu, Bashkir, Basque, Bengali Birhari, Bulgarian, Buluba-Lulua, Burmese, Buryat, Byelorussian, Caddoan, Cantonese, Catalan, Chechen, Chikaranga, Chippewa, Choctaw, Church Slavik, Chuvash, Coptic, Cree, Croatian, Cyrillic, Czech, Dakota, Danish, Dari, Devanagari, Dutch, Dzongkha, English, Eskimo, Esperanto, Estonian, Ewe, Farsi, Fijian, Filipino, Finnish, Flemish, French, Fulani, Gaelic, Galician, Gcorgian, German, Greek, Gujarati, Gurmakhi, Harari, Hausa, Hawaiian, Hebrew, Hindi, Hiragana, Ibo, Icelandic, Indonesian, Irish, Irogquoian, Italian, Japanese, Kabardian, Kalmyk, Kannada, Kanuri, Kashmiri, Katakana, Kazakh, Khasi, Khmer, Kirghiz, Kishmiri, Komi, Kongo, Korean, Kurdish, Lao, Latin, Latvian, Lithuanian, Lu-Guanda, Macedonian, Magahi Maithili, Makua, Malagasy, Malay, Malayalam, Maltese, Mandarin, Mandingo, Manipuri, Marathi, Masai, Mizo, Moldavian, Mongolian, Munda, Naga, Navaho, Nyanja, Nepalese, Norwegian, Oriya, Oromo, Ossetian, Pashto, Polish, Portugese, Punjabi, Rajasthani, Rhaeto-Romanic, Rumanian, Russian, Samoan, Sangs, Serbian, SerboCroatian, Sinhalese, Sinhi, Sioux, Slovak, Slovenia, Spanish, Sundanese, Swahili, Swedish, Syriac, Tadzhik, Tagalog, Tajik, Tamil, Tatar, Telugu, Thai, Tibetan, Turkish, Turknen, Udmurt, Uighur, Ukranian, Umbundu, Urdu, Uzbek, Vietnamese, Visayan, Welsh, Yakut, Yoruba, or a combination thereof.

In some cases, the text code(s) may comprise a "Completely Automated Public Turing test to tell Computers and Humans Apart (CAPTCHA)" code that may not be readable by the visual scanning device(s). When not readable by the visual scanning device(s), such reconstructed visual code comprising the CAPTCHA code may be read (or scanned) by a user and recorded (e.g., on a computer) by the user. In some cases, the text code(s) may comprise texts that are not CAPTCHA and may be readable by the visual scanning device(s).

As provided elsewhere in the present disclosure, the image(s) and/or text(s) of the segmented visual code may be monochromatic, multichromatic (e.g., in the visible and/or infrared spectrum), and/or metachromatic. As provided elsewhere in the present disclosure, the image(s) and/or text(s) of the segmented visual code may be static (e.g., one or more images) or dynamic (e.g., one or more videos). In some cases, movement and/or readjustment of two or more leaflets of the segmented visual code can generate two or more unique unified visual codes that can be read and distinguished by the visual scanning device(s).

The reconstructed visual code can emit vibrations or sounds that may be picked up by a microphone or any type of acoustic sensor. Such vibrations or sounds of the reconstructed visual code may be different than vibrations or sounds of the segmented visual code. In some cases, the reconstructed visual code may emit vibrations or sounds for a pre-determined period of time (e.g., at least 1, 2, 3, 4, 5, 6, 7, 8, 9, 10, 20, 30, 60, or more minutes, or at most 60, 30, 20, 10, 9, 8, 7, 6, 5, 4, 3, 2, 1, or less minutes) upon reconstruction. Such time-controlled vibrations or sounds may be a notification to a user (e.g., a nurse at a hospital) to read the reconstructed visual code within the pre-determined period of time. Such time-controlled vibrations or sounds may stop after the pre-determined period of time. In some cases, the segmented visual code may each emit vibrations or sounds, and reconstruction of such segmented visual code may generate a new vibration or sound that is unique to the reconstructed visual code. The reconstructed visual code may be characterized by its emitted frequencies, pitches, harmonics, ranges, or patterns of sounds that may be detected. The vibrations and/or sounds of the reconstructed visual code may or may not be discernible by the human ear and/or touch. In some cases, visual codes may emit wireless signals, such as radiofrequency signals, Bluetooth signals, Wi-Fi signals or any other type of signals.

The reconstructable visual code can be operatively coupled to one or more actuation elements. In some cases, the reconstructable visual code can be added (e.g., printed, machined, glued, etc.) to one or more moving pieces of an article that carries (or is marked by) the visual code. The moving piece(s) (e.g., leaflet(s)) may be operatively coupled to the actuation element(s). The actuation element(s) may adjust (e.g., increase, maintain, and/or decrease) one or more gaps between (or among) segments of the reconstructable visual code, thereby to reconstruct and/or deconstruct the reconstructable visual code.

At least one of the moving pieces carrying a segment of the reconstructable visual code may be movable. In some cases, (i) a first leaflet of the article carrying a first segment of the reconstructable visual code and/or (ii) a second leaflet of the article carrying a second segment of the reconstructable visual code may be movable relative to each other to be reconstructed (overlapping or not) to create at least a portion of the reconstructed visual code. As the movement is a relative movement, the moving piece may be the first leaflet, the second leaflet, or both. Such configuration may be applicable to other reconstructable visual codes provided in the present disclosure.

The actuation element(s) can comprise one or more spring elements for actuating and/or closing a gap between segments of the reconstructable visual code. Non-limiting examples of the spring element(s) can include a variety of suitable spring types, e.g., nested compression springs, buckling columns, conical springs, variable-pitch springs, snap-rings, double torsion springs, wire forms, limited-travel extension springs, braided-wire springs, etc. Alternatively or in addition to, the actuation element(s) (e.g., spring elements) can be made from any of a number of metals, plastics, or composite materials. In some cases, the spring element(s) can comprise deployment springs and/or retraction spring(s) to direct the relative movement of the segments of the reconstructable visual code.

The actuation element(s) can comprise a mechanical and/or electromechanical element capable of motion in one or more axes of control (e.g., one or more of the XYZ planes) via one or more actuators. Non-limiting examples of the actuation element(s) can include magnets, electromagnets, pneumatic actuators, hydraulic actuators, motors (e.g. brushless motors, direct current (DC) brush motors, rotational motors, servo motors, direct-drive rotational motors, DC torque motors, linear solenoids stepper motors, and shaft actuators (e.g. hollow shaft actuators), ultrasonic motors, geared motors, speed-reduced motors, or piggybacked motor combinations), gears, cams, linear drives, belts, pulleys, conveyors, and the like. Another non-limiting example of the actuation element(s) include heating and/or cooling elements (e.g., wires) that emit radiation (e.g., IR radiation) that can be read by a sensor (e.g., an IR sensor). In such a case, the heating and/or cooling elements may be operatively coupled to a temperature controller that regulates a temperature of the heating and/or cooling element, thereby to control the reconstructable visual code.

The actuator(s) of the moving pieces carrying the segments of the reconstructable visual code may be operatively connected to a controller (e.g., a computer). The controller may direct movement of the moving pieces relative to each other to create at least a portion of the reconstructed visual code.

The actuation mechanism of the actuation element(s) may be reversible or irreversible. Alternatively or in addition to, the reconstructed visual code may be irreversible (i.e., non-retractable) by activating a locking mechanism that prevents one or more segments of the reconstructable visual code from moving again once the reconstructed visual code has been created (e.g., once an aperture carrying the reconstructable visual code has been closed).

Reconstruction of the reconstructable visual code can be triggered by an activation element. Operations of the actuation element(s) that induce the reconstruction of the reconstructable visual code can be triggered by the activation element. The activation element may be automatic and/or manual. In some cases, an article carrying a reconstructable visual code can comprise a mechanical switch (e.g., a button) operatively coupled to the actuation element(s), and a user of the article may be required to manipulate (e.g., push, pull, press, rotate, etc.) the switch to initiate the activation element. Alternatively or in addition to, the article carrying the reconstructable visual code can comprise a time-dependent switch (e.g., a timer) operatively coupled to the actuation element(s), and the time-dependent switch may initiate the activation element at a pre-determined time without any user input. In some cases, the activation element may comprise both automatic and manual elements. In an example, the switch to activate the actuation element(s) may only be functional during a pre-determined time period, and thus the reconstructable visual code may be reconstructed during the pre-determined time period.

The lifetime of the reconstructed visual code may be permanent or transient. In some cases, the reconstructable visual code may be operatively coupled to a hiding mechanism that is configured to hide (e.g., shield, cover, make disappear, etc.) the reconstructed visual code automatically (e.g., at a pre-determined time) and/or manually (e.g., by the user input).

Any of the visual code may be reconstructable by using any of the features or embodiments provided in the present disclosure.

In some embodiments, at least a portion of the segmented visual code can be provided in augmented reality or virtual reality. In such a case, a first portion of the visual code (e.g., a bar code, QR code, etc.) can be a physical visual code, and a second portion of the visual code can be a virtual visual code. The physical visual code may be in a physical environment or space (e.g., as part of the ISS as disclosed herein). The first portion and the second portion of the visual code may be combined in an augmented reality space or virtual reality space to generate a functional visual code. The physical visual code may be disposed on or adjacent to a physical object (e.g., printed on a movable leaflet of the ISS as disclosed herein). The virtual visual code may be displayed on a graphical user interface (GUI) of a device (e.g., an authorized scanner, tablet, or mobile device) of the user. The GUI may be displayed on a screen (e.g., black and white, or color screen) of the device.

The terms "augmented reality" and "AR," as used herein, can refer to a view of a physical, real-world object and/or environment that is augmented or supplemented by computer-generated or digital information such as video, sound, and/or graphics. The digital information can be directly registered in the user's physical, real-world environment such that the user may interact with the digital information in real time. The digital information may take the form of images, sound, haptic feedback, video, text, etc. For example, 2D or 3D representations of digital objects may be overlaid over the user's view of the real-world environment in real time.

The terms "virtual reality" and "VR," as used herein, can refer to a simulation of a user's presence in an environment, real or imagined, such that the user may interact with it.

Examples and additional details of the segmented visual codes and methods of use thereof are provided in, for example, International Patent Application No. PCT/US2020/019122, which is entirely incorporated herein by reference.

D. Visual Scanning System

The visual code, as disclosed herein code (e.g., the reconstructable or reconstructed digital code), can be read by a visual scanning system. The visual scanning system can be a visual code reader, sensor, or a scanner. In the context of reading or scanning a visual code, The visual scanning system can be configured to can the visual code from a reasonable distance from the visual code. A user may take an image or video of a reconstructed visual code using a visual scanning system, and the visual scanning system may be configured to transmit the image or video to an optical character recognition (OCR) engine for processing to extract relevant information from the image or video data. The visual scanning system may comprise one or more visual scanning devices (e.g., at least 1, 2, 3, 4, 5, or more visual scanning devices, or at most 5, 4, 3, 2, or 1 visual scanning device) configured to read the visual code. The visual scanning system may be configured to read the visual code in its segmented, non-reconstructed form and/or in its unified, reconstructed form. The visual scanning system can be used to read a one-dimensional (1D) visual code (e.g., a barcode), two-dimensional (2D) visual code (e.g., a QR code), and/or three-dimensional (3D) visual code (e.g., a pattern with a perception of depth). Examples of the visual scanning device(s) include a detector, vision system, computer vision, machine vision, imager, camera, binocular camera, digital camera, electromagnetic radiation sensor (e.g., IR sensor, UV sensor, color sensor, etc.), proximity sensor, densitometer (e.g., optical densitometer), profilometer, spectrometer, pyrometer, motion sensor, magnetic field sensor (e.g., microelectromechanical systems), electric field sensor, etc.

In some cases, at least a portion of the segmented visual code can be provided in augmented reality or virtual reality, and the visual code can be scanned and reconstructed using an augmented reality device (e.g., a mobile device or a headset) or a virtual reality device (e.g., a mobile device or a headset).

The visual scanning system may be implemented as a stand-alone system, and need not be provided on another device, such as, for example, a user device (e.g., a tablet computer, a mobile phone, a smart phone, a smart watch, a smart glass, etc.). In some cases, the stand-alone visual scanning system can be a customized visual scanning system that is specifically designed for scanning reconstructed visual codes. The customized visual scanning system may be sold to end users of the reconstructed visual codes and/or licensed to one or more original equipment manufacturers (OEM). Alternatively or in addition to, the customized visual scanning system can be an add-on (e.g., hardware and/or software add-on) to the user device. The reconstructed visual code may not be read, captured, and/or processed without such add-on. In some cases, a hardware add-on may be operatively coupled to the user device via a wireless signal (e.g., Bluetooth, Wi-Fi, etc.) or a cable connection (e.g., USB 2.0, USC-C, micro-USB, etc.). In some cases, the hardware add-on may be an optical device (e.g., a lens) that is coupled on or adjacent to one or more cameras on the user device. In some cases, a software add-on may be provided (e.g., downloaded) and operatively coupled to the user device (e.g., to one or more cameras of the user device). In another alternative, or addition, the visual scanning system may be provided on the user device (e.g., the user device may have a camera operable as the visual scanning system). In some cases, the visual scanning system can utilize one or more cameras on the user device. The visual scanning system may be implemented using off-the-shelf camera(s) on the user device with or without requiring any modification of the camera(s).

In some cases, a user may register with a control entity by providing the visual code to the control entity. The user may input the visual code into the visual scanning system application, user device application, and/or web-based application that is configured to transmit the code to the control entity. The user may input the visual code, for example, by capturing or scanning an image of the visual code using a built-in sensor (e.g., a build-in camera) on the visual scanning system or user device. The visual scanning system application, user device application, and/or web-based application may decipher the visual code and transmit the code to a server (e.g., that is operated by a control entity). In some cases, the visual scanning system application, user device application, and/or web-based application may transmit the visual code in raw format to the server for decoding/deciphering.

The visual scanning device(s) as provided herein can serve as an image capture and/or scanning device. The visual scanning device(s) may be a physical imaging device. The visual scanning device(s) can be configured to detect electromagnetic radiation (e.g., visible, infrared, and/or ultraviolet light) and generate image data based on the detected electromagnetic radiation. The visual scanning device(s) may include a charge-coupled device (CCD) sensor or a complementary metal-oxide-semiconductor (CMOS) sensor that generates electrical signals in response to wavelengths of light. The resultant electrical signals can be processed to produce image data. The image data generated by the visual scanning device(s) can include one or more images, which may be static images (e.g., visual codes, photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto one or more image sensors of the visual scanning devices(s).

The visual scanning device(s) can be a camera. The camera can be a movie or video camera that captures dynamic image data (e.g., video). The camera can be a still camera that captures static images (e.g., photographs). Examples of the static images may include letters, numbers, icons, shapes, symbols, pictures, 1D, 2D, or 3D bar codes, quick response (QR) codes, or any other type of image. The camera may capture both dynamic image data and static images. The camera may switch between capturing dynamic image data and static images. Although certain embodiments provided herein are provided in the context of cameras, it shall be understood that the present disclosure can be applied to any suitable visual scanning device(s), and any description herein relating to cameras can also be applied to any suitable visual scanning device(s), and any description herein relating to cameras can also be applied to other types of visual scanning device(s). The camera can be used to generate 2D images of a 3D code. The images generated by the camera can represent the projection of the 3D code onto a 2D image plane. Accordingly, each point in the 2D image may correspond to a 3D spatial coordinate in the 3D code. The camera may comprise optical elements (e.g., lens, mirrors, filters, etc). The camera may capture color images, greyscale image, infrared images, and the like. The camera may be a thermal visual scanning device(s) when it is configured to capture infrared images.

The visual scanning device(s) can capture an image or a sequence of images at a specific image resolution. In some cases, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some cases, the visual scanning device(s) may be a 4K camera or a camera with a lower or higher resolution.

The visual scanning device(s) may capture a sequence of images at a specific capture rate. In some cases, the sequence of images may be captured standard video frame rates such as about 24 progressive ("p," or full images per second), 25p, 30p, 48p, 50p, 60p, 72p, 90p, 100p, 120p, 300p, 50 interlaced ("i," or fields per second), or 60i. In some cases, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some cases, the capture rate may change depending on user input and/or the target application.

In some cases, the visual scanning device(s) may be a high speed camera. The high speed camera can have a high sampling frequency. In some cases, the high speed camera of the visual scanning system(s) may be capable of capturing a reconstructed visual code that refreshes or changes at a frequency above the maximal frame rate perceivable by the naked eye.

The visual scanning device(s) may have adjustable parameters. Under differing parameters, different images and/or videos may be captured by the visual scanning device(s) while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches the image sensor(s) in the visual scanning device(s). For example, shutter speed may control the amount of time light reaches the image sensor(s) and aperture may control the amount of light that reaches the image sensor(s) in a given time. Parameters related to gain may control the amplification of a signal from the optical sensor. In some cases, ISO may control the level of sensitivity of the camera to available light.

In some cases, the visual scanning device(s) may extend beyond a physical scanning device. For example, the visual scanning device(s) may include any technique that is capable of capturing and/or generating images or video frames of codes. In some cases, the visual scanning device (s) may refer to an algorithm that is capable of processing images obtained from another physical device.

The visual scanning system(s) can be capable of detecting multiple layers within a visual image (e.g., within a reconstructed visual image). In some cases, the reconstructed visual image may comprise an overlap of two or more layers of the segmented visual image, and the visual scanning system(s) may be capable of discerning, distinguishing, or discretizing the overlapped layers. In an example, the reconstructed visual image may comprise an overlap of three layers of the segmented visual image, and the real visual code may be a combination of two of the three layers. In such a case, the visual scanning system(s) may be capable of discretizing the real visual code after scanning the reconstructed visual image of the overlap of three layers.

The visual scanning system(s) may be operatively coupled to a controller (e.g., a computer) capable of employing artificial intelligence (e.g., one or more machine learning algorithms) to analyze a database comprising a plurality of images and/or videos of (i) the visual codes prior to segmentation of each visual code, (ii) the visual codes in their segmented, non-reconstructed form, and/or (iii) the visual codes in their unified, reconstructed form. One or more machine learning algorithms of the artificial intelligence may be capable of analyzing a captured image or video of the reconstructed visual code. One or more machine learning algorithms of the artificial intelligence may be capable of distinguishing or differentiating reconstructed visual codes from their respective, non-reconstructed visual codes. One or more machine learning algorithms of the artificial intelligence may be capable of further reconstructing the images and/or videos of the visual codes in their unified, reconstructed form in case when the physical reconstruction of the visual codes were incomplete.

In some cases, a unique pattern of a reconstructable visual code may have a tolerance. The reconstructable visual code may have a pre-determined range of alignment threshold. Thus, subsequent to reconstruction of the visual code, varying alignment configurations of a plurality of segments of the reconstructable visual code may be acceptable and detectable by the visual scanning system(s), as long as the varying alignment configurations are within the pre-determined range of alignment threshold. Such pre-determined alignment threshold may be defined by a distance between two or more segments of the visual code, a total area of the reconstructed visual code, a degree of overlap between two or more segments of the visual code, etc.

E. Applications

The reconstructable visual codes provided herein can be used in a variety of applications including, for example, identification, tracking (e.g., monitoring and/or logging), accountability, security (e.g., a lock and key mechanism), authentication, transaction, and/or transfer of one or more articles. Examples of such article(s) cam include computer data comprising information, objects (e.g., documents, shipping packages, drugs, etc.), individuals (e.g., healthcare practitioners, pharmacists, patients, etc.), etc. In some cases, two or more articles (e.g., two or more articles of luggage) may each comprise at least one segment of a segmented visual code, and the respective reconstructed visual code may be scanned to confirm a correct paring of the two or more articles. Industries, such as, for example, healthcare (e.g., patient care, pharmaceutical distribution and/or administration, etc.), may benefit from a use of the reconstructable visual codes.

In healthcare, for example, the reconstructable visual codes can be used to track two or more patients. In an example, two or more patients can each have a tag, wherein each tag carries at least a portion of the segmented visual code. The tags from the two or more patient(s) can be brought together, with or without any overlap, and the visual scanning system(s) can be used to track the group of two or more patients. In an example, the group of two or more patients may be a post-partum mother and a newborn baby, or a bone marrow recipient and a donor. In another example, the reconstructable visual code (with or without a separate deconstructable visual code) can be used as part of the ISS for identification, tracking (e.g., monitoring and/or logging), accountability, security (e.g., a lock and key mechanism), authentication, transaction, and/or transfer of the ISS to prevent diversion of the drug from the vial inside the ISS for an illicit collection, sales, and/or use of the drug.

An example procedure of using the ISS is provided herein. A drug vial (e.g., a vial containing a controlled or non-controlled drug, such as liquid drug) can be loaded into an automated dispensing machine (ADM) (commercially available ADM include, for example the McLaughlin dispensing system, the Baxter ATC-212 dispensing system, and the Pyxis MedStation). In some cases, the drug vial can be stored in a drawer of the ADM (e.g., a CUBIE pocket in the Pyxis MedStation). The drawer, the ADM, and/or the room containing the ADM can be temperature controlled (e.g., to a preset or selected average temperature) to prevent the drug from damage (e.g., degradation) and to enhance its shelf-life. The drug vial may be loaded into the ADM by a pharmacist, a pharmacy technician, or a nurse.

A prescriber (e.g., a physician or nurse practitioner) can place an order for the controlled or non-controlled liquid drug into a system (e.g., electronic medication administration record (eMAR)) for a patient. The patient may be an inpatient or an outpatient. The prescriber may be required to log into the eMAR to place the order. Subsequently, a practitioner (e.g., a nurse) can access a record of the patient in the eMAR to select the order for the controlled or non-controlled liquid drug. The practitioner may be required to log into the eMAR to gain such access to patient information.

The eMAR can be in operative communication with the ADM, such that the eMAR can direct the drawer of the eMAR containing the appropriate drug vial to open and provide access to the practitioner. Additionally, a user interface (e.g., a GUI) of the eMAR and/or ADM can inform the practitioner details of the drug in the drug vial (e.g., concentration, type, warning labels, expiration date, etc.) and/or the prescribed dosage (e.g., size, volume, a number of injections, etc.) of the drug in the drug vial. The eMAR and/or ADM may be configured to or in operative communication with a computer system that is configured to calculate an expected excess amount of the drug following extraction of the prescribed dosage, and the user interface of the eMAR and/or ADM may display the calculated value to the practitioner.

The ADM can be used to also collect the drug vial (or an ISS that contains the drug vial) after its use. In some cases, prior to obtaining the drug vial from the ADM, the practitioner may need to select via the user interface of the ADM and/or the eMAR whether the practitioner is instructed to (1) return the drug vial back to the ADM within a pre-determined period of time following administration of the drug to the patient, or (2) delay return of the drug vial following administration of the drug to the patient. The nurse may be asked to provide one or more reasons (e.g., via the user interface of the ADM and/or the eMAR) for such delay. Alternatively or in addition to, a collection machine (e.g., an automated collection machine) can be used to collect the drug vial (or an ISS that contains the drug vial) after its use (e.g., collect waste). The collection machine may or may not be operatively coupled to the ADM. The collection machine may or may not be in communication with the ADM.

The practitioner can obtain the appropriate drug vial and its corresponding ISS. The ISS may be configured to fit different drug vials of different sizes. Alternatively or in addition to, the ISS may be configured to fit a drug vial with an individual size. The practitioner can also obtain a drug loading device (e.g., a sterile syringe) for administration of the prescribed drug to the patient. In some cases, the drug loading device can have a label that comprises one or more visual code (e.g., a barcode). The practitioner may be required to scan the label of the drug loading device prior to link the drug loading device, the practitioner, the ISS, and/or the drug vial tin to the system (e.g., eMAR and/or ADM).

The practitioner can attach the ISS to the drug vial (or attach the drug vial to the ISS). In some cases, the practitioner may insert the drug vial into the ISS. Alternatively, the drug vial may be secured inside the ISS by a manufacturer and loaded into the ADM for the practitioner to use. Once the drug vial is secured inside the ISS, an opening of the ISS can be sealed (e.g., automatically or manually by the practitioner), thereby to prevent illicit extraction (e.g., diversion) of the drug.

The drug vial may have a removable cover (e.g., a snap cap) that covers its access port (e.g., stopper). The practitioner may remove the removable cover prior to or after installation of the drug vial into the ISS.

The ISS can comprise one or more sensors configured to detect a presence of the drug vial inside the ISS and/or an amount of the drug (e.g., the drug solution) inside the drug vial that has been inserted into the ISS. The sensor(s) may be used to compare drug doses (e.g., volume) that the drug vial is supposed to contain and drug doses that the drug vial actually contains at the time of installation into the ISS. Such comparison may be used to track the drug throughout the process and prevent its diversion.

The ISS can comprise a reconstructable visual code. Once the drug vial is secured inside the ISS, the reconstructable visual code can appear for the practitioner to scan. The reconstructable visual code can transform from a first separated state to a second combined state to create the reconstructed visual code. Scanning the first visual code may (1) link the ISS and the drug vial to the system (e.g., eMAR and/or ADM), and/or (2) link the identification of the practitioner to the ISS and the drug vial. Scanning the reconstructed visual code can also indicate the scanning time in the system, which may start the clock for a pre-determined time period for the practitioner to withdraw the drug from the IS S/drug vial system, administer the withdrawn drug to the patient, and/or returned the ISS/drug vial with any excess drug (e.g., return to the ADM). In some cases, the practitioner may not complete the task(s) within the pre-determined time period, and the practitioner's profile and/or the patient's eMAR may be marked with an indicator (e.g., a red flag, a warning sign, and/or a discrepancy report), and a supervisor of the practitioner may be notified for review. The pre-determined time period may be at least about 1, 2, 3, 4, 5, 6, 7, 8, 9, 10, 11, 12, 13, 14, 15, 16, 17, 18, 19, 20, or more minutes. The pre-determined time period may be at most about 20, 19, 18, 17, 16, 15, 14, 13, 12, 11, 10, 9, 8, 7, 6, 5, 4, 3, 2, or 1 minute.

The ISS can comprise one or more activation switches. The switch(es) may be on a side (e.g., on one or more external sides and/or internal sides) of the ISS. In some cases, the ISS can have two switches on opposite sides of the ISS, such that the two switches can be engaged (e.g., pressed, pressed and released, etc.) by two fingers (e.g., a thumb and another finger). Subsequent to scanning the reconstructed visual code of the ISS, the practitioner can engage (e.g., press) the switch(es) to activate deconstruction of the reconstructed visual code, thereby to re-open the opening of the ISS and expose the access port of the drug vial.

The switch(es) may need to be engaged continually to keep the opening of the ISS opened. Alternatively, the switch(es) may not need to be engaged continually to keep the opening of the ISS opened.

The practitioner can inject the needle of a syringe through the access port (e.g., stopper) of the drug vial to extract a prescribed dose of the drug from the drug vial. In some cases, the drug vial may be inverted (e.g., the access port facing down) or upright (e.g., the access port facing up) during extraction of the drug using the syringe.

The size of the opening of the ISS can be such that it may be difficult for the practitioner to insert an additional needle (e.g., at least 1, 2, 3, 4, 5, or more additional needles) during the drug extraction process. Alternatively or in addition to, the sensor(s) of the ISS may be configured to detect (e.g., count) a number of needles inserted through the access port of the ISS and store the feedback in a memory device of the ISS, thus discouraging or preventing the practitioner or others from using multiple drug loading devices for, e.g., diversion of the drug. The sensor(s) of the ISS may be configured to indicate a time of insertion of the needle through the access port and store the feedback in the memory device of the ISS. The feedbacks from the memory device of the ISS may be transferred to the system (e.g., eMAR and/or ADM), which may be used to monitor or track the activities of the practitioner.

After extraction of the drug from the drug vial, the practitioner can withdraw the syringe from the vial. In some embodiments, the practitioner may be required to keep on engaging (e.g., pressing) the switch(es) during the extraction of the drug. In such a case, the practitioner may withdraw the syringe from the ISS, and subsequently release (e.g., stop pressing) the switch(es) to close the opening of the ISS. The opening of the ISS may be closed (or sealed) by the reconstructable visual code that is reconstructed again. The first reconstructed visual code and the second reconstructed visual code of the reconstructable visual code may be the same or different. Alternatively or in addition to, the opening of the ISS may be closed by an additional reconstructable visual code of the ISS that is different from the reconstructable visual code of the ISS.

In some embodiments, the practitioner may not be required to keep on engaging the switch(es) during the extraction of the drug. In such a case, the practitioner may withdraw the syringe from the ISS, and subsequently re-engage the switch(es) or one or more different switches to close the opening of the ISS. The opening of the ISS may be closed (or sealed) by the reconstructable visual code that is reconstructed again. The first reconstructed visual code and the second reconstructed visual code of the reconstructable visual code may be the same or different. Alternatively or in addition to, the opening of the ISS may be closed by an additional reconstructable visual code of the ISS that is different from the reconstructable visual code of the ISS.

A functional visual code of the reconstructable visual code of the ISS and an additional functional visual code of the additional reconstructable visual code of the ISS can be the same or different.

Closing (e.g., sealing or locking) of the opening of the ISS subsequent to the withdrawal of the syringe from the vial can prevent a re-entry of the syringe or any subsequent insertion of an additional syringe through the access port (e.g., rubber stopper) of the ISS. After closing of the opening of the ISS subsequent to the drug withdrawal, the practitioner can scan the visual code of the reconstructable visual code of the ISS and/or of the additional reconstructable visual code. Scanning of such visual code that seals the opening of the ISS can (1) mark in the system (e.g., eMAR and/or ADM) that the drug withdrawing process is over, and/or (2) start the clock for a pre-determined time period for the practitioner to return the sealed ISS to a pre-designated location (e.g., ADM).

The practitioner can administer the extracted dose of the drug to the patient. The drug may be injected into a bodily part of the patient. In some cases, such injection may be intradermal, subcutaneous, intramuscular, intravenous (IV), intraosseous, intraperitoneal, intrathecal, epidural, intracardiac, intraarticular, intracavernous, and/or intravitreal. In some cases, the drug may be applied to a pad (e.g., a bandage) that is to be applied and adhere to a bodily surface of the subject. Prior to treating the patient, the practitioner may be required to scan the patient's visual code (e.g., a barcode on the patient's wrist bracelet) to confirm the patient's prescription details. In some cases, the drug may be injected into one or more IV solution bags (e.g., 0.9% Sodium Chloride IV bag). In some cases, the drug may be injected onto and/or into one or more implants (e.g., dental implants, bone grafts or implants, vascular grafts or implants, etc.).

After treating the patient, the practitioner can place the closed (sealed) ISS to a pre-designated location. In some cases, the practitioner can return the sealed ISS back to the ADM and/or a collection machine. The visual code of the sealed ISS may be scanned at the ADM. In some cases, the practitioner can return the sealed ISS to the collection machine, such as an allocated return or security box.

The sealed ISS from the allocated return or security box can be retrieved (e.g., by a pharmacist). The sealed ISS can be returned to an allocated destination (e.g., a central location, such as a main pharmacy) to be scanned (e.g., scanning the visual code) to validate an amount of the access drug left in the drug vial of the ISS, drug contents, and/or the patient to whom the drug was administered to. Such scanning can link the waste of the access drug to the patient in the system (e.g., eMAR and/or ADM).

Figure 1B:
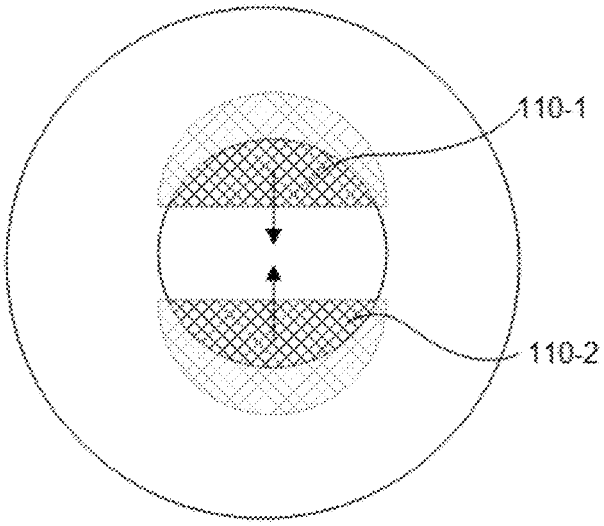
Figure 1C:
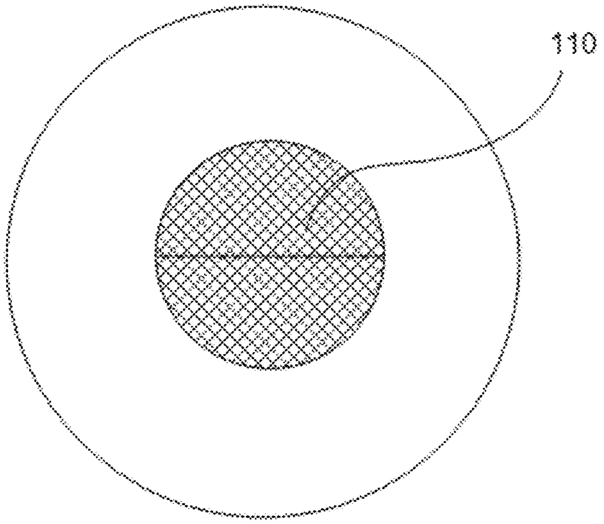

FIGS. 1A-1C schematically illustrate an example of a device 100 comprising a reconstructable visual code 110 with multiple segments. Referring to FIG. 1A, the reconstructable visual code 110 of the device 100 is segmented into two segments: a first segment 110-1 and a second segment 110-2. The first segment 110-1 may be added (e.g., printed, machined, glued) to an entire surface of a first leaflet of the device 100. The second segment 110-2 may be added to an entire surface of a second leaflet of the device 100. The device 100 can further comprise a cover 102 with an opening 104. Prior to reconstruction of the reconstructable visual code 110, the first segment 110-1 and/or the second segment 110-2 of the reconstructable visual code 110 may be "hidden" by (or under) a portion of the cover 102 that is not the opening 104. Thus, a visual scanning system (e.g., a sensor) may not be able to detect a visual code 110 encoded by the reconstructable visual code 110. One or both of the first segment 110-1 and the second segment 110-2 can be operatively coupled to one or more actuation elements (e.g., springs or motors) configured to combine the two segments 110-1 and 110-2. The first and/or second leaflet of the device 100 may be moveable relative to each other (and/or relative to the opening 104). Such movement of the leaflets may be lateral and/or rotational relative to a center of the opening 103. Referring to FIG. 1B, a gap of the two segments 110-1 and 110-2 may be decreased (e.g., by the actuation element(s)) during reconstruction of the reconstructable visual code 110, thereby exposing at least a portion of the first segment 110-1 and/or the second segment 110-2 through the opening 104 of the cover 102. Referring to FIG. 1C, the gap between the two segments 110-1 and 110-2 may be entirely or substantially closed off, such that the reconstructable visual code 110 is reconstructed to reveal the encoded visual code 110 that can be detected by the visual scanning system.

The reconstructable visual code 110 of the device 100 may be segmented into at least about 2, 3, 4, 5, 6, 7, 8, 9, 10, or more segments. The reconstructable visual code 110 of the device 100 may be segmented into at most about 10, 9, 8, 7, 6, 5, 4, 3, or 2 segments. Each segment of the reconstructable visual code 110 may cover at least about 1, 5, 10, 20, 30, 40, 50, 60, 70, 80, 90, or 100 percent (%) of a surface of the leaflet. Each segment of the reconstructable visual code 110 may cover at most about 100, 95, 90, 80, 70, 60, 50, 40, 30, 20, 10, 5, 1, or less % of a surface of the leaflet. The cover 102 may include at least about 1, 2, 3, 4, 5, or more openings configured to expose the visual code that is encoded in the reconstructable visual code 110. The cover 102 may include at most about 5, 4, 3, 2, or 1 opening configured to expose the visual code that is encoded in the reconstructable visual code 110. The opening 104 of the cover 102 may be at least about 1, 5, 10, 20, 30, 40, 50, 60, 70, 80, 90, or more % of an area of the cover 102. The opening 104 of the cover 102 may be at most about 90, 80, 70, 60, 50, 40, 30, 20, 10, 5, 1, or less % of an area of the cover 102. The opening 104 may or may not have an additional cover that shields and/or exposes the opening 104, thereby to shield and/or expose anything that is shown through the opening 104 of the cover 102 (e.g., the reconstructed visual code). When reconstructed, segments of the reconstructable visual code 110 may or may not overlap with each other. At least about 1, 5, 10, 20, 30, 40, 50, 60, 70, 80, 90, or more % of an area of a first segment of the reconstructable visual code 110 may overlap with a second segment of the reconstructable visual code 110. At most about 90, 80, 70, 60, 50, 40, 30, 20, 10, 5, 1, or none of an area of a first segment of the reconstructable visual code 110 may overlap with a second segment of the reconstructable visual code 110. When not overlapping, the sides (e.g., edges) of the segments of the reconstructable visual code 110 may or may not be in contact. The opening 104 of the cover 102 may be hollow. Alternatively, the opening 104 of the cover 102 may be a material that is transparent or semi-transparent, such that any object under the opening 104 may be visible to the naked eye and/or detectable by the visual scanning system.

One or more features or embodiments of the device 100 comprising the reconstructable visual code 110 provided herein may be utilized to generate any of the embodiments of additional devices (e.g., device 200, 300, 400, etc.) provided elsewhere in the present disclosure.

One or more features of the devices comprising the reconstructable visual code, as provided in FIGS. 1-18, may be modified and/or combined to generate new reconstructable visual codes.

Figure 2A:
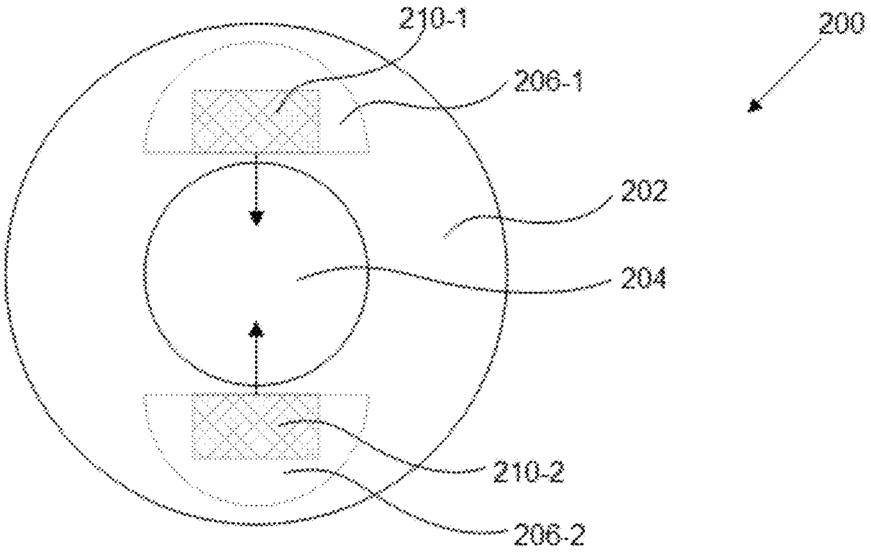
FIGS. 2A-2C schematically illustrate an example of a device comprising a reconstructable visual code with two segments.
Figure 2B:
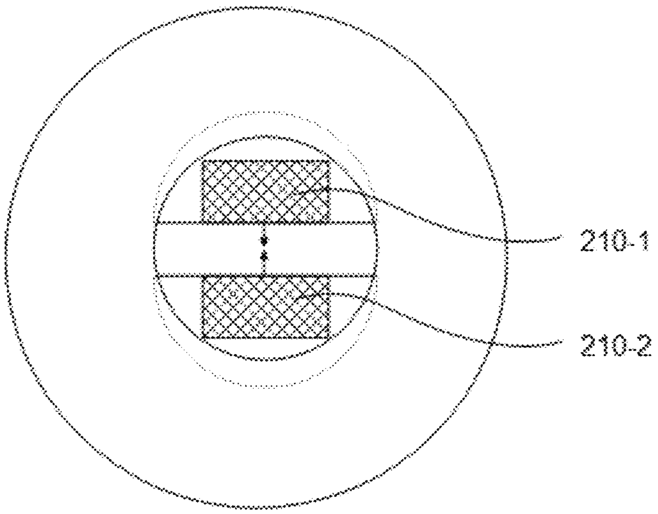
Figure 2C:
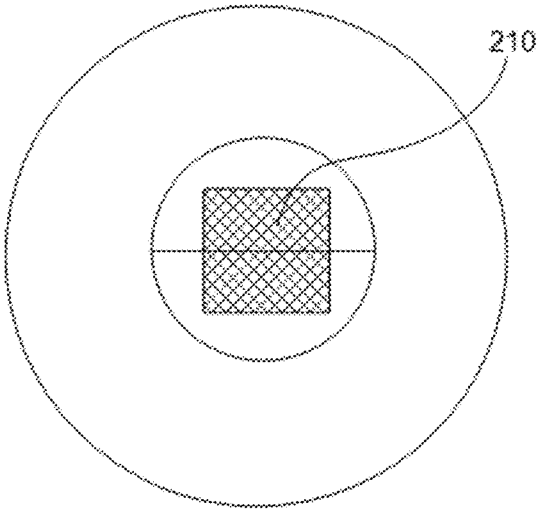

FIGS. 2A-2C schematically illustrate an example of a device 200 comprising a reconstructable visual code 210 with multiple segments. Referring to FIG. 2A, the reconstructable visual code 210 of the device 200 is segmented into two segments: a first segment 210-1 and a second segment 210-2. The first segment 210-1 may be added (e.g., printed, machined, glued) to a portion of a surface of a first leaflet 206-1 of the device 200. The second segment 210-2 may be added to a portion of a surface of a second leaflet 206-2 of the device 200. The device 200 can further comprise a cover 202 with an opening 204. Prior to reconstruction of the reconstructable visual code 210, the first segment 210-1 and/or the second segment 210-2 of the reconstructable visual code 210 may be "hidden" by (or under) a portion of the cover 202 that is not the opening 204. Thus, a visual scanning system (e.g., a sensor) may not be able to detect a visual code encoded 210 by the reconstructable visual code 210. One or both of the first segment 210-1 and the second segment 210-2 can be operatively coupled to one or more actuation elements (e.g., springs or motors) configured to combine the two segments 210-1 and 210-2. The first and/or second leaflet 206-1 and 206-2 may be moveable relative to each other (and/or relative to the opening 204). Referring to FIG. 2B, a gap of the two segments 210-1 and 210-2 may be decreased (e.g., by the actuation element(s)) during reconstruction of the reconstructable visual code 210, thereby exposing at least a portion of the first segment 210-1 and/or the second segment 210-2 through the opening 204 of the cover 202. Referring to FIG. 2C, the gap between the two segments 210-1 and 210-2 may be entirely or substantially closed off, such that the reconstructable visual code 210 is reconstructed to reveal the encoded visual code 210 that can be detected by the visual scanning system.

Figure 2D:
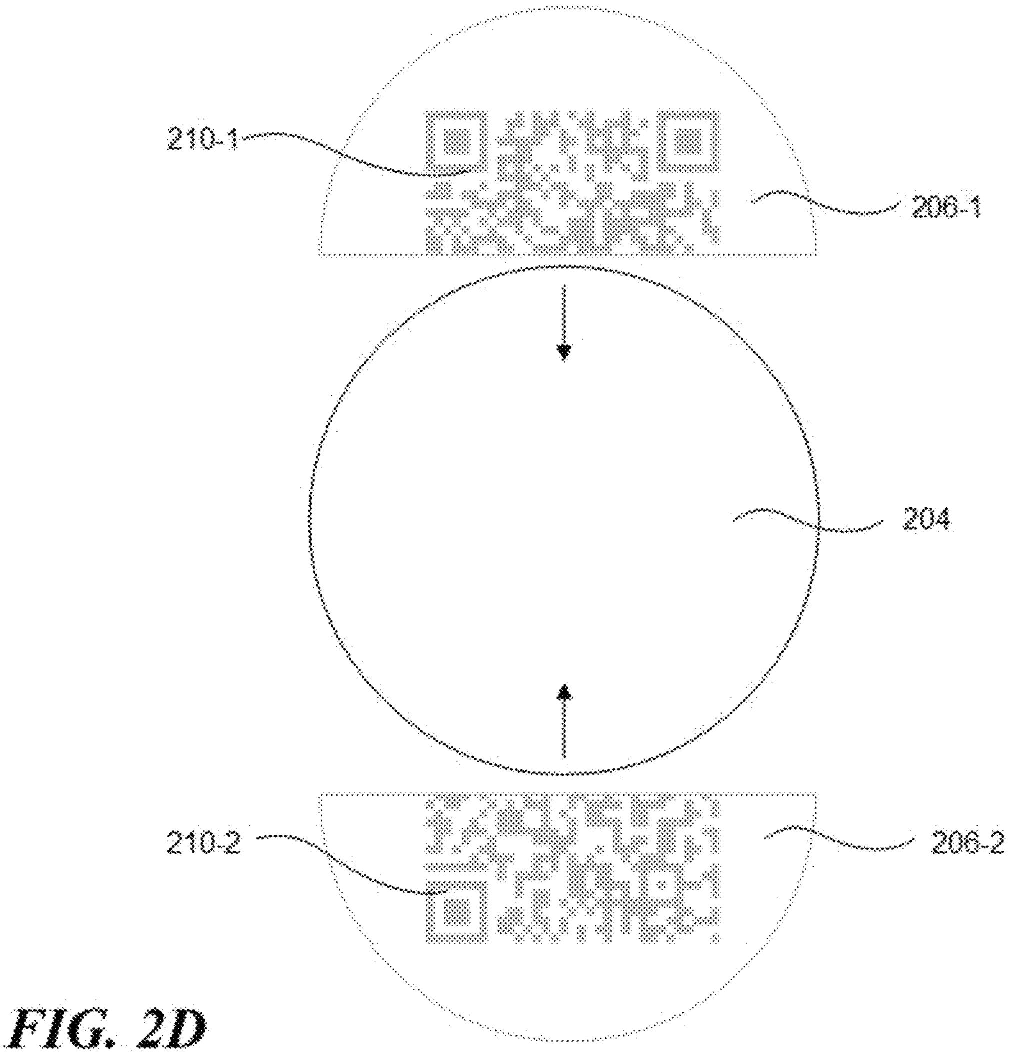
FIGS. 2D and 2E schematically illustrate another example of the device comprising a reconstructable matrix code with two segments.
Figure 2E:
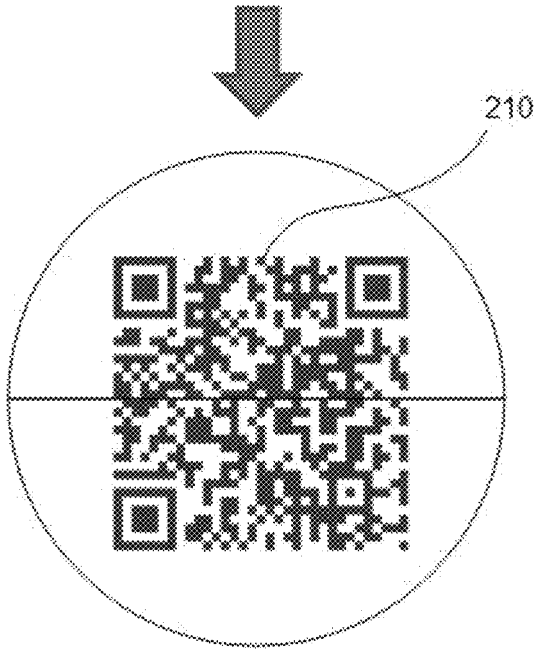

FIGS. 2D and 2E schematically illustrate another example of the device 200 comprising a reconstructable visual code 210 with multiple segments. Referring to FIG. 2D, the visual code 210 encoded by the first and second segments 210-1 and 210-2 can be a matrix visual code, such as a QR code. The first and second segments 210-1 and 210-2 of the QR code may be outside of the view through the opening 204 of the cover 202 of the device 200. Referring to FIG. 2E, the gap between the two segments 210-1 and 210-2 of the QR code may be entirely or substantially closed off, such that the reconstructable visual code 210 is reconstructed to reveal the encoded QR code 210 that can be detected by the visual scanning system (e.g., a camera of a personal device, such as, for example, a mobile device).

Figure 3A:
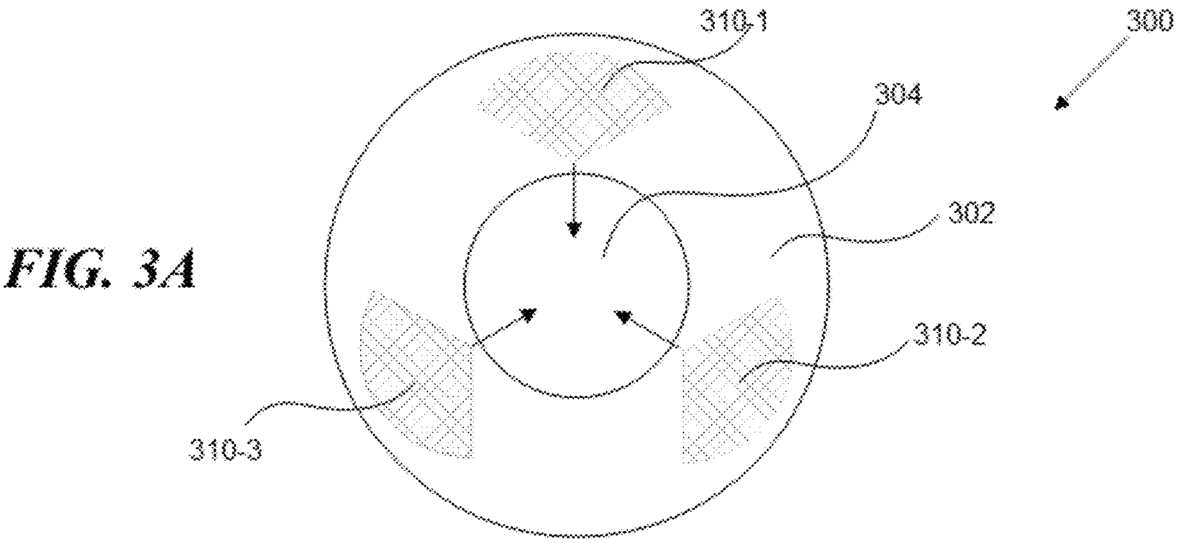
FIGS. 3A-3C schematically illustrate an example of a device comprising a reconstructable visual code with three segments.
Figure 3B:
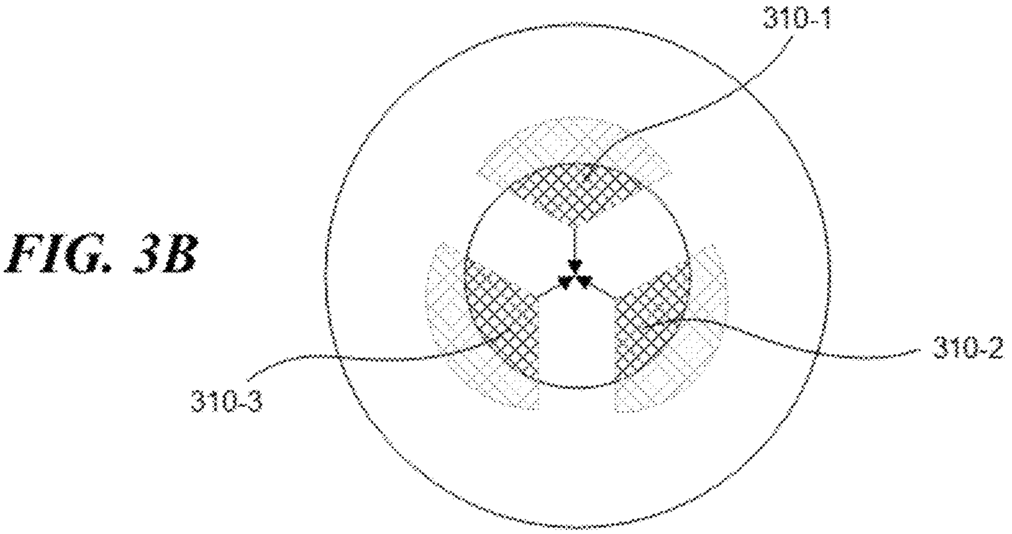
Figure 3C:
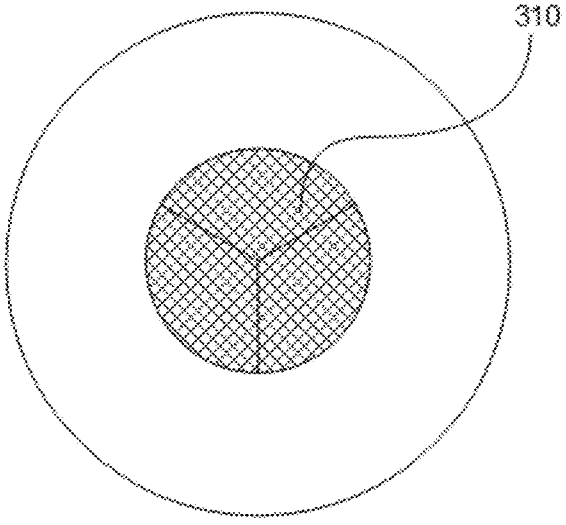

FIGS. 3A-3C schematically illustrate an example of a device 300 comprising a reconstructable visual code 310 with multiple segments. Referring to FIG. 3A, the reconstructable visual code 310 of the device 300 is segmented into three segments: a first segment 310-1, a second segment 310-2, and a third segment 310-3. The first segment 310-1 may be added (e.g., printed, machined, glued) to an entire surface of a first leaflet of the device 300. The second segment 310-2 may be added to an entire surface of a second leaflet of the device 300. The third segment 310-3 may be added to an entire surface of a third leaflet of the device 300. The device 300 can further comprise a cover 302 with an opening 304. Prior to reconstruction of the reconstructable visual code 310, the first segment 310-1, the second segment 310-2, and/or the third segment 310-3 of the reconstructable visual code 310 may be "hidden" by (or under) a portion of the cover 302 that is not the opening 304. Thus, a visual scanning system (e.g., a sensor) may not be able to detect a visual code 310 encoded by the reconstructable visual code 310. At least one of the first, second, and third segments 310-1, 310-2, and 310-3 can be operatively coupled to one or more actuation elements (e.g., springs or motors) configured to combine the three segments 310-1, 310-2, and 310-3. The first, second, and/or third leaflet of the device 300 may be moveable relative to each other (and/or relative to the opening 304). Referring to FIG. 3B, a gap among the three segments 310-1, 310-2, and 310-3 may be decreased (e.g., by the actuation element(s)) during reconstruction of the reconstructable visual code 310, thereby exposing at least a portion of the first segment 310-1, second segment 310-2, and/or the third segment 310-3 through the opening 304 of the cover 302. Referring to FIG. 3C, the gap among the three segments 310-1, 310-2, and 310-3 may be entirely or substantially closed off, such that the reconstructable visual code 310 is reconstructed to reveal the encoded visual code 310 that can be detected by the visual scanning system.

Figure 4A:
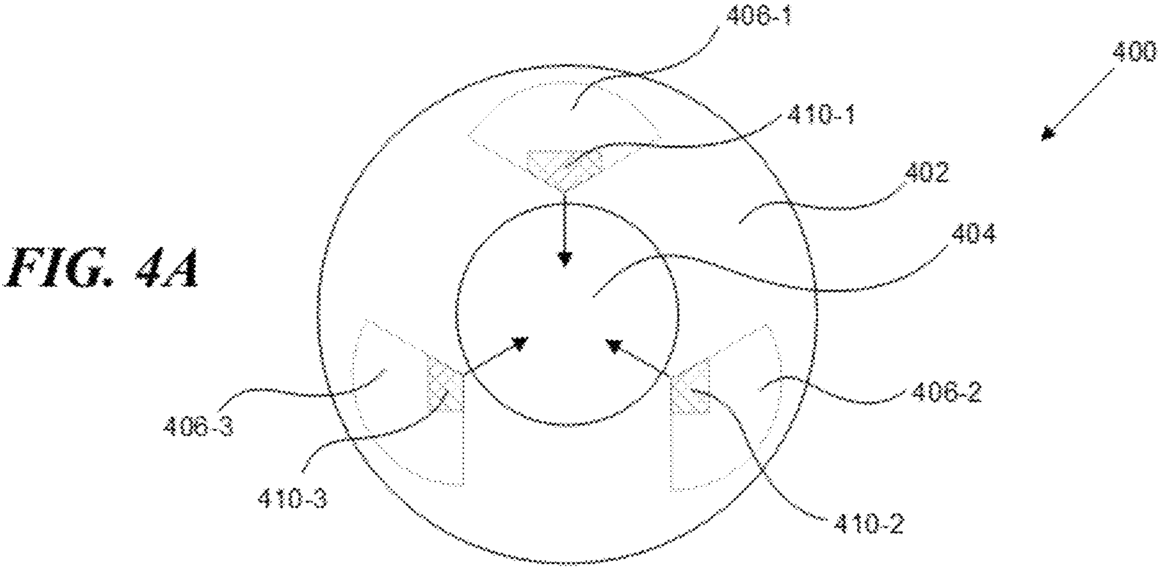
FIGS. 4A-4C schematically illustrate another example of a device comprising a reconstructable visual code with three segments.
Figure 4B:
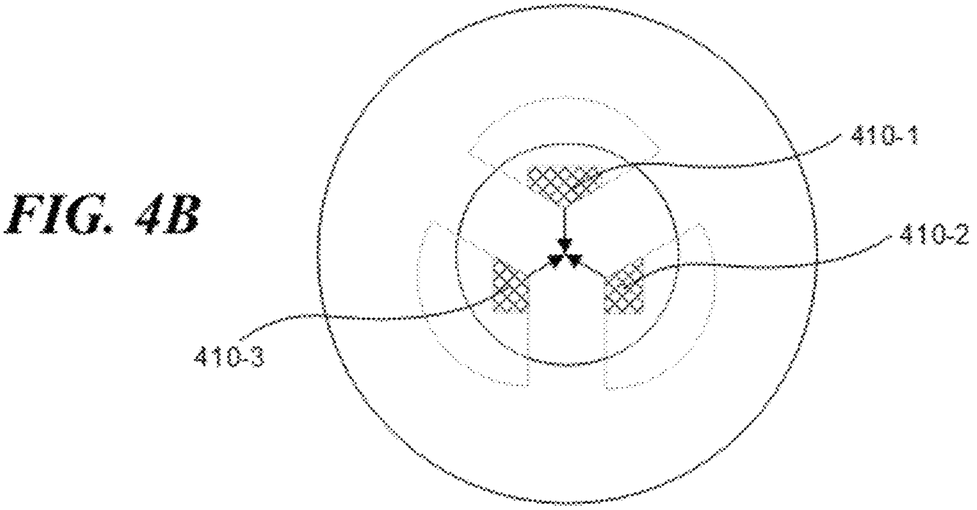
Figure 4C:
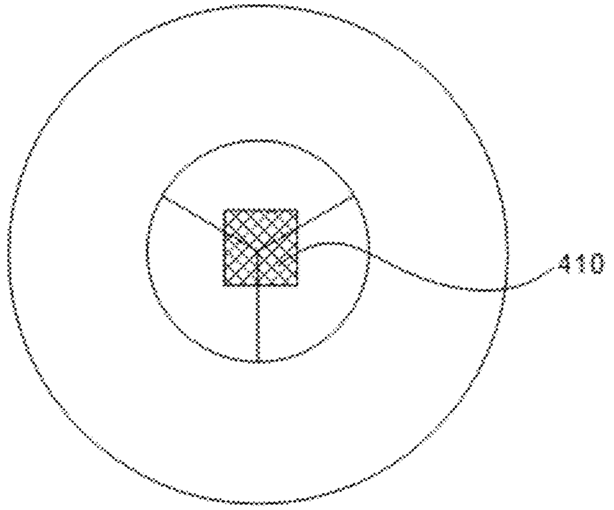

FIGS. 4A-4C schematically illustrate an example of a device 400 comprising a reconstructable visual code 410 with multiple segments. Referring to FIG. 4A, the reconstructable visual code 410 of the device 400 is segmented into three segments: a first segment 410-1, a second segment 410-2, and a third segment 410-3. The first segment 410-1 may be added (e.g., printed, machined, glued) to a portion of a surface of a first leaflet 406-1 of the device 400. The second segment 410-2 may be added to a portion of a surface of a second leaflet 406-2 of the device 400.

The third segment 410-3 may be added to a portion of a surface of a third leaflet 406-3 of the device 400. The device 400 can further comprise a cover 402 with an opening 404. Prior to reconstruction of the reconstructable visual code 410, the first segment 410-1, the second segment 410-2, and/or the third segment 410-3 of the reconstructable visual code 410 may be "hidden" by (or under) a portion of the cover 402 that is not the opening 404. Thus, a visual scanning system (e.g., a sensor) may not be able to detect a visual code encoded 410 by the reconstructable visual code 410. At least one of the first, second, and third segments 410-1, 410-2, and 410-3 can be operatively coupled to one or more actuation elements (e.g., springs or motors) configured to combine the three segments 410-1, 410-2, and 410-3. The first, second, and/or third leaflet 406-1, 406-2, and/or 406-3 of the device 400 may be moveable relative to each other (and/or relative to the opening 404). Referring to FIG. 4B, a gap among the three segments 410-1, 410-2, and 410-3 may be decreased (e.g., by the actuation element(s)) during reconstruction of the reconstructable visual code 410, thereby exposing at least a portion of the first segment 410-1, second segment 410-2, and/or the third segment 410-3 through the opening 404 of the cover 402. Referring to FIG. 4C, the gap among the three segments 410-1, 410-2, and 410-3 may be entirely or substantially closed off, such that the reconstructable visual code 410 is reconstructed to reveal the encoded visual code 410 that can be detected by the visual scanning system.

Figure 4D:
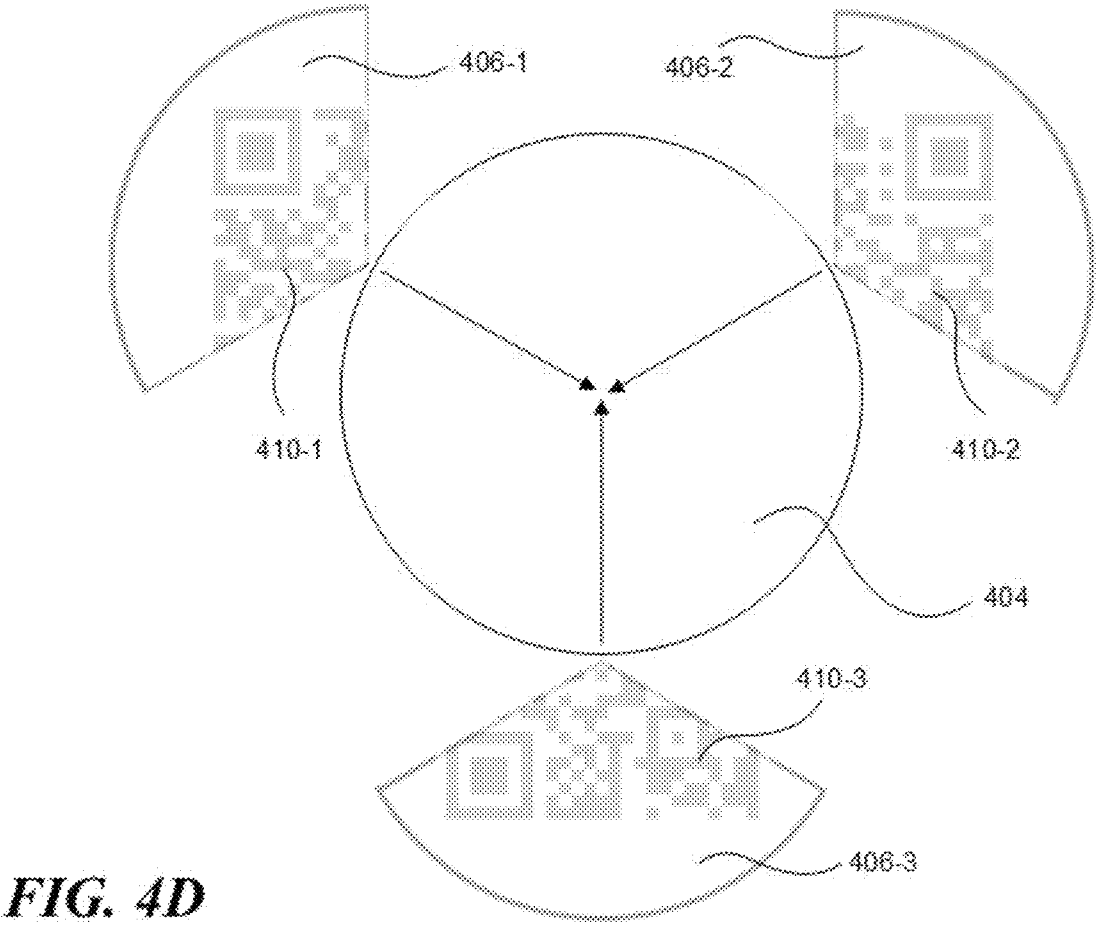
FIGS. 4D and 4E schematically illustrate a different example of the device comprising a reconstructable matrix code with three segments.
Figure 4E:
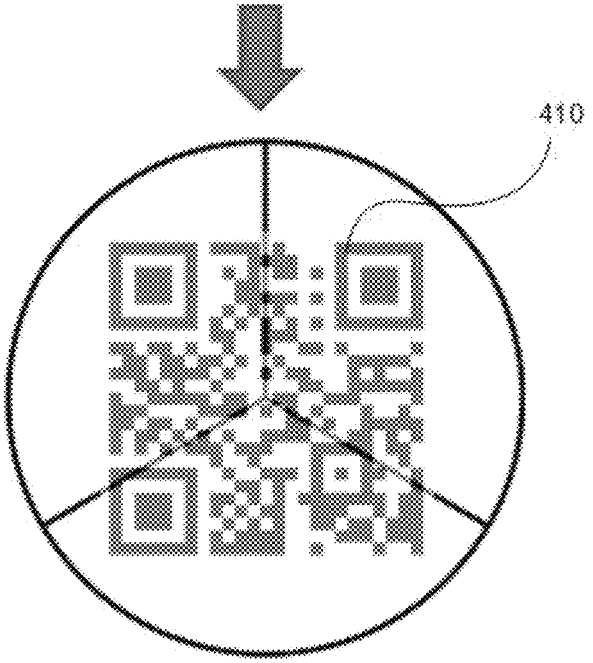

FIGS. 4D and 4E schematically illustrate another example of the device 400 comprising a reconstructable visual code 410 with multiple segments. Referring to FIG. 4D, the visual code 410 encoded by the first, second, and third segments 410-1, 410-2, and 410-3 can be a matrix visual code, such as a QR code. At least one of the first, second, and third segments 410-1, 410-2, and 410-3 of the QR code may be outside of the view through the opening 404 of the cover 402 of the device 400. Referring to FIG. 4E, a gap among the three segments 410-1, 410-2, and 410-3 of the QR code may be entirely or substantially closed off, such that the reconstructable visual code 410 is reconstructed to reveal the encoded QR code 410 that can be detected by the visual scanning system (e.g., a camera of a personal device, such as, for example, a mobile device).

Figure 5A:
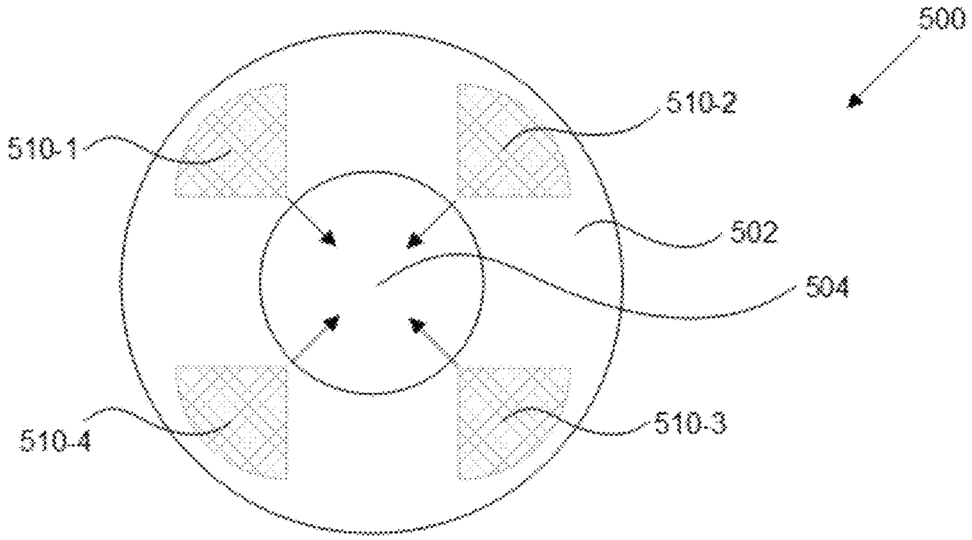
FIGS. 5A-5C schematically illustrate an example of a device comprising a reconstructable visual code with four segments.
Figure 5B:
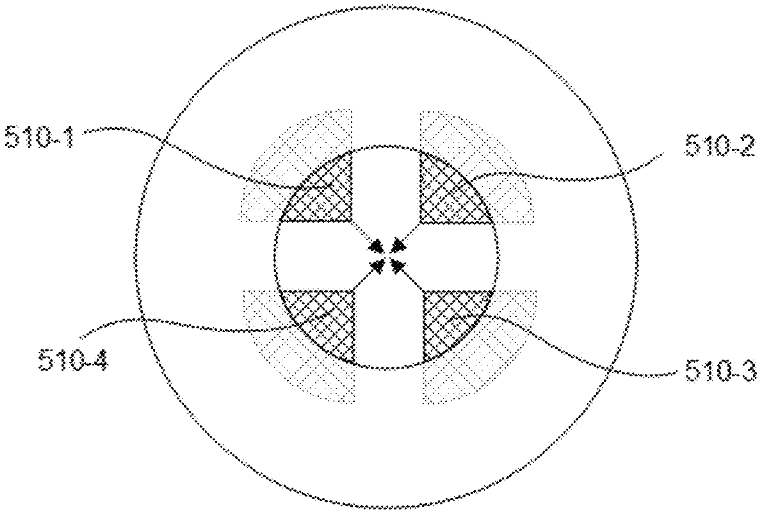
Figure 5C:
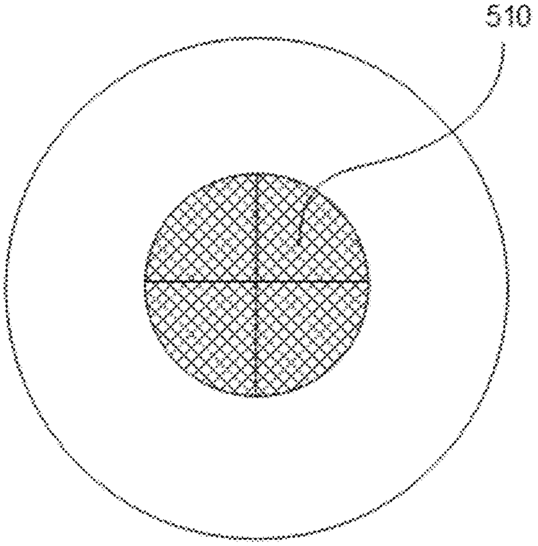

FIGS. 5A-5C schematically illustrate an example of a device 500 comprising a reconstructable visual code 510 with multiple segments. Referring to FIG. 5A, the reconstructable visual code 510 of the device 500 is segmented into four segments: a first segment 510-1, a second segment 510-2, a third segment 510-3, and a fourth segment 510-4. The first segment 510-1 may be added (e.g., printed, machined, glued) to at least a portion of a surface of a first leaflet of the device 500. The second segment 510-2 may be added to at least a portion of a surface of a second leaflet of the device 500. The third segment 510-3 may be added to at least a portion of a surface of a third leaflet of the device 500. The fourth segment 510-4 may be added to at least a portion of a surface of a fourth leaflet of the device 500. The device 500 can further comprise a cover 502 with an opening 504. Prior to reconstruction of the reconstructable visual code 510, the first segment 510-1, the second segment 510-2, the third segment 510-3, and/or the fourth segment 510-4 of the reconstructable visual code 510 may be "hidden" by (or under) a portion of the cover 502 that is not the opening 504. Thus, a visual scanning system (e.g., a sensor) may not be able to detect a visual code encoded 510 by the reconstructable visual code 510. At least one of the first, second, third, and third segments 510-1, 510-2, 510-3, and 510-4 can be operatively coupled to one or more actuation elements (e.g., springs or motors) configured to combine the four segments 510-1, 510-2, 510-3, and 510-4. The first, second, third, and/or fourth leaflet of the device 400 may be moveable relative to each other (and/or relative to the opening 504). Referring to FIG. 5B, a gap among the four segments 510-1, 510-2, 510-3, and 510-4 may be decreased (e.g., by the actuation element(s)) during reconstruction of the reconstructable visual code 510, thereby exposing at least a portion of the first segment 510-1, second segment 510-2, the third segment 510-3, and/or the fourth segment 510-4 through the opening 504 of the cover 502. Referring to FIG. 5C, the gap among the four segments 510-1, 510-2, 510-3, and 510-4 may be entirely or substantially closed off, such that the reconstructable visual code 510 is reconstructed to reveal the encoded visual code 510 that can be detected by the visual scanning system.

Figure 6A:
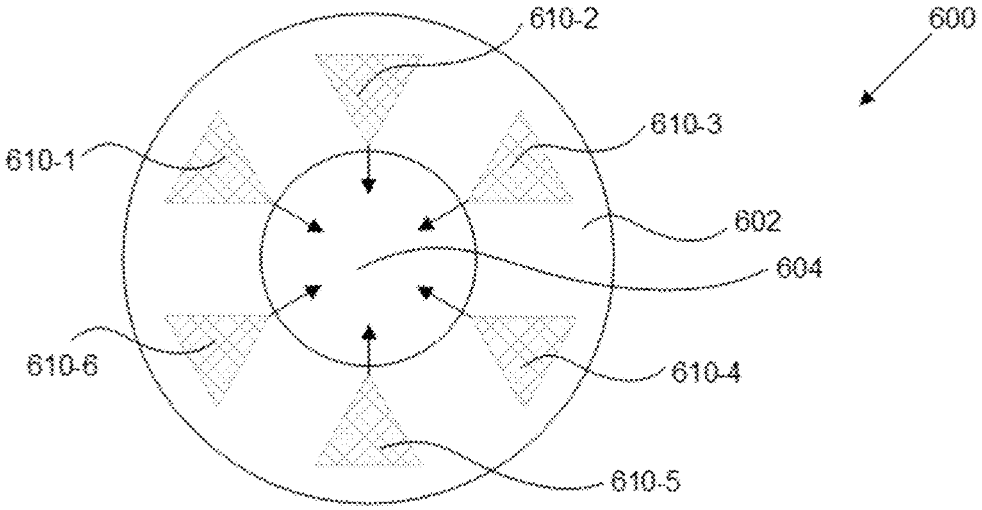
FIGS. 6A-6C schematically illustrate an example of a device comprising a reconstructable visual code with six segments.
Figure 6B:
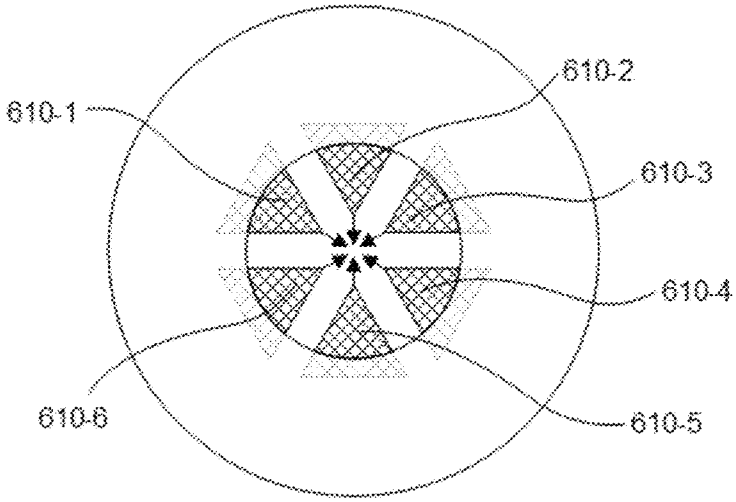
Figure 6C:
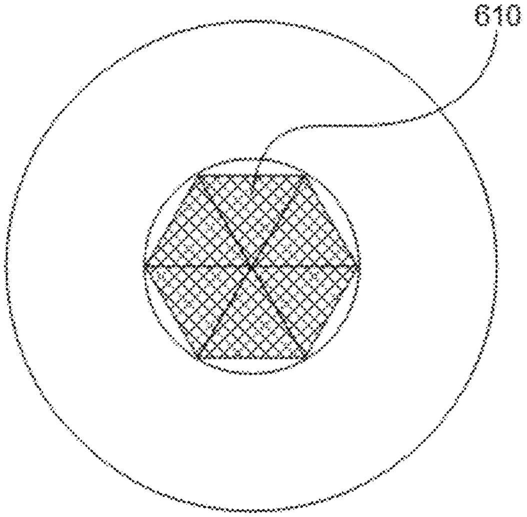

FIGS. 6A-6C schematically illustrate an example of a device 600 comprising a reconstructable visual code 610 with multiple segments. Referring to FIG. 6A, the reconstructable visual code 610 of the device 600 is segmented into six segments: a first segment 610-1, a second segment 610-2, a third segment 610-3, a fourth segment 610-4, a fifth segment 610-5, and a sixth segment 610-6. Each of the six segments 610-1, 610-2, 610-3, 610-4, 610-5, and 610-6 may be added (e.g., printed, machined, glued) to at least a portion of a surface of a respective leaflet of the device 600. The device 600 can further comprise a cover 602 with an opening 604. Prior to reconstruction of the reconstructable visual code 610, the first, second, third, fourth, fifth, and/or sixth segment 610-1, 610-2, 610-3, 610-4, 610-5, and/or 610-6 of the reconstructable visual code 610 may be "hidden" by (or under) a portion of the cover 602 that is not the opening 604. Thus, a visual scanning system (e.g., a sensor) may not be able to detect a visual code encoded 610 by the reconstructable visual code 610. At least one of the first, second, third, fourth, fifth, and sixth segment 610-1, 610-2, 610-3, 610-4, 610-5, and 610-6 can be operatively coupled to one or more actuation elements (e.g., springs or motors) configured to combine the six segments 610-1, 610-2, 610-3, 610-4, 610-5, and/or 610-6. The first, second, third, fourth, fifth, and/or sixth leaflet of the device 600 may be moveable relative to each other (and/or relative to the opening 604). Referring to FIG. 6B, a gap among the six segments 610-1, 610-2, 610-3, 610-4, 610-5, and 610-6 may be decreased (e.g., by the actuation element(s)) during reconstruction of the reconstructable visual code 610, thereby exposing at least a portion of the first, second, third, fourth, fifth, and/or sixth segment 610-1, 610-2, 610-3, 610-4, 610-5, and/or 610-6 through the opening 604 of the cover 602. Referring to FIG. 6C, the gap among the six segments 610-1, 610-2, 610-3, 610-4, 610-5, and 610-6 may be entirely or substantially closed off, such that the reconstructable visual code 610 is reconstructed to reveal the encoded visual code 610 that can be detected by the visual scanning system.

Figure 7A:
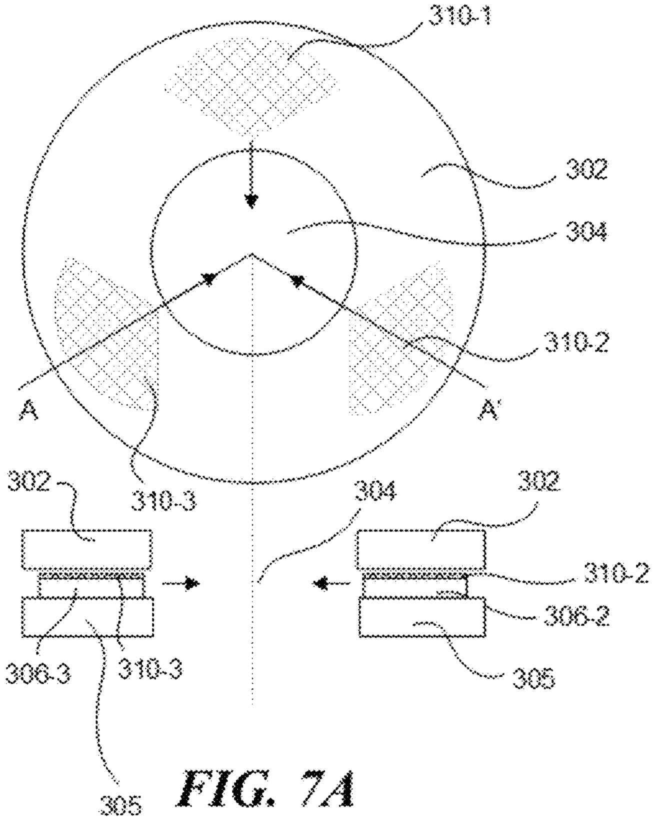
FIGS. 7A-7C schematically illustrate top and side views of a device comprising a reconstructable visual code with three segments, FIG. 8A-8B schematically illustrate an example of a device comprising a reconstructable visual code with two segments.
Figure 7B:
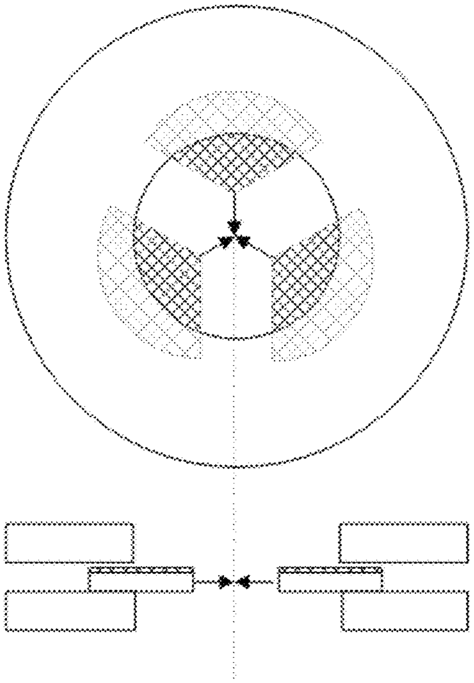
Figure 7C:
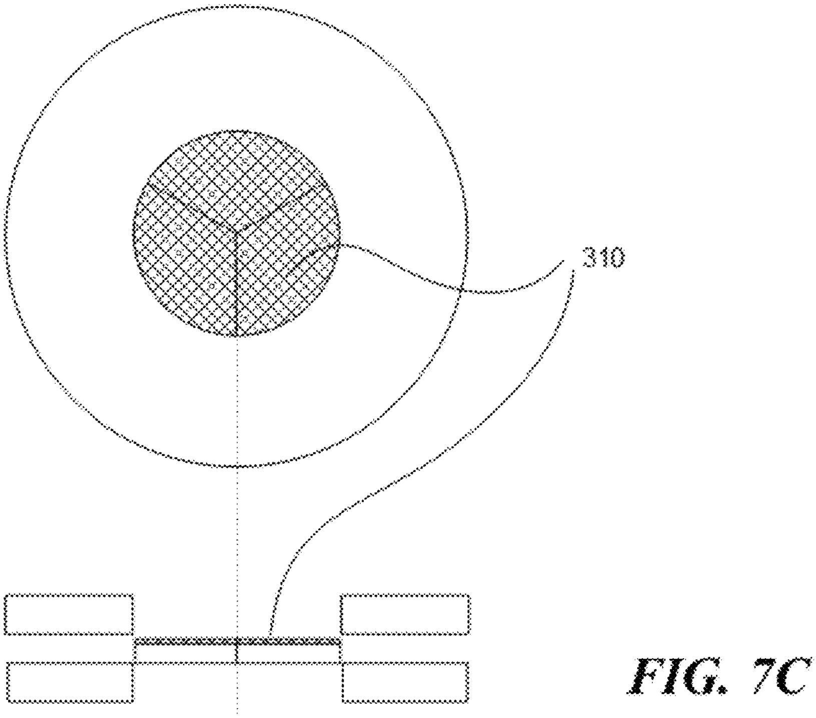

FIGS. 7A-7C schematically illustrate top and side views of the device 300 comprising a reconstructable visual code 310 with three segments 310-1, 310-2, and 310-3. Referring to FIG. 7A, the three segments 310-1, 310-2, and 310-3 are disposed adjacent to or on at least a portion of a surface of three leaflets 306-1, 306-2, and 306-3, respectively. Each of the leaflets 306-1, 306-2, and 306-3 that carries each of the three segments 310-1, 310-2, and 310-3, respectively, can be movable relative to each other, relative to the opening 304 of the cover 302, and/or relative to a plate 305 of the device 300. The plate 305 may have an opening (e.g., a ring-shaped plate) that aligns with the opening 304 of the cover 302. Alternatively, in some cases, the plate 305 may not have an opening that aligns with the opening 304 of the cover 302. Referring to FIG. 7B, the gap among the three segments 310-1, 310-2, and 310-3 may be decreased (e.g., by the actuation element(s)) during reconstruction of the reconstructable visual code 310, thereby exposing at least a portion of the first, second, and/or third segments 310-1, 310-2, and/or 310-3 through the opening 304 of the cover 302. Referring to FIG. 7C, the gap among the three segments 310-1, 310-2, and 310-3 may be entirely or substantially closed off, such that the reconstructable visual code 310 is reconstructed to reveal the encoded visual code 310 that can be detected by the visual scanning system. The three segments 310-1, 310-2, and 310-3 may converge at a center of the opening 304 of the cover 302.

Figure 8A:
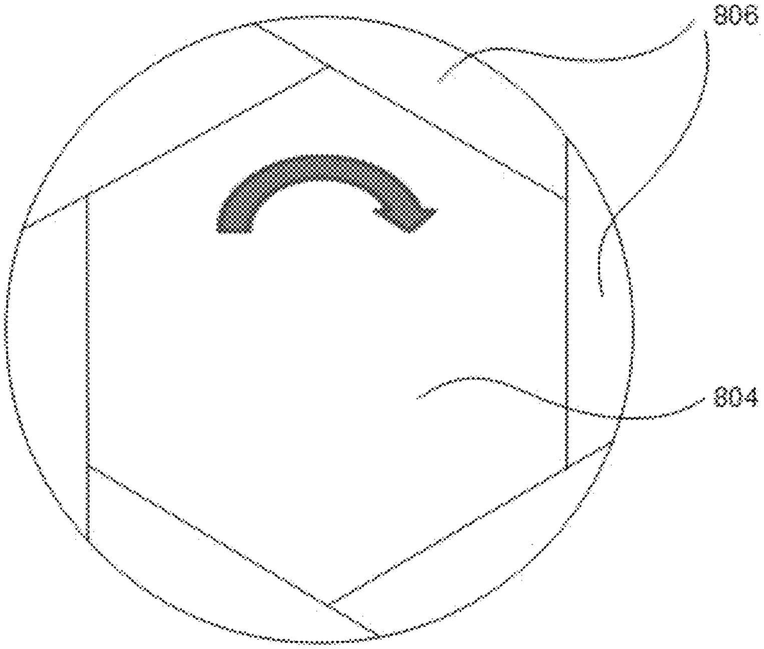
Figure 8B:
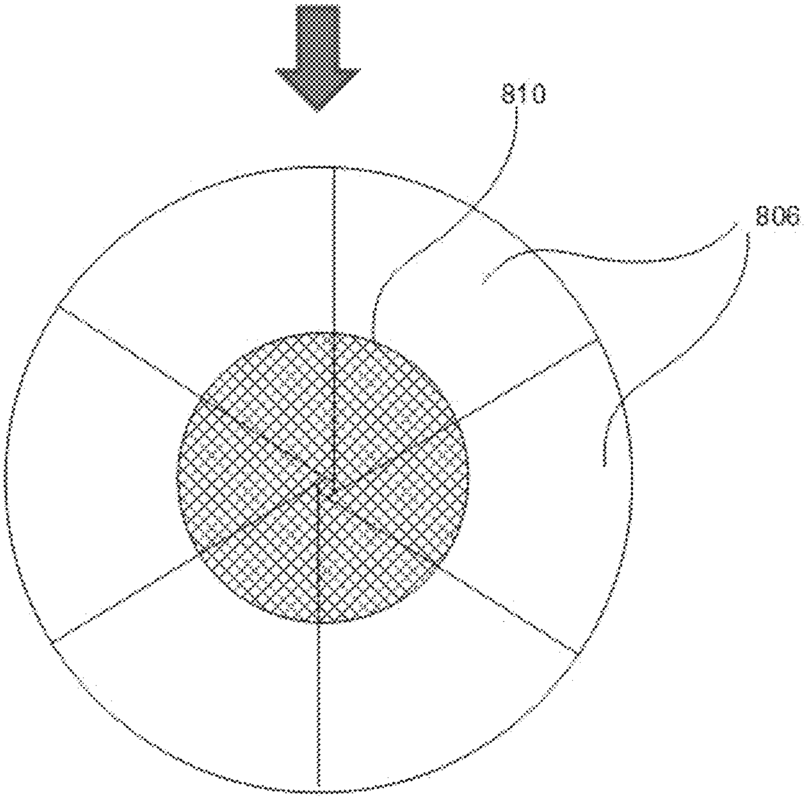

FIG. 8A-8B schematically illustrate an example of a device 800 comprising a reconstructable visual code with six segments. Referring to FIG. 8A, the device 800 comprises six leaflets 806, each of which carries one of the six segments of the reconstructable visual code. Prior to reconstruction of the visual code, at least one of the six leaflets 806 are disposed (e.g., under a cover of the device 800), such that at least one of the six segments of the reconstructable visual code may be "hidden" and out be detectable through the opening of the cover. The six leaflets 806 may be configured to rotate towards a center of the opening 804, such that, referring to FIG. 8B, the six leaflets may be brought together and the reconstructable visual code is reconstructed to reveal the encoded visual code 810. Movement (e.g., rotation) of the leaflets of the device 800 required to reconstruct the visual code 810 may be similar to an iris diaphragm of an aperture of a camera.

Figure 9:
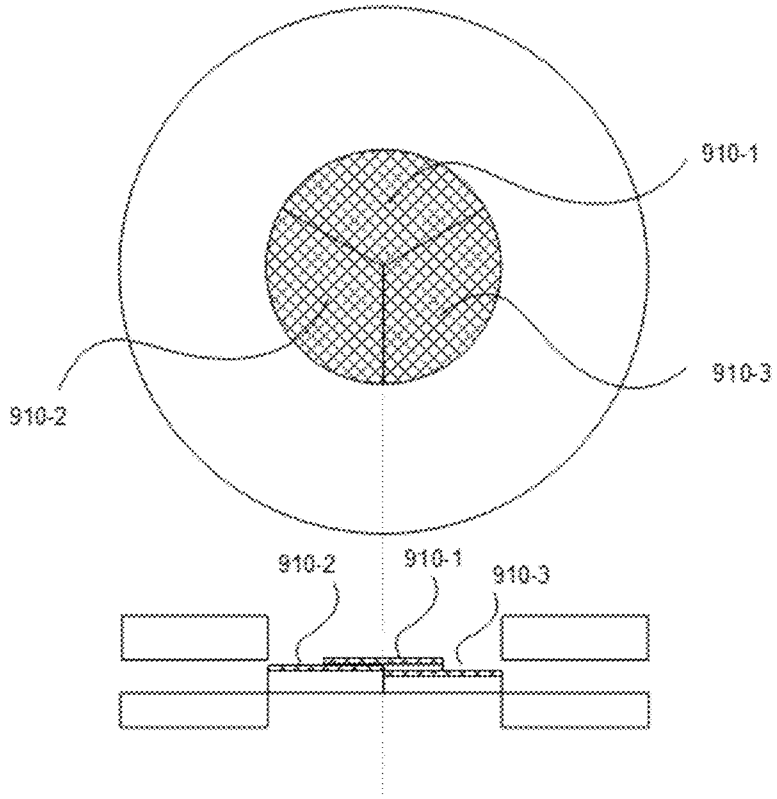
FIG. 9 schematically illustrates top and side views of a device comprising a reconstructable visual code with three partially overlapping segments.

FIG. 9 schematically illustrates top and side views of a device 900 comprising a reconstructable visual code with three partially overlapping segments 910-1, 910-2, and 910-3. At least two of the three (e.g., two or three) of the segments 910-1, 910-2, and 910-3 of the reconstructable visual code may be on different horizontal planes to allow at least a partial overlap with one another. When the visual code 910 is reconstructed, at least one of the three segments 910-1, 910-2, and 910-3 may overlap with one of the other remaining segments (e.g., segment 910-2 and/or segment 910-3). As illustrated in FIG. 9, a portion of the first segment 910-1 of the visual code may overlap with a portion of the second segment 910-2 of the visual code. Additionally, an additional portion of the first segment 910-1 of the visual code may overlap with a portion of the third segment 910-3 of the visual code. In some cases, the first segment 910-1 of the visual code may not be transparent or semitransparent. Additionally, a first leaflet that is carrying the first segment 910-1 may not be transparent or semitransparent. In such a case, the portion of the second segment 910-2 and the third segment 910-3 that are overlapping with the first segment 910-1 may not be visible through the first segment 910-1. Thus, a unique pattern of the device 900 may be a combination of the exposed surfaces of the three segments 910-1, 910-2, and 910-3. Any portion of any of the three segments 910-1, 910-2, and 910-3 that is disposed under another segment may be excluded from the unique pattern of the exposed surfaces.

Referring to FIG. 9, in some cases, the first segment 910-1 of the visual code may be transparent or semitransparent. Additionally, a first leaflet that is carrying the first segment 910-1 may be transparent or semitransparent. As illustrated, the portion of the second segment 910-2 and the third segment 910-3 that are overlapping with the first segment 910-1 may be visible through the first segment 910-1. Such overlap of the segments 910-1, 910-2, and 910-3 may generate a unique pattern that may be detected by a visual scanning system.

Figure 10:
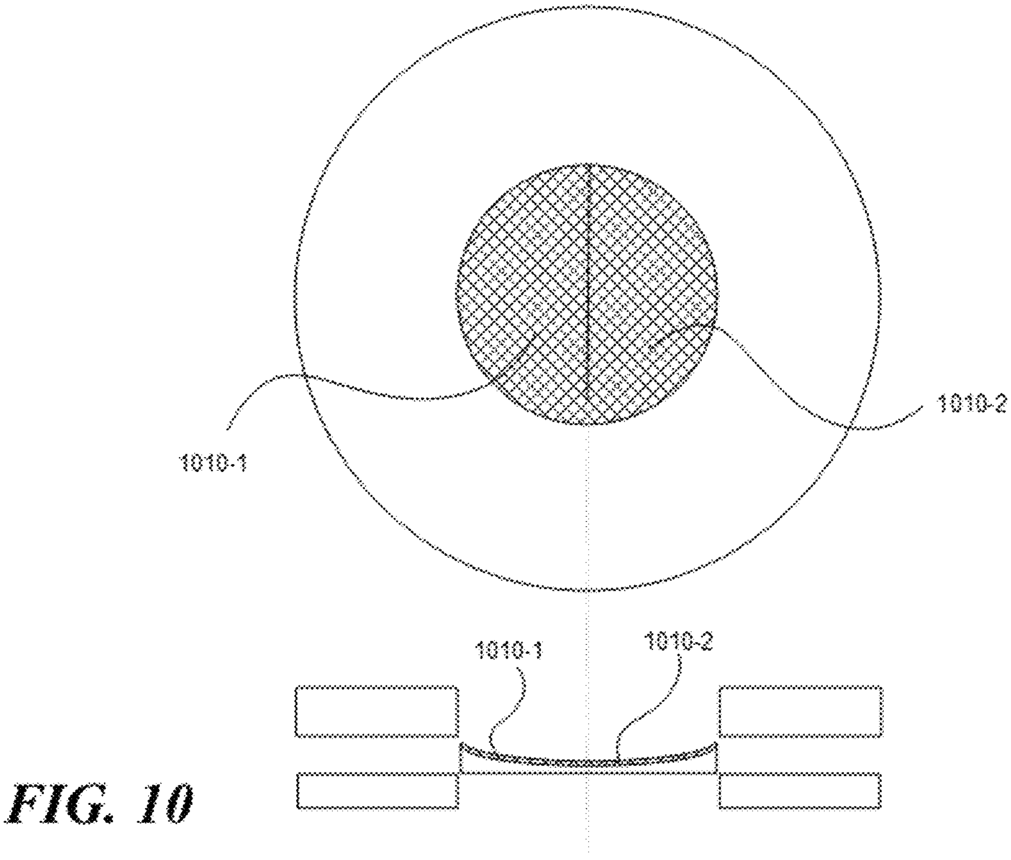
FIG. 10 schematically illustrates an example of a device comprising a 3D reconstructable visual code with multiple segments.

FIG. 10 schematically illustrates top and side views of a device 1000 comprising a 3D reconstructable visual code with multiple segments. The reconstructable visual code of the device 1000 may include two segments 1010-1 and 1010-2. One or both of the two segments 1010-1 and 1010-2 may have a 3D pattern corresponding to the 3D reconstructable visual code. Thus, reconstruction of the two segments may create a unique 3D pattern 1010 that may be detected by a visual scanning system. In some cases, a non-planar aspect of the 3D pattern 1010 may provide an additional "dimension" or aspect of information that is detectable by the visual scanning system.

Referring to FIG. 10, in some cases, the curved structure of the segments 1010-1 and 1010-2 may be due to structural design of the leaflets that are carrying each of the segments, respectively, and the non-planar aspect of the 3D pattern 1010 may not provide any additional "dimension" or aspect of information that is detectable by the visual scanning system. As such, in certain examples, the reconstructable visual code may be applicable to both flat and non-flat surfaces without affecting integrity of the visual code.

Figure 11A:
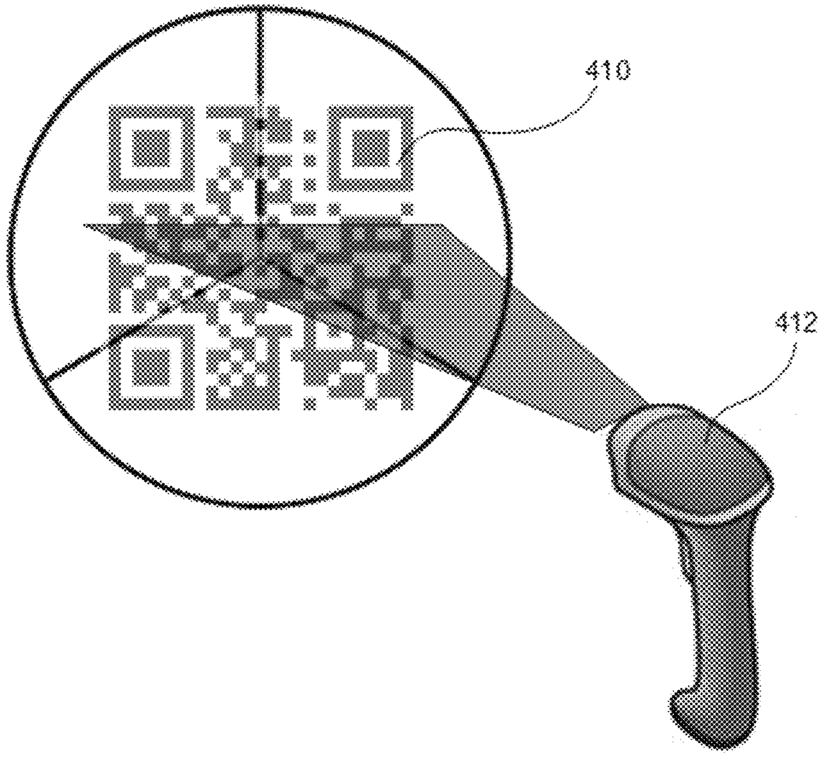
FIGS. 11A and 11B schematically illustrates detection of a unique pattern of a reconstructable visual code of a device with a visual scanning system.

FIG. 11A schematically illustrates using a visual scanning system 412 to detect a unique pattern of the reconstructable visual code 410. In some cases, a plurality of segments (e.g., 3 segments) of the reconstructable visual code 410 may be combined to generate a unique pattern encoded by the reconstructable visual code 410. The unique pattern may be a QR code, and the visual scanning system 412 may be a handheld QR reader/scanner.

Figure 11B:
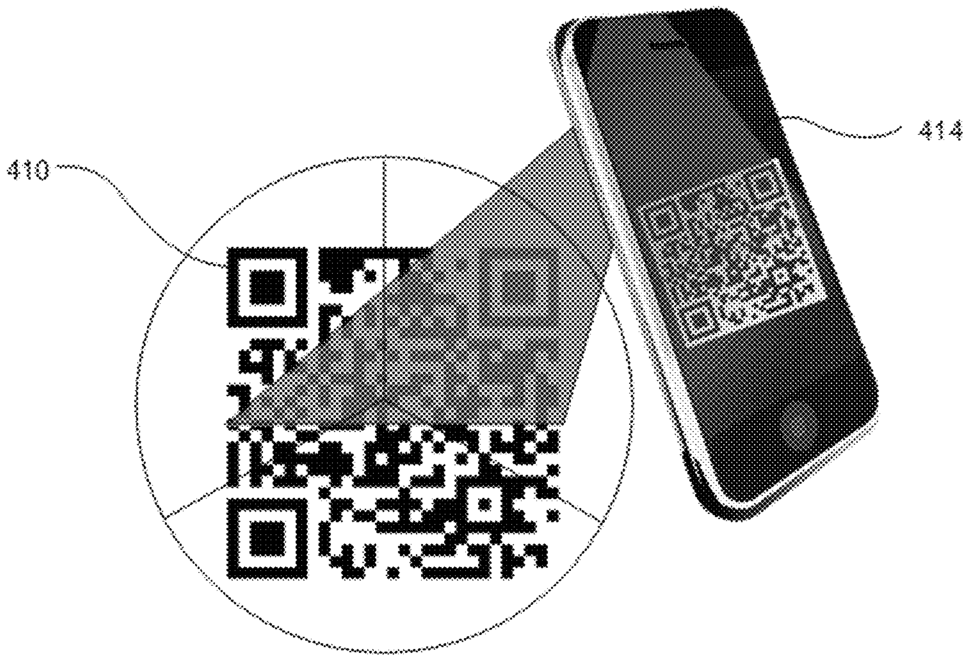

FIG. 11B schematically illustrates using a user's personal device 414 to detect a unique pattern of the reconstructable visual code 410. In some cases, a plurality of segments (e.g., 3 segments) of the reconstructable visual code 410 may be combined to generate a unique pattern encoded by the reconstructable visual code 410. The unique pattern may be a QR code, and one or more cameras of the personal device 414 (e.g., a mobile device) may be used to detect the QR code. A screen and user interface of the personal device 414 may be used to visualize the detected QR code in real time.

Figure 12A:
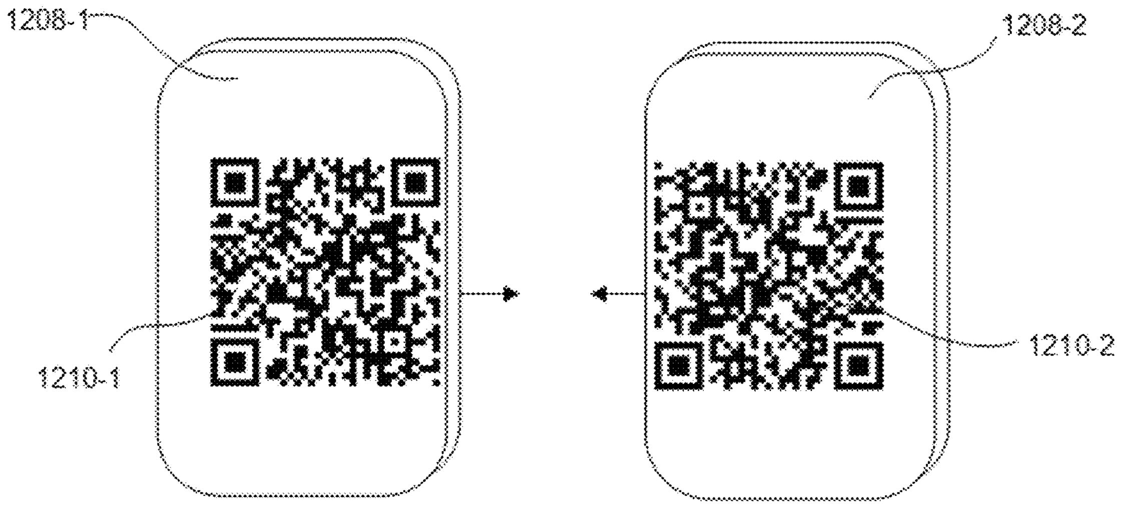
FIGS. 12A and 12B schematically illustrates detection of a unique pattern of a reconstructable visual code of multiple devices with a visual scanning system.
Figure 12B:
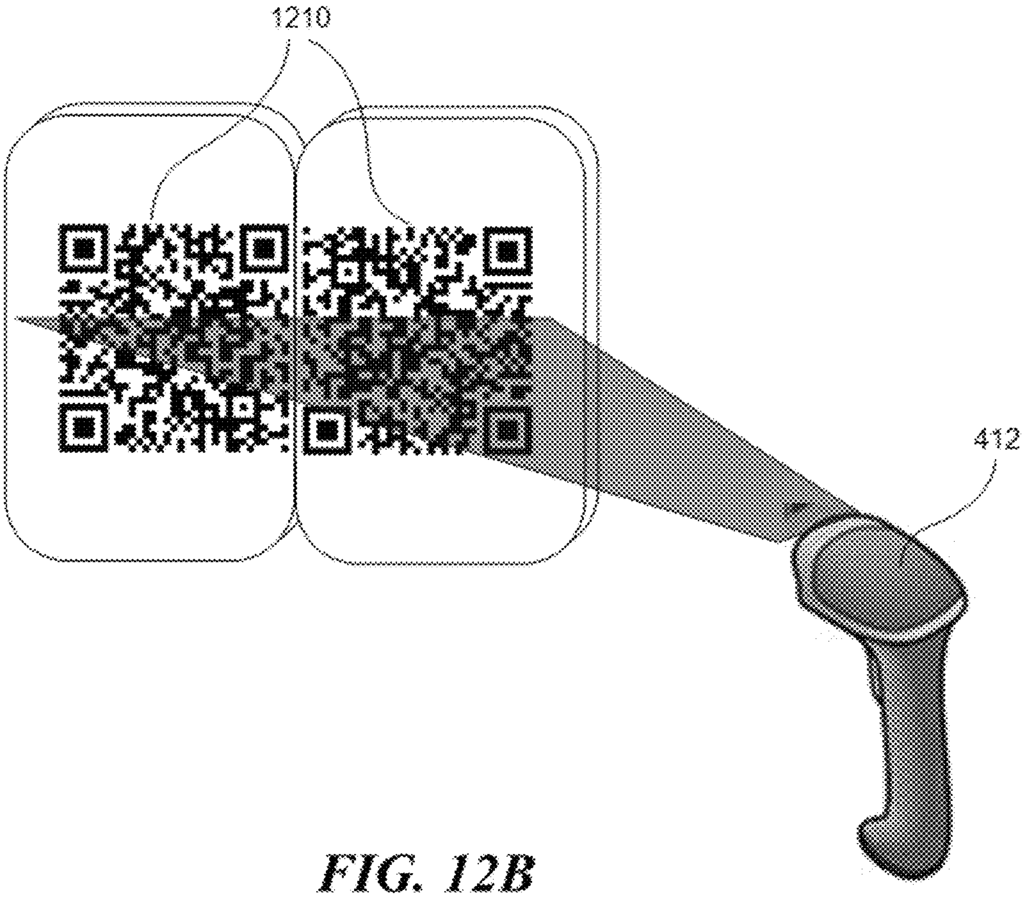

FIGS. 12A and 12B schematically illustrates detection of a unique pattern of a reconstructable visual code 1210 of multiple devices 1200 with the visual scanning system 412. The reconstructable visual code 1210 may be segmented and added (e.g., printed, machined, glued, etc.) to a plurality of devices. The reconstructable visual code 1210 may be segmented and added to at least 2, 3, 4, 5, 6, 7, 8, 9, 10, or more devices (e.g., at least 2, 3, 4, 5, 6, 7, 8, 9, 10, or more segments of the reconstructable visual code 1210, respectively). The reconstructable visual code 1210 may be segmented and added to at most 10, 9, 8, 7, 6, 5, 4, 3, or 2 devices (e.g., at most 10, 9, 8, 7, 6, 5, 4, 3, or 2 segments of the reconstructable visual code 1210, respectively). Referring to FIG. 12A, the reconstructable visual code 1210 is segmented into a first segment 1210-1 and a second segment 1201-2. The first segment 1210-1 may be added to a surface of a first device 1208-1, and the second segment 1210-2 may be added to a surface of a second device 1208-2. Referring to FIG. 12B, bringing the two devices 1208-1 and 1208-2 together can effectively reconstruct the unique pattern of the visual code 1210. Such unique pattern may be detectable by the visual detecting system 412 (e.g., the handheld QR reader/scanner). Such reconstructable visual code may provide one or more benefits, such as, for example, identifying and tracking two or more articles (e.g., luggage, components of a larger system) in a plethora of different articles.

Figure 13:
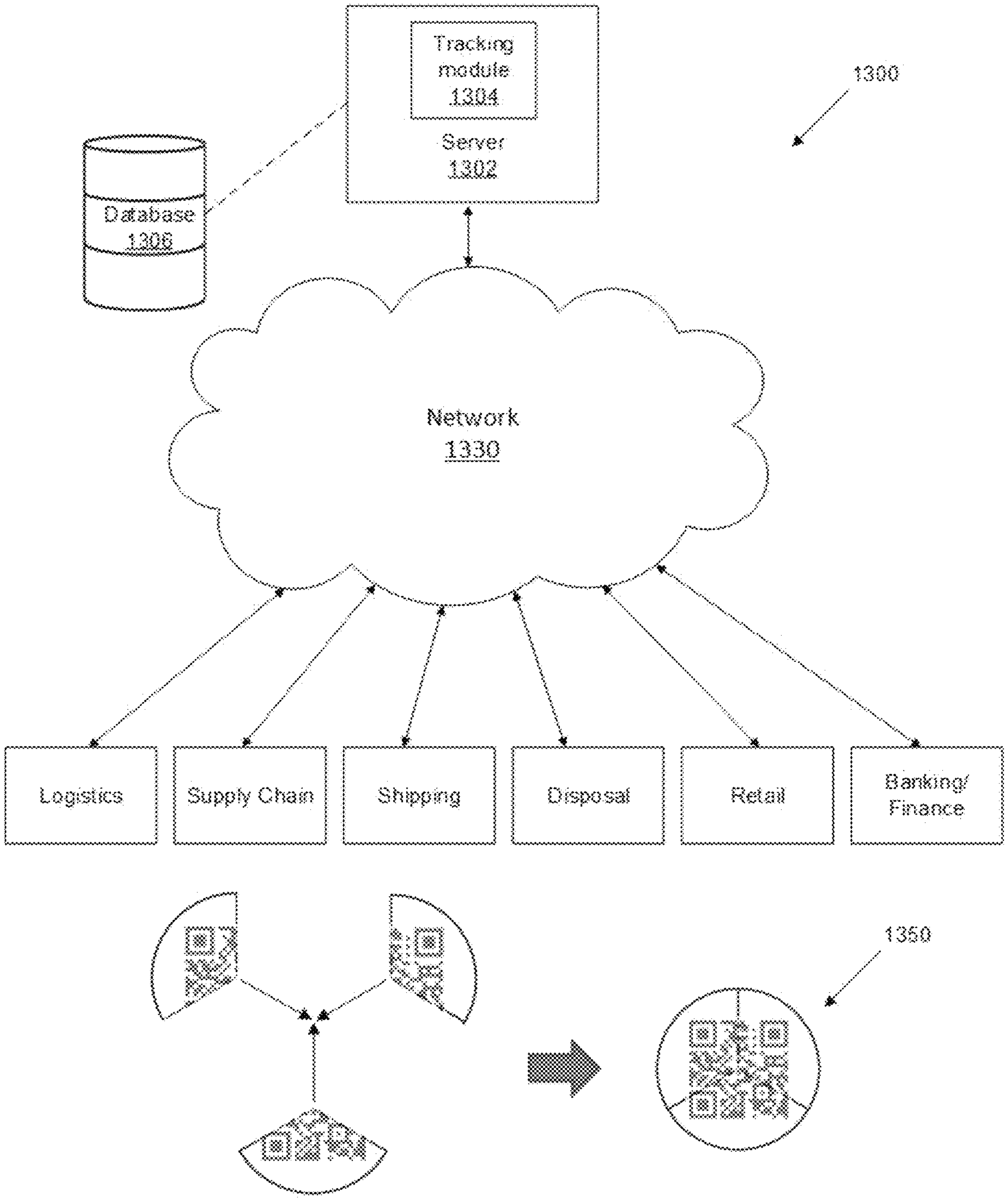
FIG. 13 schematically illustrates an ecosystem for use of the reconstructable visual code.
Figure 14A:
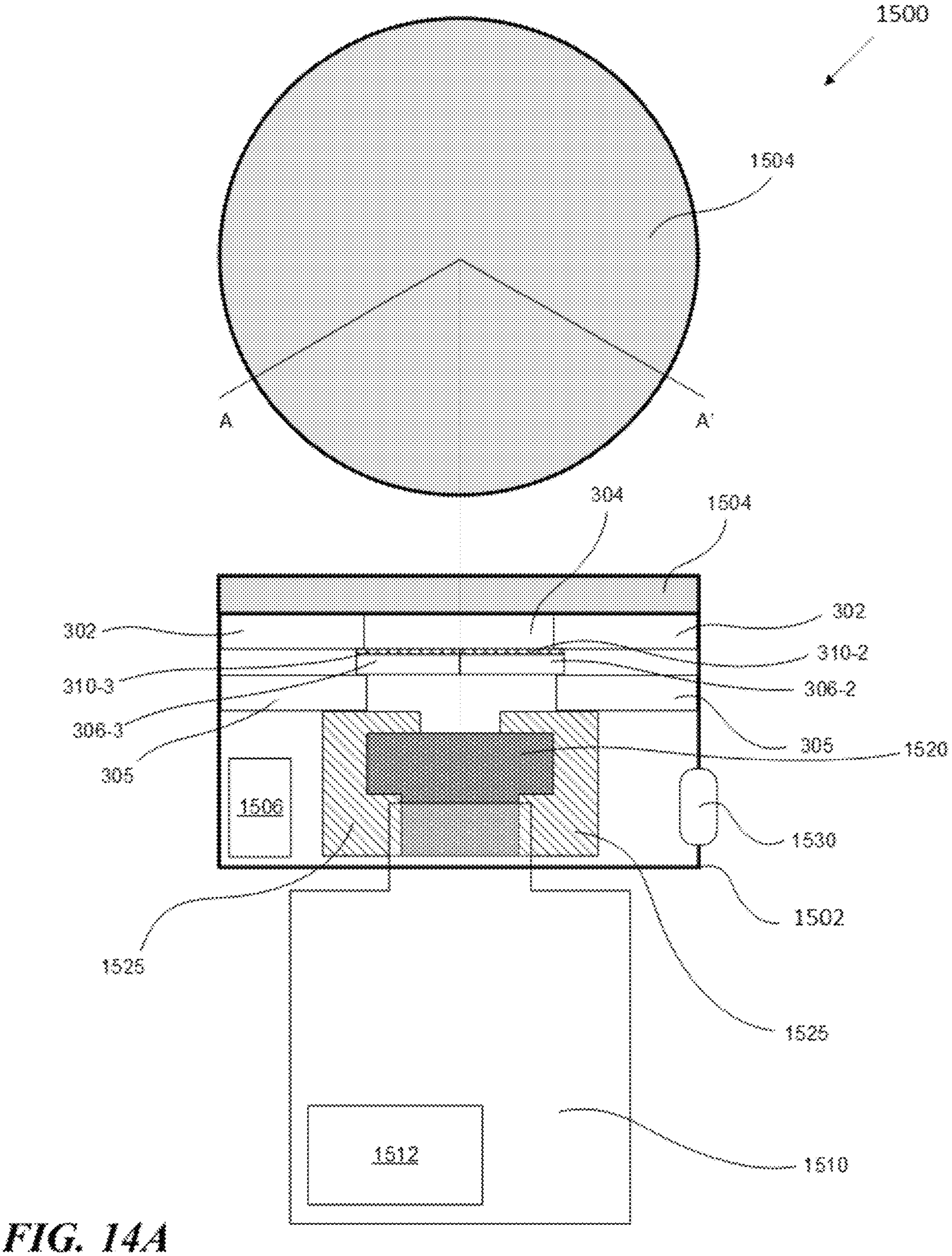
FIGS. 14A-14G schematically illustrate an example of a device comprising an injectable drug security system.
Figure 14B:
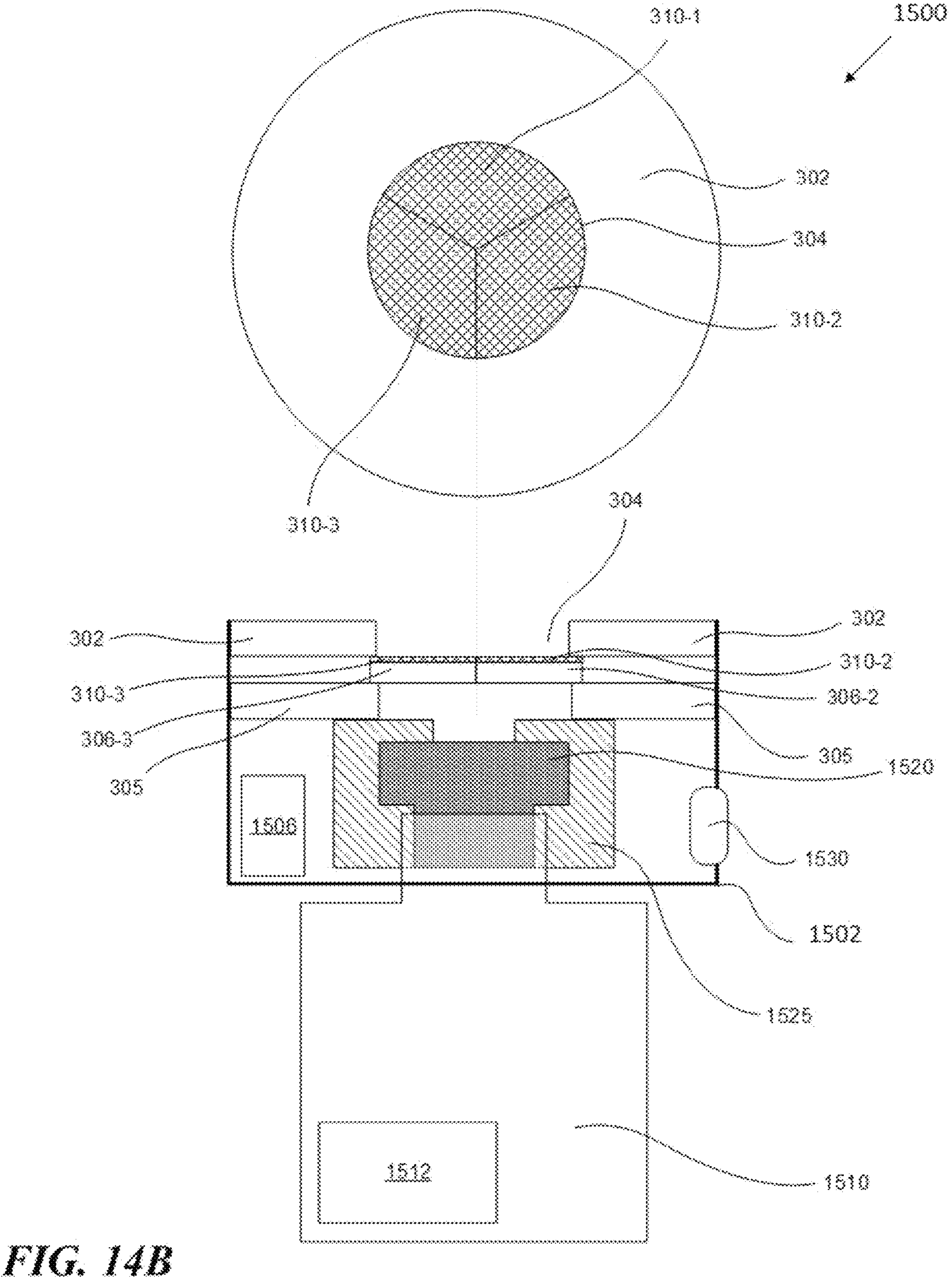
Figure 14C:
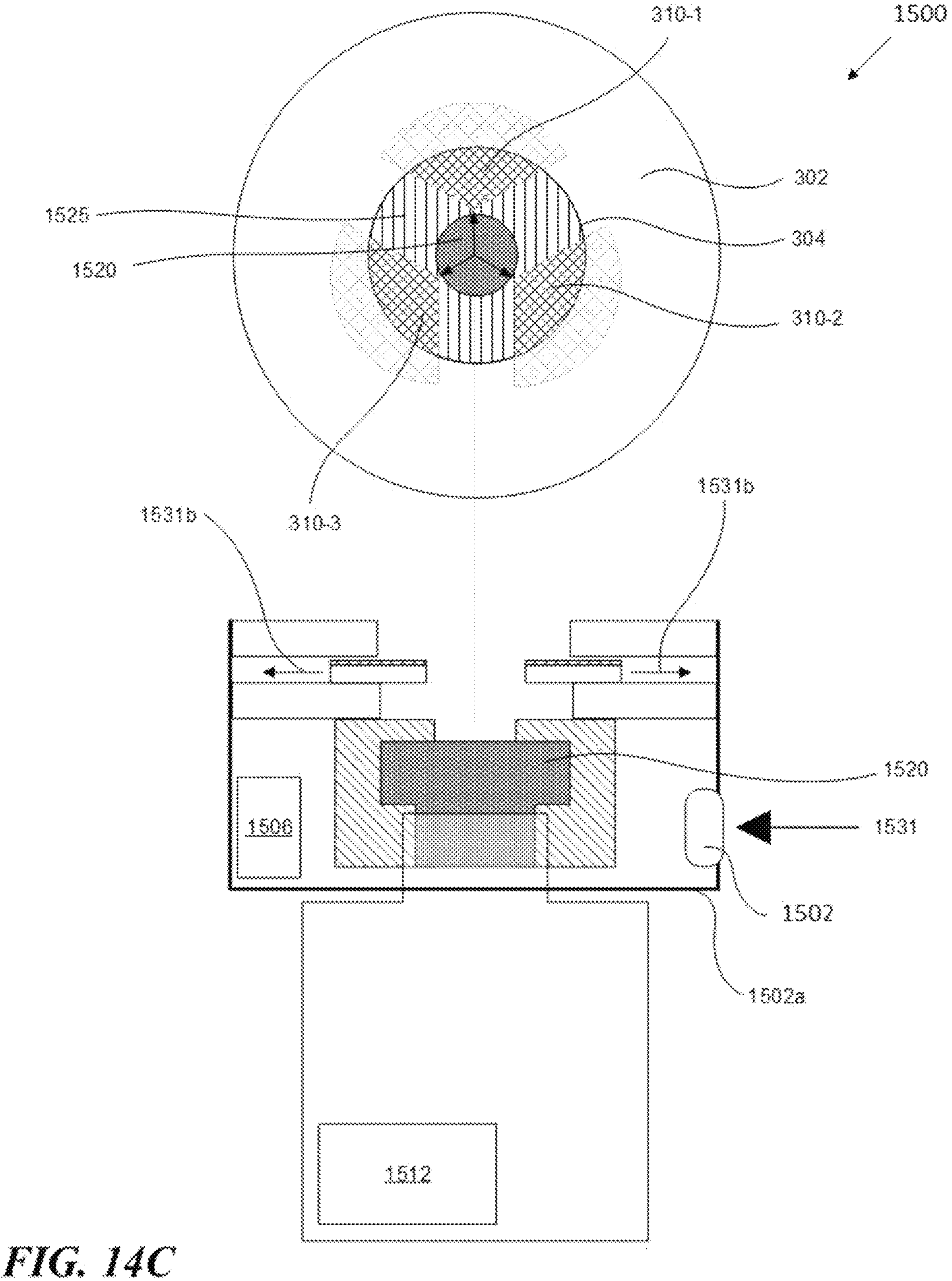
Figure 14D:
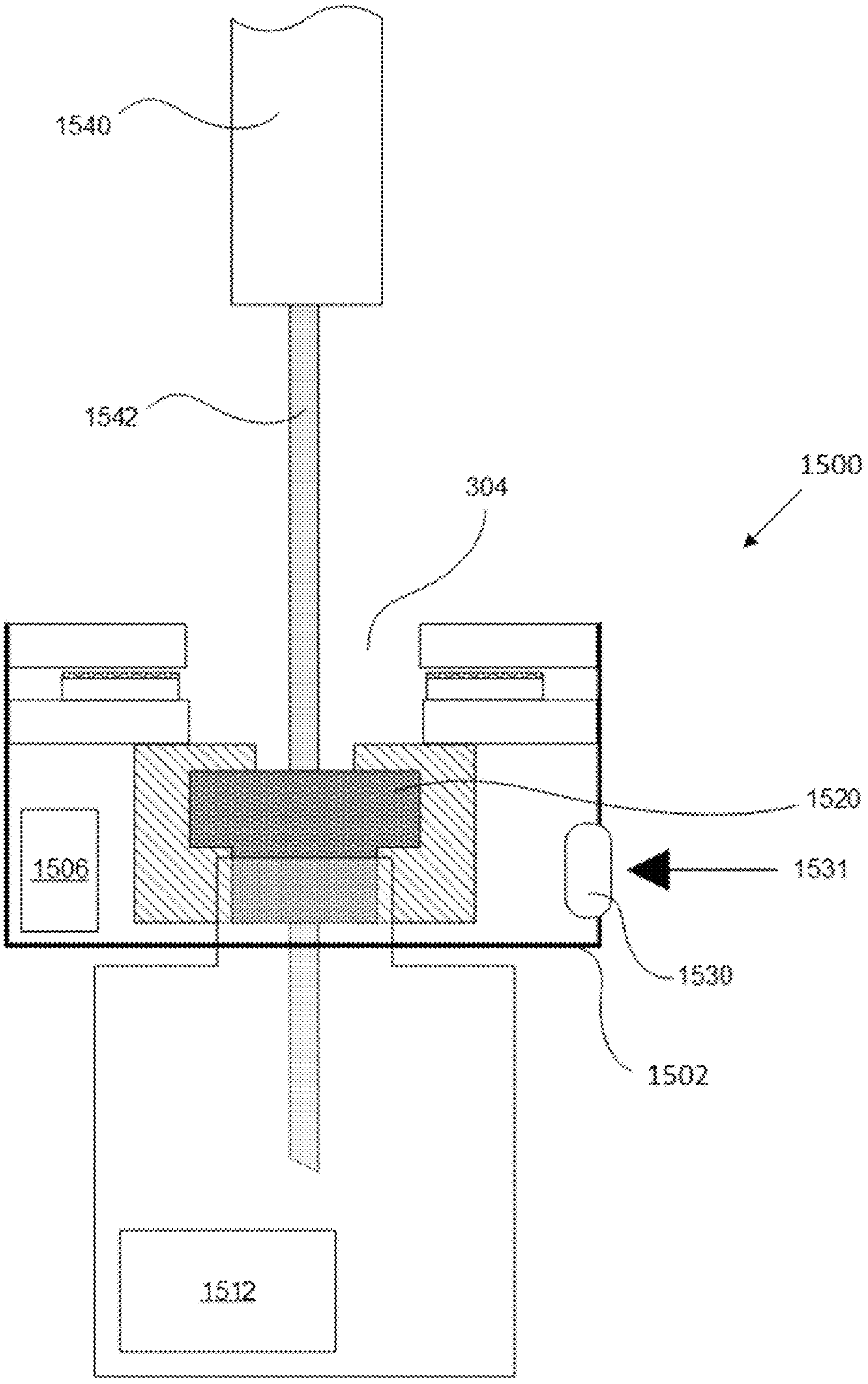
Figure 14E:
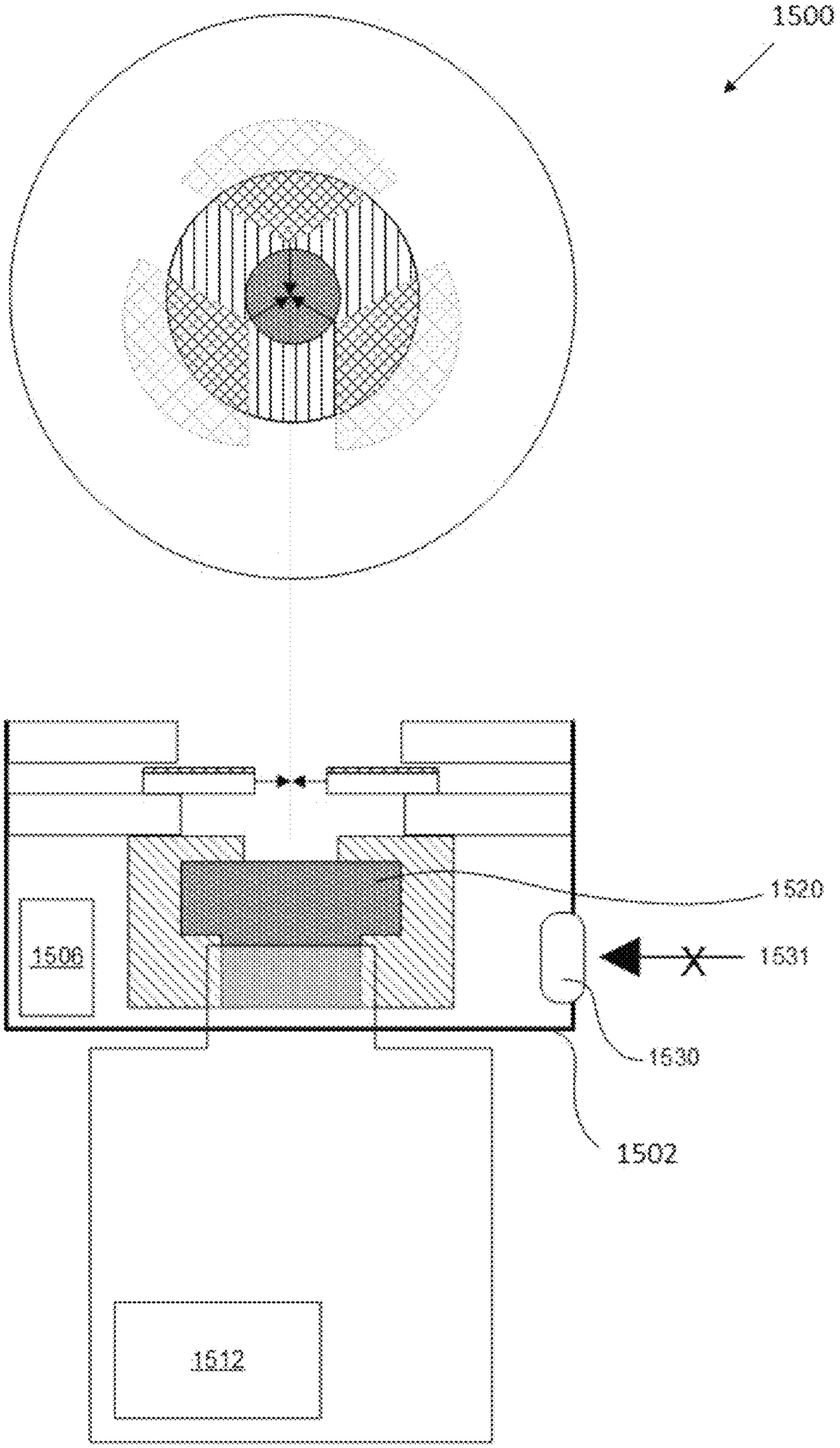
Figure 14F:
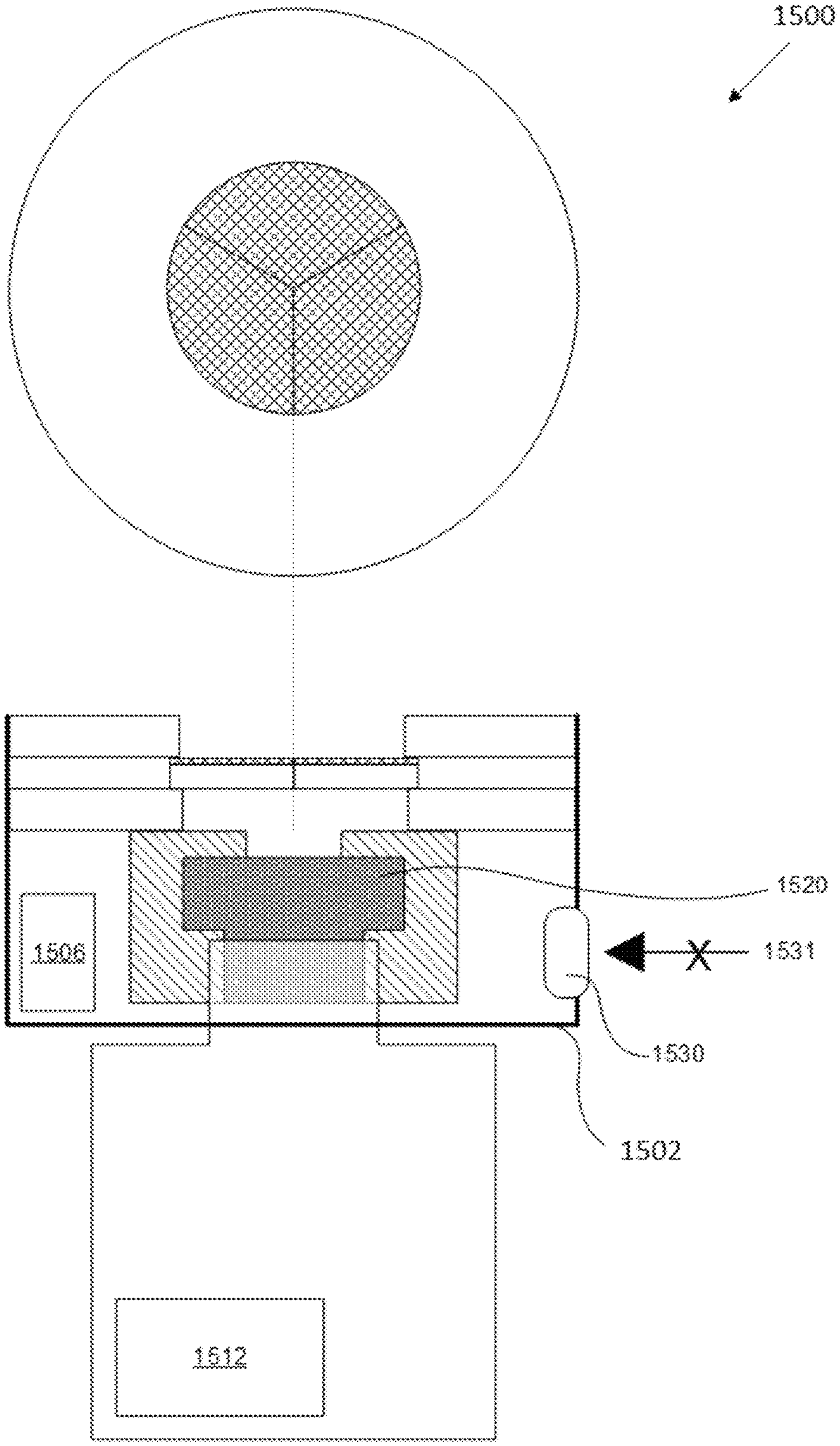
Figure 14G:
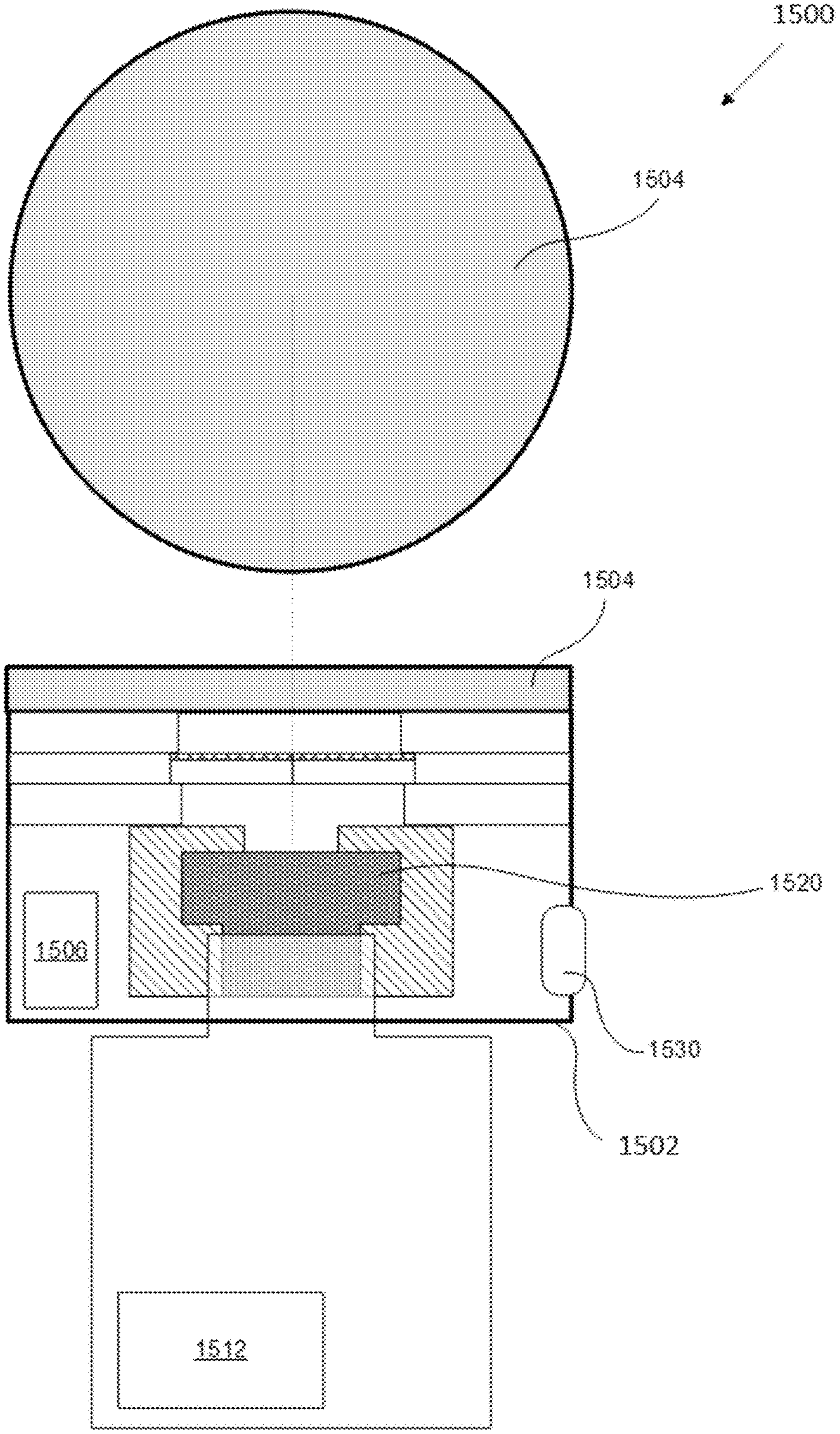

FIG. 13 illustrates an ecosystem 1300 in accordance with some embodiments. The ecosystem 1300 can include a server 1302. The server 1302 can be in communication with a network 1330. The network 1330 can be in operative communication with operative functions of the ISS of the present disclosure. Each of the operative functions of the ISS can be in communication with one or more visual scanning systems. In some cases, the visual scanning system(s) can be configured to take an image and/or video of reconstructed and non-reconstructed visual codes (e.g., a reconstructed visual code 1350) from one or more articles of interest, for example, the ISS as provided in FIGS. 15-18. The server 1302 can include a tracking module 1304 configured to analyze the image and/or video of reconstructed visual codes. The tracking module 1304 may further be configured to track, monitor, and/or log the article(s) based on a sequential scan of the respective reconstructable visual codes over time. Additionally, the server 1302 can be in communication with a database 1306 to store images and/or videos of the reconstructed and non-reconstructed visual codes of the article(s), as well as analysis of the images and/or videos by the tracking module 1304.

Figure 15:
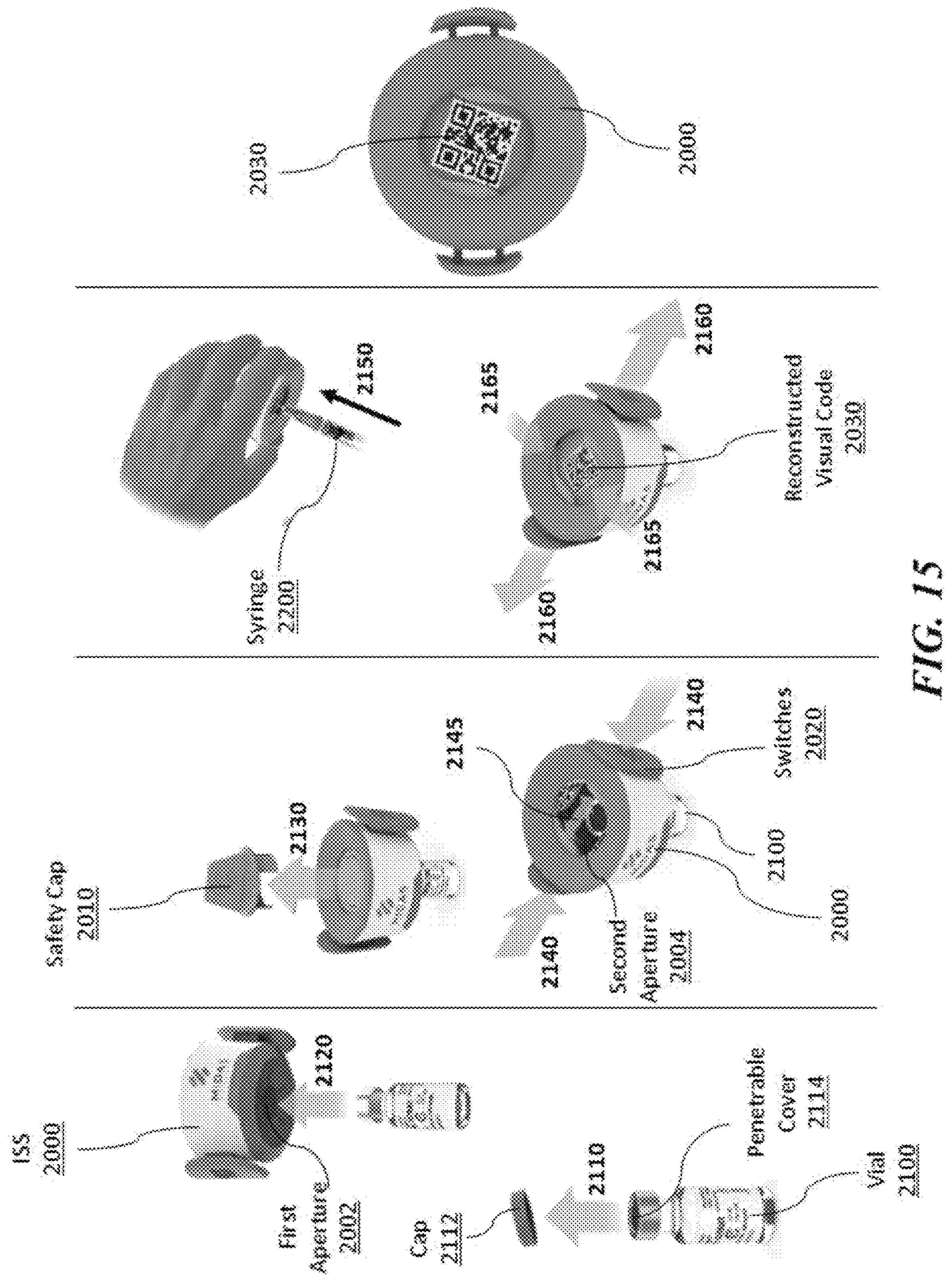
FIG. 15 schematically illustrates another example of a device comprising an injectable drug security system, and methods of use thereof.

FIG. 15 illustrates an example workflow for an injectable security system (ISS) 2000 in accordance with some embodiments. The ISS can prevent diversion of injectable medications. The ISS provides a locking device for protecting an unused vial. The ISS can prevent access to the vial prior to administering of the medication from the vial. The ISS can be configured to permit only one needle insertion. The ISS can prevent access to the vial after the medication has been withdrawn from the vial, specifically preventing a user from withdrawing any residual medication within the vial. The ISS may utilize a unique scannable code that is revealed at specific checkpoints/instances for accountability and tracking purposes. The code may include a reconstructable visual code, as provided herein.

Referring to FIG. 14, initially, a vial 2100 containing medication may be provided. The vial may be protected by a removable cap 2112. The medication may be prescribed for a patient. Upon entry of a prescription order, the vial may be made available for dispense/administering of the medication to the patient. A healthcare practitioner (e.g. nurse) may remove the protective cap from the vial (process 2110). As shown in FIG. 14, the nurse may attach the ISS 2000 (referred to interchangeably as "device") to a distal portion (e.g. neck) of the vial (process 2120). The distal portion of the vial may have a penetrable cover 2114 (e.g., a rubber stopper) that seals an opening of the vial and serves as an access port of the vial. The penetrable cover may be penetrable by a drug loading device, such as for example, a needle of a syringe.

The ISS 2000 can be configured to attach to vials of any size or shape. The ISS may comprise at least one aperture. A first aperture 2002 may be initially opened to receive the distal portion of the vial. The first aperture may be provided at the top portion of the ISS, and may be referred to interchangeably herein as a top aperture. The top aperture can be configured to open or close in varying degrees (similar to a camera aperture), thus permitting vials having distal portions of different sizes or shapes to be coupled to the aperture. The top aperture can be closed and locked when the distal portion of the vial is placed into the aperture. Accordingly, the vial can be locked and secured to the ISS.

The ISS 2000 may include a safety cap 2010 (or a safety pin) for preventing unauthorized access to the vial. When the vial is ready to be administered to the patient, the nurse can remove the safety cap from the ISS (process 2130). The ISS may include a switch 2020 that can be used to unlock and open a second aperture 2004. The second aperture may be provided at the bottom portion of the ISS, and may be referred to interchangeably herein as a bottom aperture. In some cases, the safety cap may be operably coupled to the switch, such that the switch is non-activatable when the safety cap has yet to be removed from the ISS. This can prevent accidental activation of the switch by the nurse, or misuse/diversion by a third party.

After the safety cap 2010 has been removed (process 2130), the nurse may depress the switch 2020 on the ISS 2000 (process 2140) to unlock and open the bottom aperture 2004 (process 2145). In some embodiments, the switch may include a pair of "dead man"-type switches that allow the bottom aperture to be unlocked and opened only once. Subsequent release of the switches after they have been depressed causes a secondary aperture to close and permanently lock. The secondary aperture may be located at the bottom portion of the ISS, in proximity or adjacent to the bottom aperture.

Opening of the bottom aperture can provide the nurse with access to the access port (penetrable cover) of the vial. The nurse may use a needle and syringe 2200 to withdraw the medication from the vial (process 2150). After the medication has been withdrawn, the nurse may proceed to remove the needle from the access port of the vial. After the needle has been withdrawn, the nurse may release the switch 2020 (process 2160) which then causes the secondary aperture 2004 to close (process 2165). The secondary aperture closes and locks, and prevents further access to the penetrable cover of the vial. The secondary aperture may close and reveal a reconstructable visual code 2030. Different segments of the code may be provided on different leaflets/segments of a plurality of closed leaflets of the secondary aperture. When the secondary aperture is fully closed, the different segments of the code will piece together to reconstruct and reveal a complete unique scannable code. The reconstructed code can be subsequently scanned by the nurse for tracking and accountability purposes.

Figure 17A:
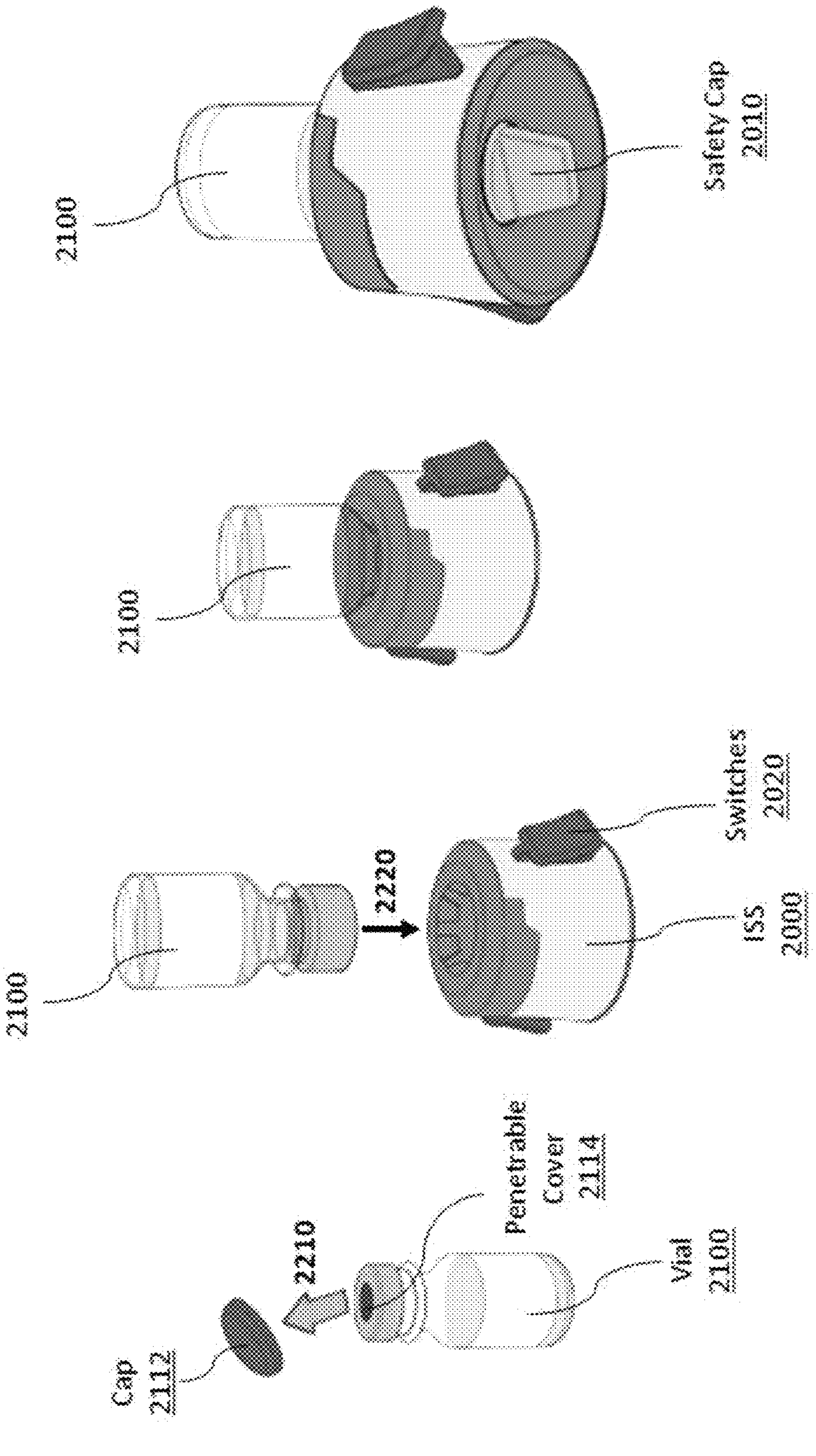
FIGS. 17A-17C schematically illustrate another example of a device comprising an injectable drug security system, and methods of use thereof.
Figure 17B:
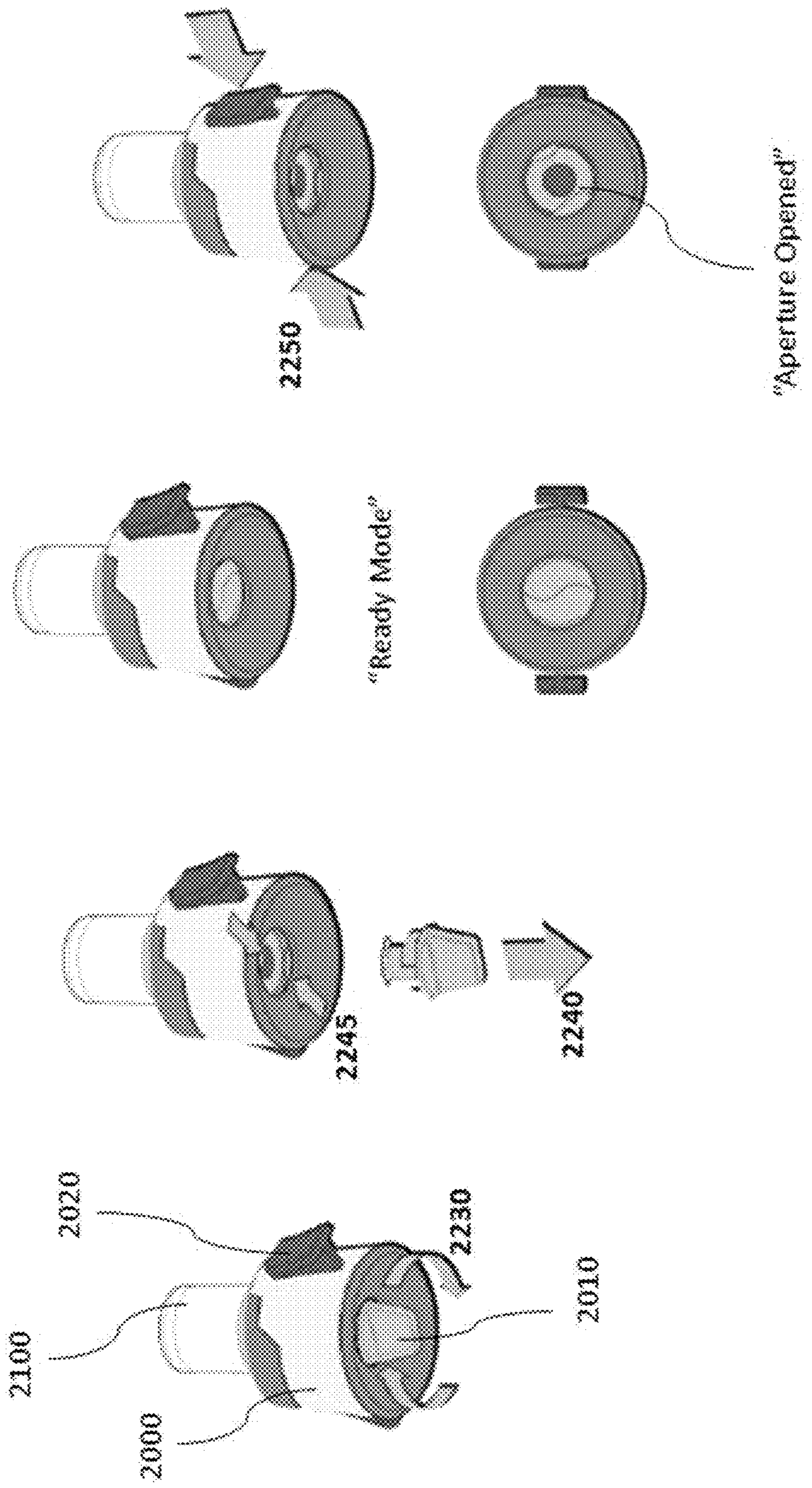
Figure 17C:
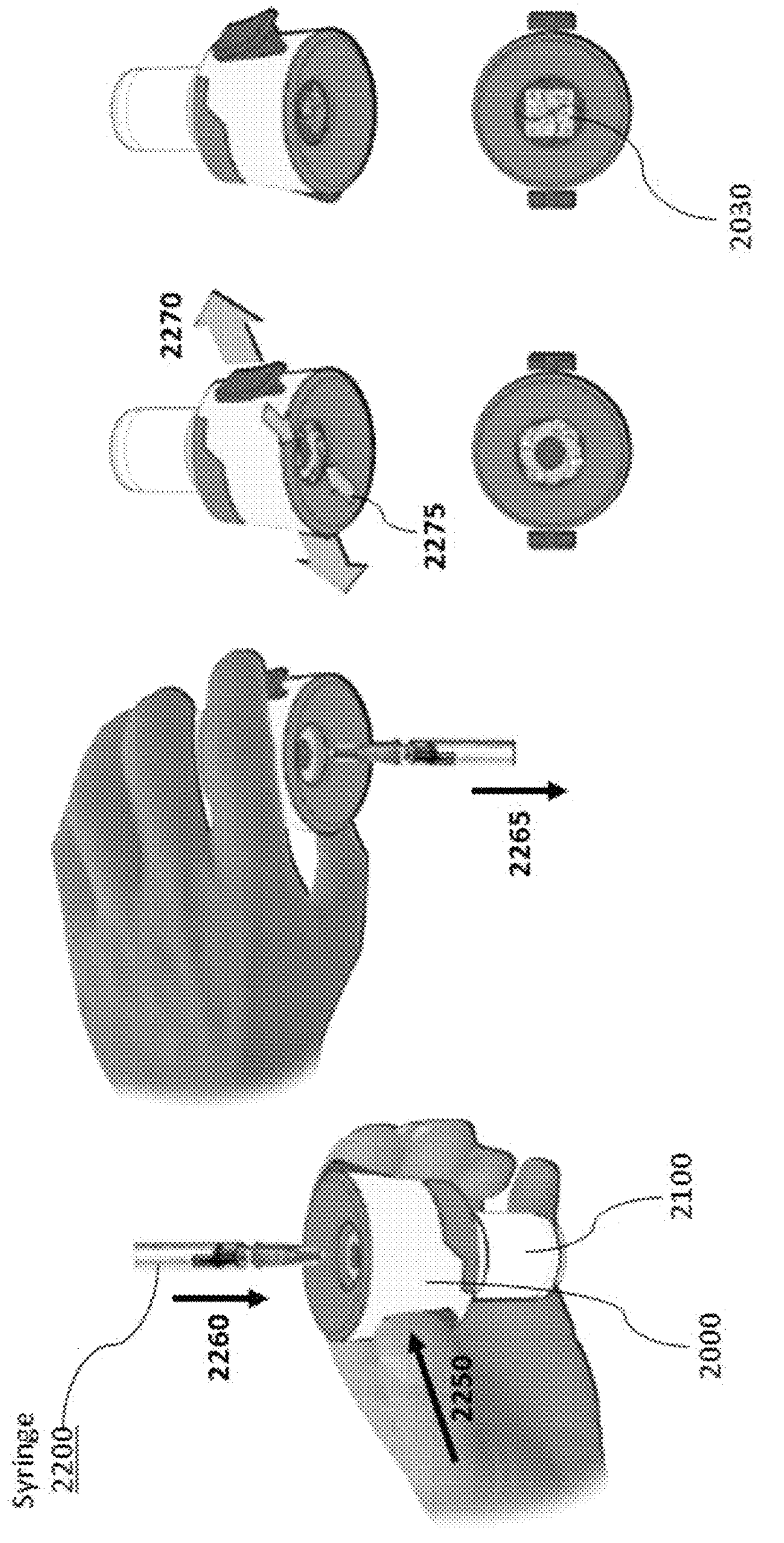

FIGS. 17A-17C illustrate an example workflow of another injectable security system (ISS) in accordance with a first embodiment. The ISS shown in FIGS. 17A-17C may be similar to the embodiment described with reference to FIG. 15.

Figure 16A:
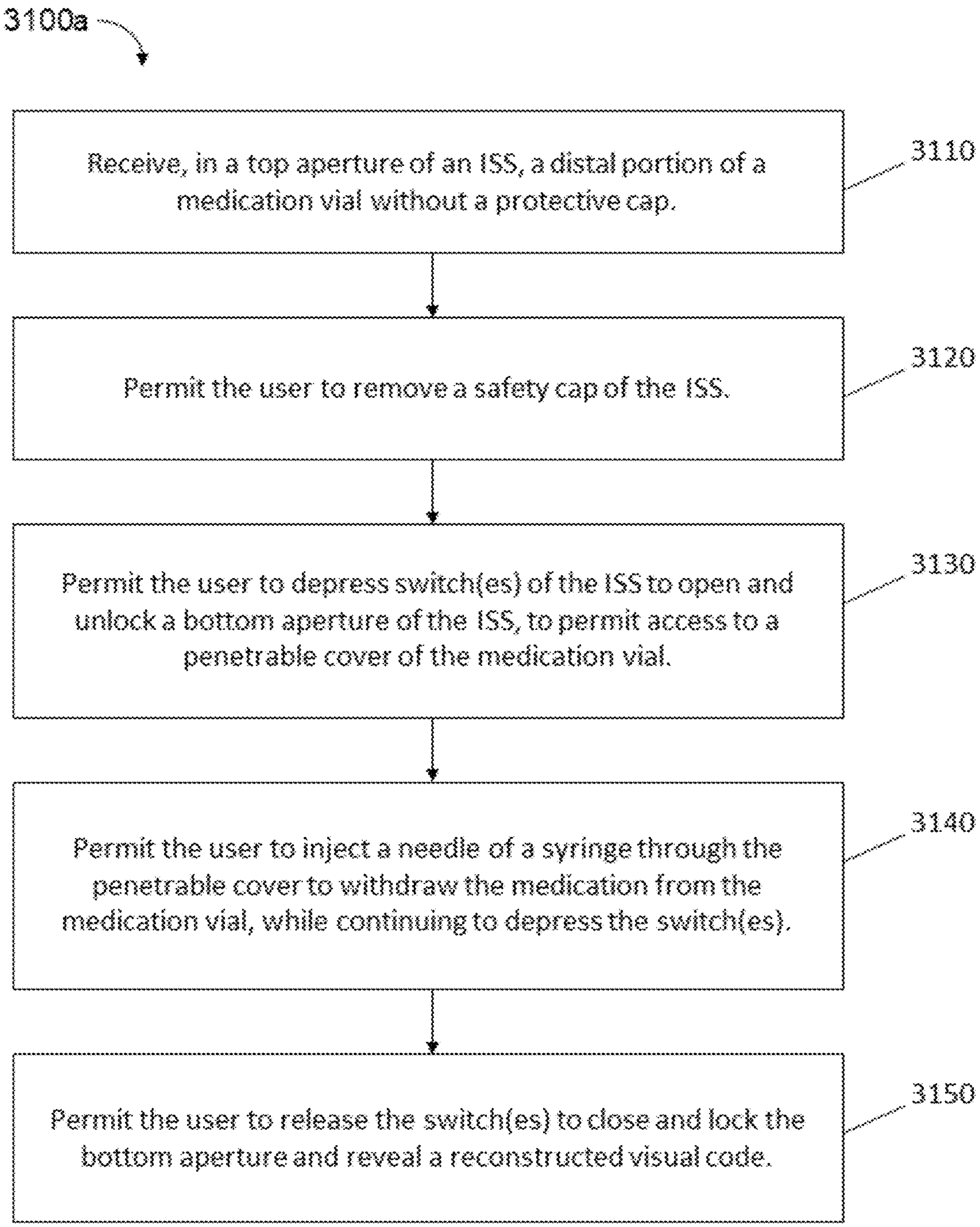
FIGS. 16A and 16B illustrates an example flowchart of a process of securing a medication vial by using an injectable drug security system.
Figure 16B:
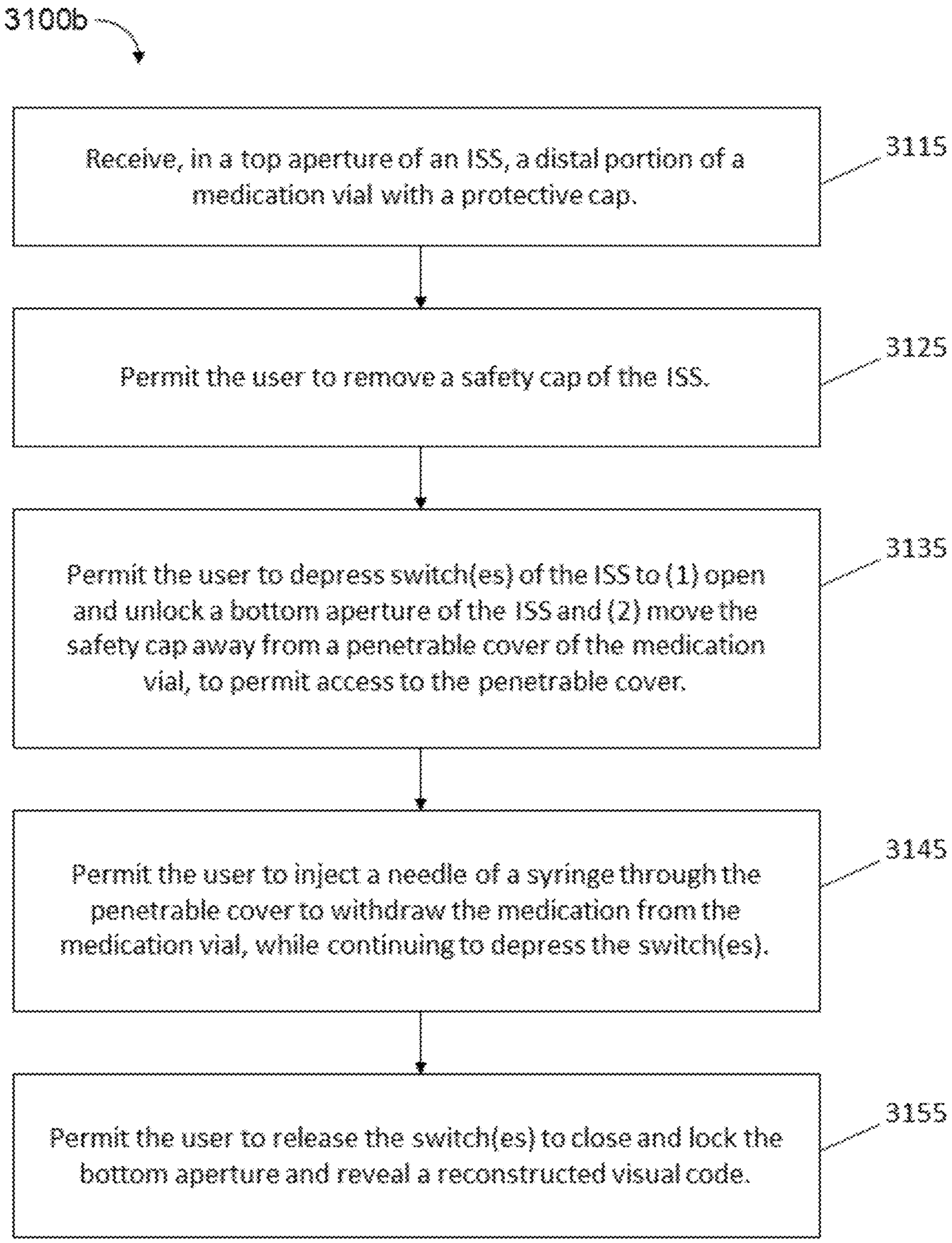

FIG. 16A illustrates an example flowchart 3100*a* of a process of securing a medication vial by an ISS. The ISS can receive, in a top aperture of the ISS, a distal portion of a medication vial without a protective cap (process 3110). The ISS can permit the user to remove a safety cap of the ISS (process 3120). The ISS can permit the user to depress switch(es) of the ISS to open and unlock a bottom aperture of the ISS, to permit access to a penetrable cover of the medication vial (process 3130). The ISS can permit the user to inject a needle of a syringe through the penetrable cover to withdraw the medication from the medication vial, while continuing to depress the switch(es) (process 3140). The ISS can permit the user to release the switch(es) to close and lock the bottom aperture and reveal a reconstructed visual code (process 3150).

FIG. 16A illustrates another example flowchart 3100*b* of a process of securing a medication vial by an ISS. The ISS can receive, in a top aperture of an ISS, a distal portion of a medication vial with a protective cap (process 3115). The ISS can permit the user to remove a safety cap of the ISS (process 3125). The ISS can permit the user to depress switch(es) of the ISS to (1) open and unlock a bottom aperture of the ISS and (2) move the safety cap away from a penetrable cover of the medication vial, to permit access to the penetrable cover (process 3135). The ISS can permit the user to inject a needle of a syringe through the penetrable cover to withdraw the medication from the medication vial, while continuing to depress the switch(es) (process 3145). The ISS can permit the user to release the switch(es) to close and lock the bottom aperture and reveal a reconstructed visual code (process 3155).

Referring to FIGS. 17A-17C, the ISS 2000 may be loaded with a vial 2100 containing medication. The vial may be a 10 milliliter (mL) vial, but may include other vials with volumes that are less than or greater than 10 mL. The top portion of the ISS 2000 may have an opening providing access to a hollow interior of the ISS. A top aperture may be provided at or near the top opening of the ISS. The top aperture may be initially opened to allow a distal portion of the vial to be placed into the hollow interior of the ISS. The distal portion of the vial may be a neck of the vial. The neck of the vial may have a penetrable cover (e.g., rubber stopper) as described elsewhere herein. The top aperture can open and close in varying degrees, to accommodate a range of different vial neck sizes. In some embodiments, the ISS may further include an alcohol swab for sterilization or disinfection of surfaces on the vial (e.g. the rubber stopper of the vial).

The bottom portion of the ISS may have an opening providing access to the access port (penetrable cover) of the vial. The bottom portion may be initially sealed by a safety cap to prevent unauthorized access to the contents of the vial. The bottom portion of the ISS may include a bottom aperture. The bottom aperture can be configured to open to permit the nurse to access and withdraw medication from the vial. The bottom portion of the ISS may also include a secondary aperture that closes and locks after the nurse has withdrawn the medication from the vial, thereby preventing further access to residual medication within the vial.

The ISS may include a switch for activating the bottom aperture and the secondary aperture. In some embodiments, the switch may include a dual lever/button mechanism, which may comprise a pair of levers/buttons at opposite lateral ends of the ISS. The dual lever/button mechanism is designed to be activated by hand, by depressing inward with one hand (and releasing outward after the lever/button has been depressed). The dual lever/button mechanism can be activated to open the bottom aperture and close the secondary aperture, as described in more detail with reference to the following figures.

Referring to FIG. 17A, the ISS 2000 and a vial 2100 containing medication may be initially removed from a dispenser (e.g. an automated dispensing machine (ADM) such as Pyxis) upon entry of a prescription order for a patient. The vial 2100 may come protected with a removable cap 2112 that protects the penetrable cover 2114. Next, a healthcare practitioner (e.g. nurse) may remove the protective cap 2112 from the vial (process 2210) and insert a distal portion of the vial into the ISS (process 2220). The distal portion of the vial may comprise the neck of the vial. The distal portion of the vial may have a penetrable cover (e.g., a rubber stopper) that seals an opening of the vial and serves as an access port of the vial. The penetrable cover may be penetrable by a drug loading device, such as for example, a needle of a syringe. The vial may be secured in the ISS using the top aperture described earlier in FIG. 15. Once the vial is loaded and secured in the ISS, access to the contents of the vial is prevented until the medication is ready to be administered to the patient. The ISS is designed to be tamper proof, to prevent any diversion or unauthorized access to the contents of the vial.

Referring to FIG. 17B, when the nurse is ready to administer the medication to the patient, the nurse may twist and remove a safety cap 2010 located on the bottom portion of the ISS 2000 (process 2230). In some embodiments, an alcohol swab may be provided on an inner surface of the safety cap (or any internal component of the ISS). Twisting the safety cap open can cause the alcohol swab to contact the penetrable cover of the vial in a circular motion (e.g. counterclockwise). The swiping with the alcohol swab can clean/disinfect the penetrable cover of the vial prior to insertion of a needle into the vial. Removal of the safety cap (process 2240) can also cause the bottom aperture on the bottom portion of the ISS to automatically close (process 2245). When the bottom aperture is closed, the ISS is in ready mode. The nurse can depress the dual lever/button on the ISS (process 2250). Depression (pushing inward) of the dual lever/button causes the bottom aperture to open, thereby permitting the nurse access to the penetrable cover of the vial.

Referring to FIG. 17C, while holding the dual lever/button depressed (process 2250), the nurse may insert the needle of a syringe into the vial (process 2260), and draw the required amount of medication into the syringe. After the required amount of medication has been drawn into the syringe, the nurse may remove the needle with syringe from the ISS (process 2265), and release the dual lever/button (process 2270). The releasing of the dual lever/button causes a secondary aperture to deploy, to close the opening on the bottom portion of the ISS (process 2275). The secondary aperture closes and locks, and prevents further access to any residual medication within the vial. The secondary aperture may include a reconstructable visual code 2030 as described herein. As shown in FIG. 17C, different segments of the code may be provided on different leaflets/segments of the secondary aperture. When the secondary aperture is fully closed, the different segments of the code will piece together to reconstruct and reveal a complete unique scannable code 2030. The reconstructed code can be subsequently scanned by the nurse for security, tracking and accountability purposes. The ISS with the vial containing any residual medication can be subsequently brought to a waste system for disposal and to prevent diversion.

FIGS. 18A-18D illustrate an example workflow for a different injectable security system (ISS). The ISS may include a single lever (referred to as "unilever"), instead of the dual lever/button shown in FIGS. 17A-17C. The single lever design can help to enhance ergonomics of use, since it provides better grip and the user can depress the unilever using the palm of the hand. Depressing the unilever can open a bottom aperture of the ISS to provide access to the penetrable cover of the vial. Subsequent release of the unilever can close a secondary aperture on the bottom portion of the ISS to reconstruct a visual code, similar to the embodiments described elsewhere herein. The ISS shown in FIGS. 18A-18D can also accommodate a range of different vial neck sizes.

Figure 18A:
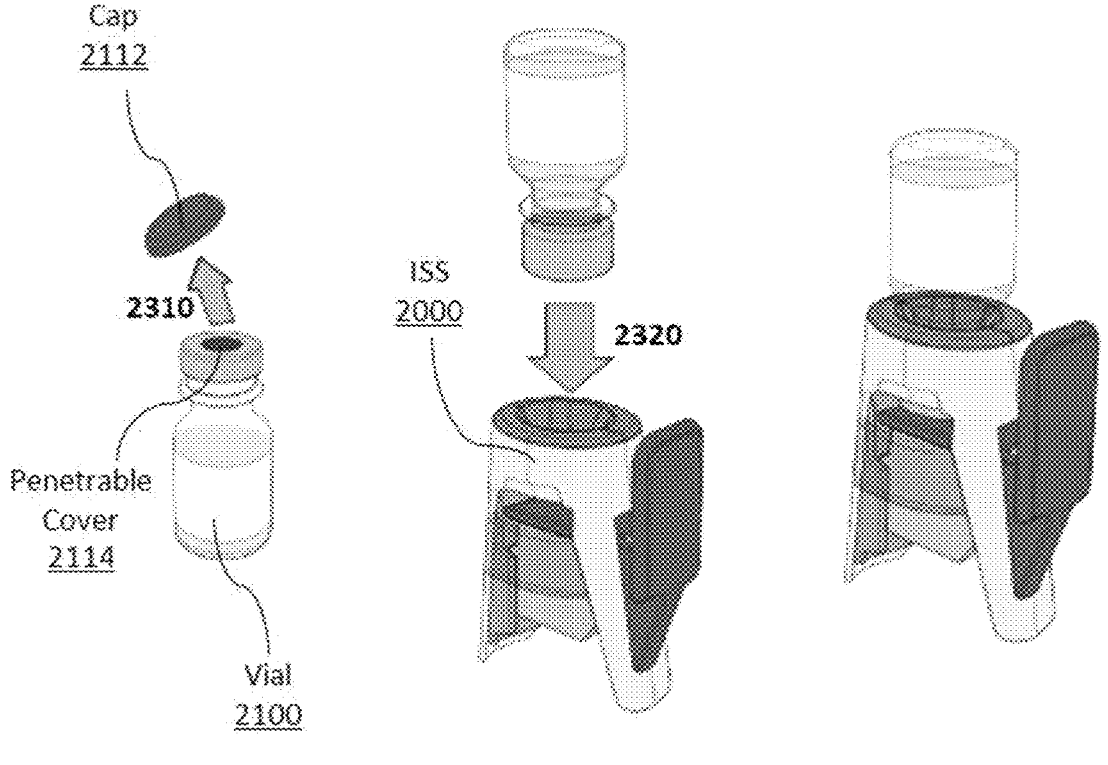
FIGS. 18A-18D schematically illustrate another example of a device comprising an injectable drug security system, and methods of use thereof.

Referring to FIG. 18A, the ISS 2000 and a vial 2100 containing medication may be initially removed from a dispenser (e.g. an automated dispensing machine (ADM) such as Pyxis) upon entry of a prescription order for a patient. A healthcare practitioner (e.g. nurse) may remove the cap 2112 from the vial 2100 to reveal the penetrable cover 2114 of the vial 2100 (process 2310). Next, the nurse may insert a distal portion of the vial into the ISS 2000 (process 2320).

Figure 18B:
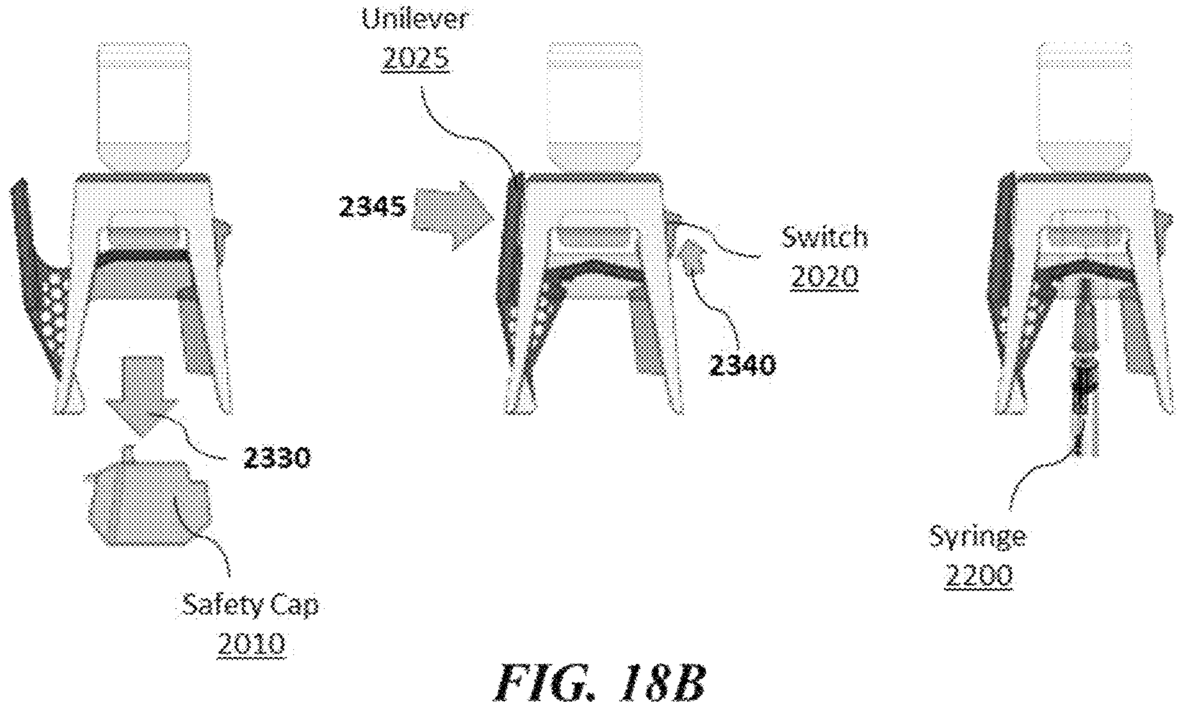

Referring to FIG. 18B, a safety cap 2010 on the ISS is removed (process 2330). The safety cap prevents access to the contents of the vial, and serves as a lock-out tab. When the safety cap is removed, the bottom aperture on the bottom portion of the ISS closes to prevent diversion or unauthorized access. Next, the nurse may slide a safety switch 2020 located on the ISS (process 2340). The safety switch may be operably coupled to the unilever 2025 such that sliding of the safety switch unlocks the unilever and allows the unilever to be depressed. Next, the nurse may depress the unilever 2025 to open the bottom aperture of the ISS (process 2345), thereby providing access to the opening of the vial for the syringe 2200.

Figure 18C:
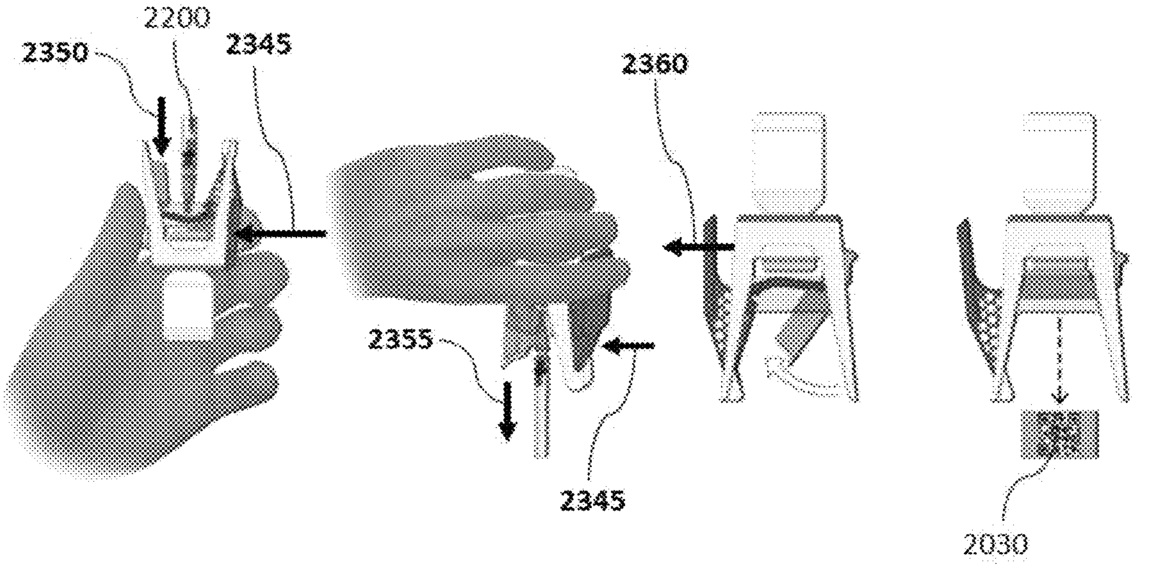

Referring to FIG. 18C, the nurse may then insert a needle of a syringe 2200 (process 2350) to withdraw the medication from the vial while holding the unilever depressed. After the required amount of medication is withdrawn from the vial, the nurse may remove the needle and syringe from the ISS (process 2355). After the syringe has been removed, the nurse may release the unilever to close the secondary aperture (process 2360), in order to lock the ISS and prevent access to residual medication within the vial. The closing of the secondary aperture causes a unique scannable visual code 2030 to be reconstructed, as described elsewhere herein.

Figure 18D:
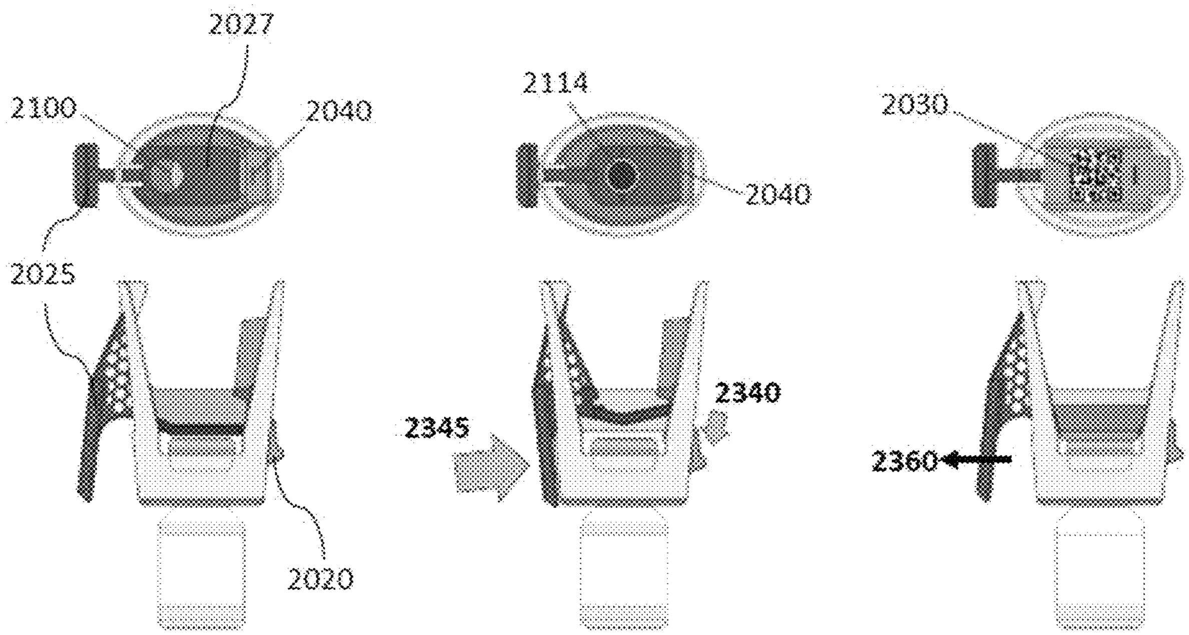

FIG. 18D shows the lock-out process of the ISS of FIG. 18C in more detail. A front view (bottom image) and a corresponding top view (top image) are shown for each stage of the lock-out process. The unilever 2025 may include a plate 2027 preventing needle insertion into the penetrable cover 2114 of the vial, prior to activation (depressing) of the unilever. A lock-out release tab 2040 is provided on the ISS, and is triggered when the unilever is depressed. When the ISS is ready for needle insertion, the nurse can disengage the lock-out release tab by pressing on the unilever 2025 (process 2345), which permits the unilever to be depressed. When the unilever is fully depressed, an opening on the plate of the unilever will be aligned with the penetrable cover the vial, thereby permitting the needle of the syringe to be inserted into the vial. After the needle with syringe is removed from the ISS, the nurse may release the unilever (process 2360), which causes the secondary aperture ("lock-out door") to close and lock, preventing further access to residual medication within the vial. The closing of the secondary aperture also causes a unique scannable visual code 2030 to be reconstructed. The reconstructed code can be scanned for tracking and accountability purposes as described elsewhere herein.

Figure 19A:
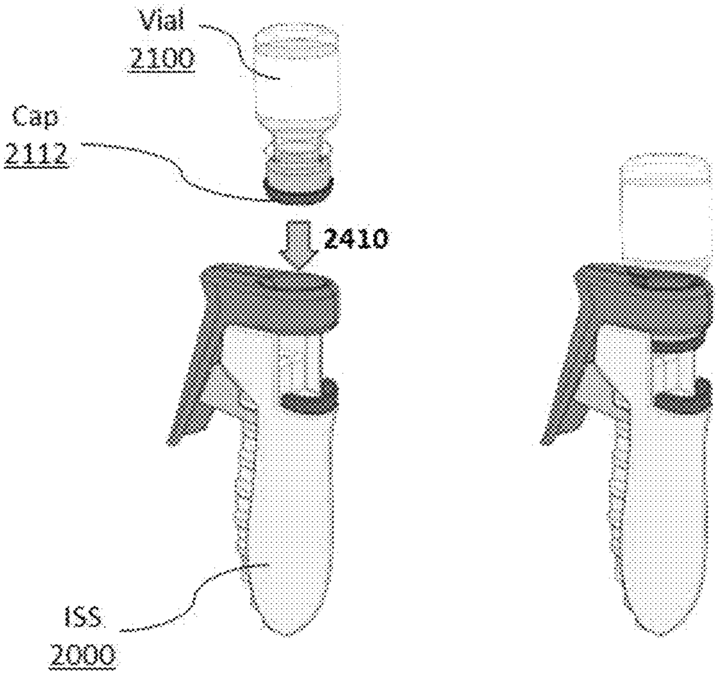
FIGS. 19A-19C schematically illustrate another example of a device comprising an injectable drug security system, and methods of use thereof.
Figure 19B:
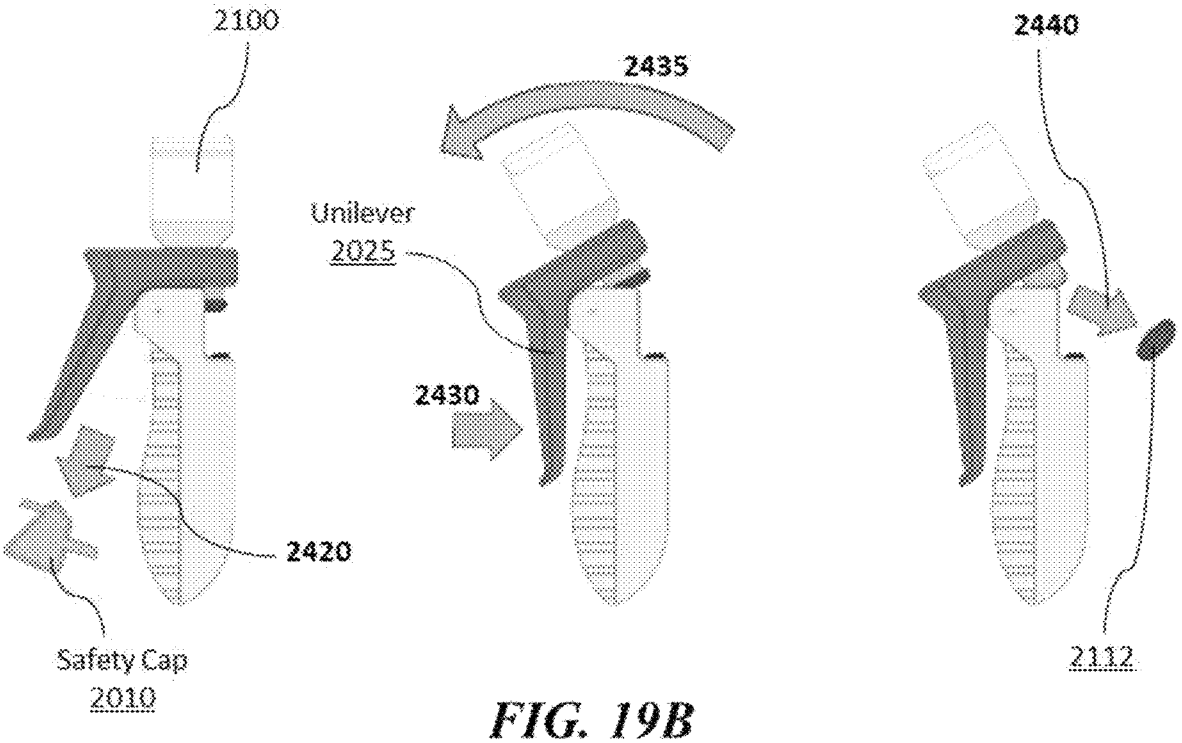
Figure 19C:
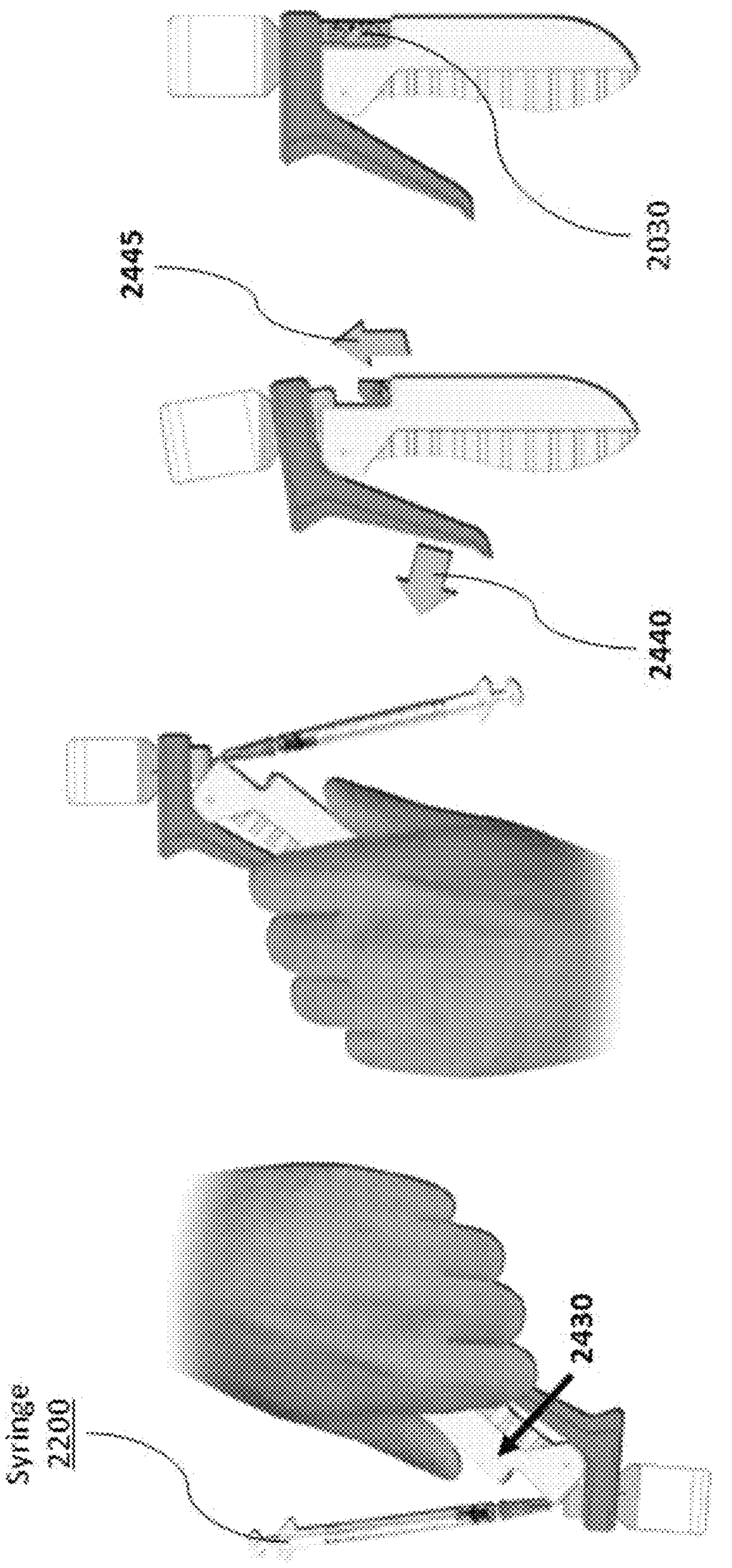

FIGS. 19A-19C illustrate an example workflow for yet a different injectable security system (ISS). The ISS is ergonomically designed in the form of a handle, and comprises a unilever mechanism. Referring to FIG. 19A, the ISS 2000 and a vial 2100 containing medication may be initially removed from a dispenser (e.g. an automated dispensing machine (ADM) such as Pyxis) upon entry of a prescription order for a patient. A healthcare practitioner (e.g. nurse) may not and need not remove the cap 2112 from the vial 2100 to reveal the penetrable cover 2114 of the vial 2100 prior to insertion of the vial into the ISS. Instead, the nurse may insert a distal portion of the vial including the cap 2112 into the ISS 2000 (process 2410).

Referring to FIG. 19B, a neck portion of the vial with the removable cap is inserted and secure to the top portion of the ISS. Afterwards, the safety cap 2010 on the ISS may be removed at an angle (process 2420). The nurse may depress the unilever 2025 to begin the lock-out (process 2430), which pivots the vial and exposes the distal portion of the vial (process 2435). The nurse may remove the protective cap 2112 from the vial (process 2440), and may wipe the penetrable cover of the vial with an alcohol swab prior to needle insertion.

Referring to FIG. 19C, the nurse may insert the needle of the syringe 2200 to draw the required amount of medication from the vial, while holding the unilever depressed. The needle may be inserted at an angle, to avoid interfering with the nurse's other hand that is holding the ISS and keeping the unilever depressed. After the needle and syringe has been removed from the ISS, the nurse may release the unilever to lock-out the ISS (process 2440), which may be achieved by sliding a plate to prevent further access to the residual medication within the vial. The plate may be initially hidden, and may be exposed upon release of the unilever. The plate may include a code 2030 which is fully visible when the plate is exposed closing the opening and is fully locked. The code may include any type of visual code as described elsewhere herein. The code may be a reconstructed visual code as described elsewhere herein. In some other embodiments, the code need not be a reconstructed visual code, and may be any type of machine readable code. In some cases, the plate may be slid manually by the nurse. Alternatively, the plate may be slid automatically (e.g., via one or more actuation mechanisms) upon release of the unilever.

Figure 20:
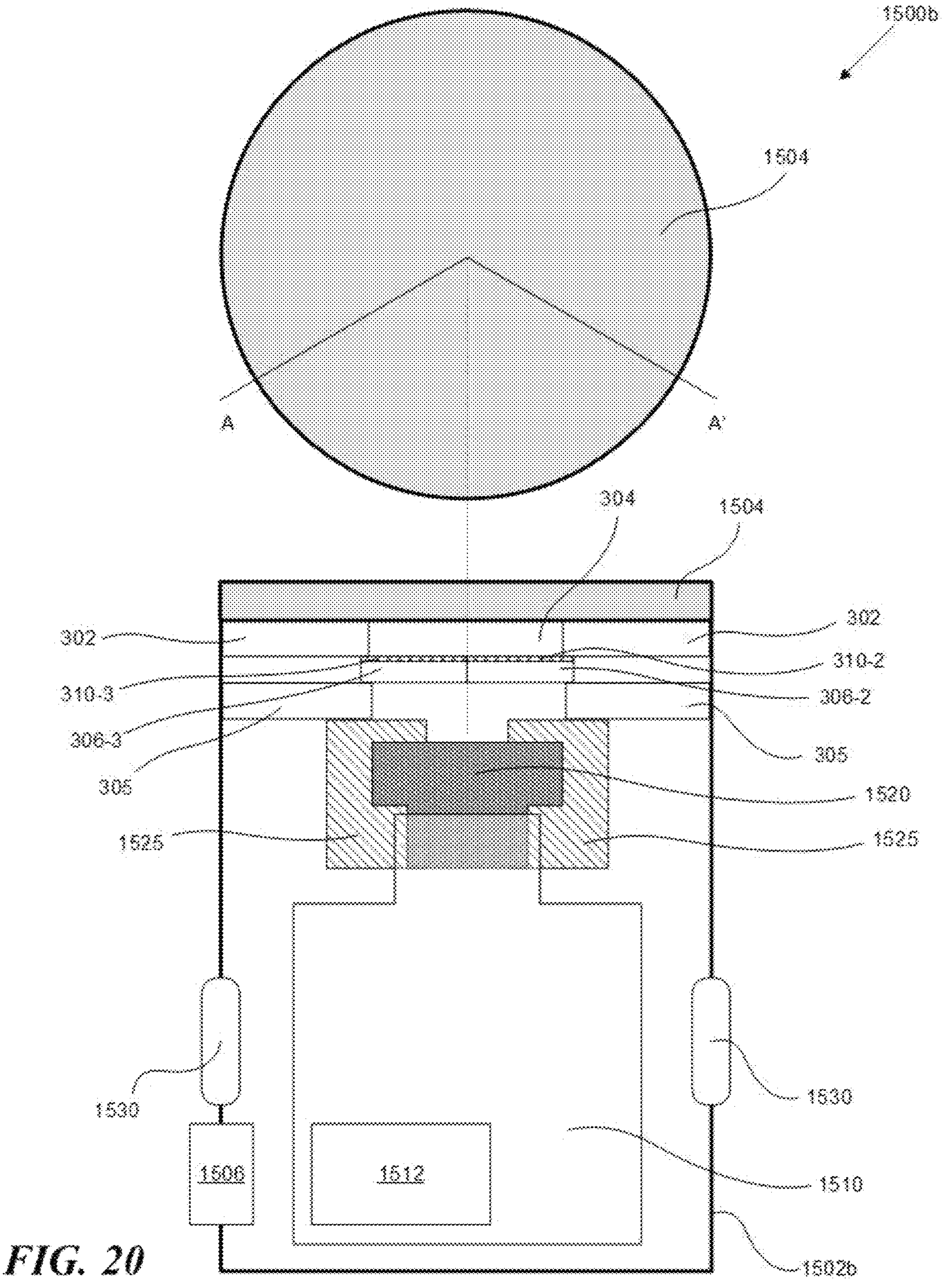
FIG. 20 schematically illustrates a different example of a device comprising an injectable drug security system.

FIG. 20 schematically illustrates a different example of a device 1500*b* comprising an ISS 1502 and a drug vial 1510. The device 1500*b* may comprise similar components and may be utilized using similar procedures as described for the device 1500 in FIGS. 14A-14G. While the device 1500 is configured to enclose only a portion of the vial 1510, the device 1500*b* in FIG. 20 can be configured to enclose the entire medication vial 1510.

Figure 21A:
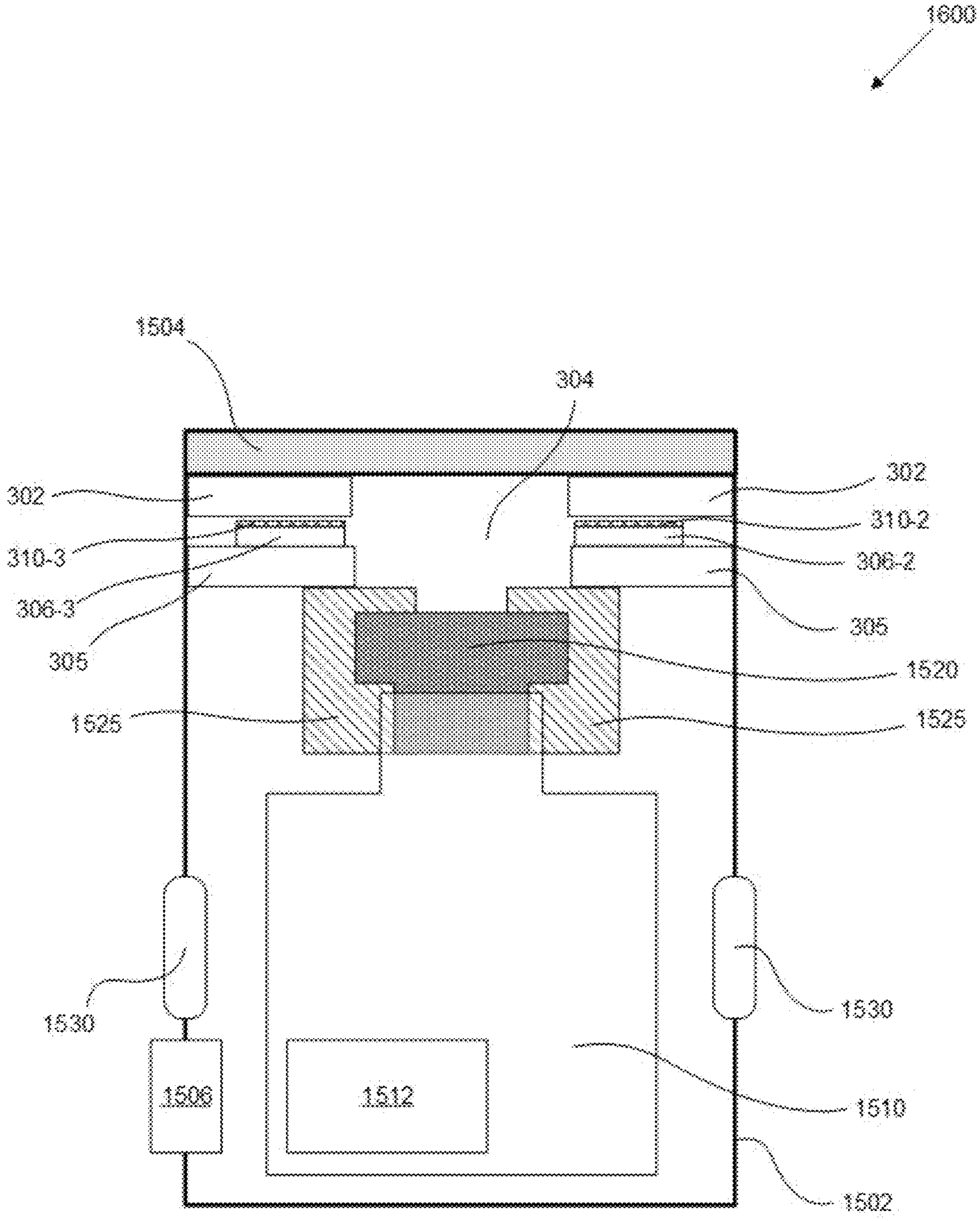
FIGS. 21A-21D schematically illustrate yet a different example of a device comprising an injectable drug security system.

FIGS. 21A-21D schematically illustrate an example of a device 1600 comprising an ISS 1502 and a drug vial 1510. Prior to use, the drug vial 1510 may be installed and sealed inside the ISS 1502. FIG. 21A schematically illustrates a cross-sectional view of the device 1600. The ISS 1502 of the device 1600 may have a removable cap 1504. The ISS 1502 may comprise a reconstructable visual code 310 with multiple individual segments. Prior to use of the device 1600, the visual code 310 may be in a deconstructed state (or form), thereby being separated into individual segments 310-1, 310-2, and 310-3. In such a case, the individual segments 310-1, 310-2, and 310-3 of the visual code 310 may be "hidden" under a cover 302 (e.g., a ring-shaped cover) to expose the opening 304 of the ISS 1502. The individual segments 310-1, 310-2, and 310-3 may be added (e.g., printed, machined, glued) to at least a portion of a surface of three individual leaflets 306-1, 306-2, and 306-3 of the ISS 1502, respectively. Prior to use of the device 1600, the removable cap 1504 may seal the opening 304 of the ISS 1502, thereby to prevent any access to the drug vial 1510 inside the ISS 1502.

Figure 21B:
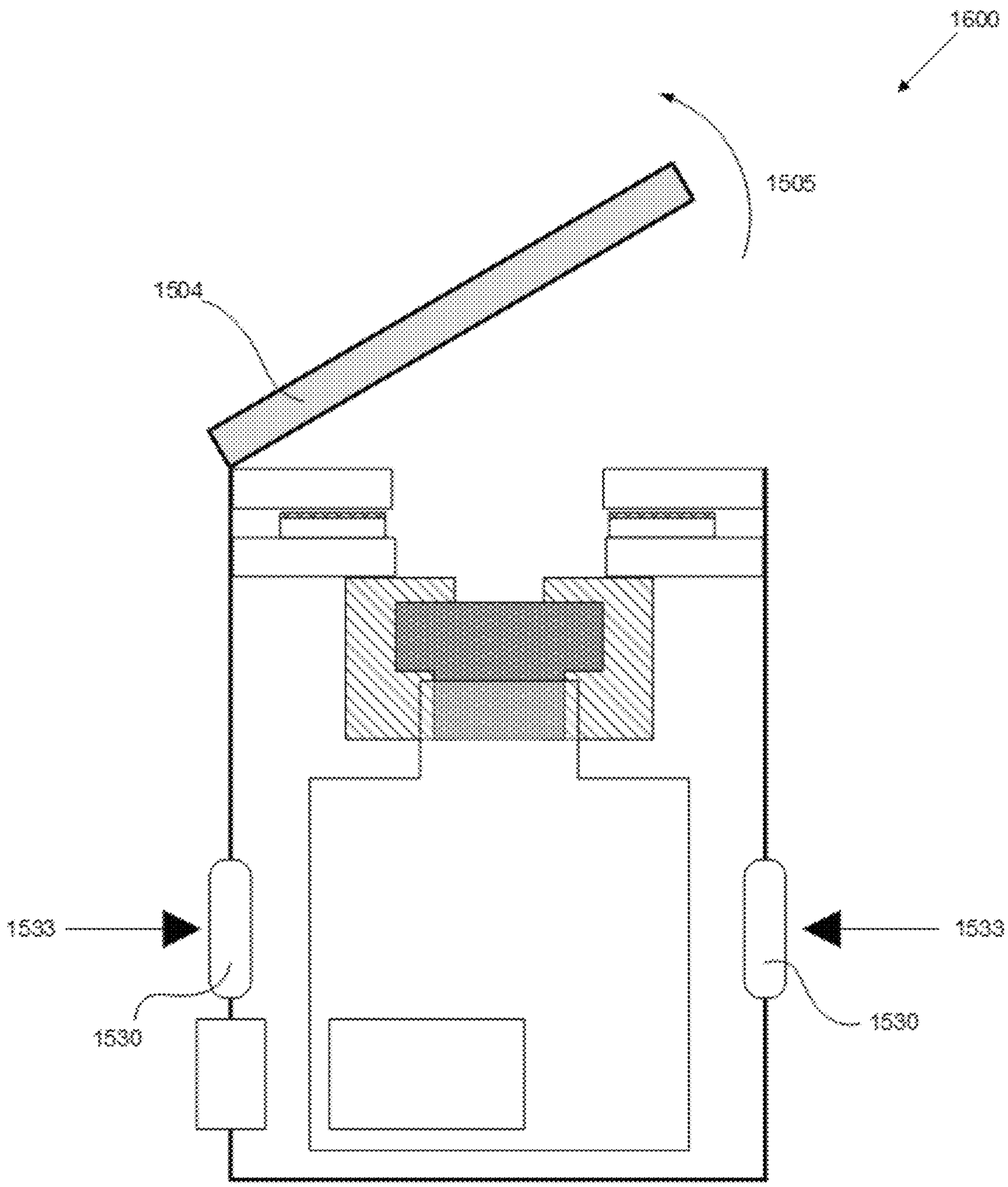

Referring to FIG. 21B, in order to initiate the drug loading process, the practitioner may be required to engage 1533 (e.g., press) the one or more switches 1530 of the ISS 1502. In some cases, the outer surface of the cap 1504 may comprise a label (e.g., a barcode) to be scanned by a reader. Scanning the label of the cap 1504 prior to its removal may indicate to the system (e.g., eMAR and/or ADM) that the practitioner is initiating a drug withdrawing process from the ISS 1502. In some cases, the removable cap 1504 may only be removed 1505 from the ISS 1502 upon the engagement 1533 of the switches 1530. After the cap 1504 is removed from the ISS 1502, a drug loading device (e.g., a syringe) may be directed through the opening 304 and into the penetrable cover 1520 of the drug vial 1510 to extract a dose of the drug.

In some cases, the switches 1530 may require a continual engagement 1533 (e.g., being pressed continually) for the visual code 310 to remain in its deconstructed state. In such a case, stopping the engagement 1533 of the switches 1530 may trigger the visual code 310 to reconstruct into a functional visual code and seal the opening 304 of the ISS 1502. In some cases, the continual engagement of the visual code 310 may not be necessary for the visual code 310 to remain in its deconstructed state.

Figure 21C:
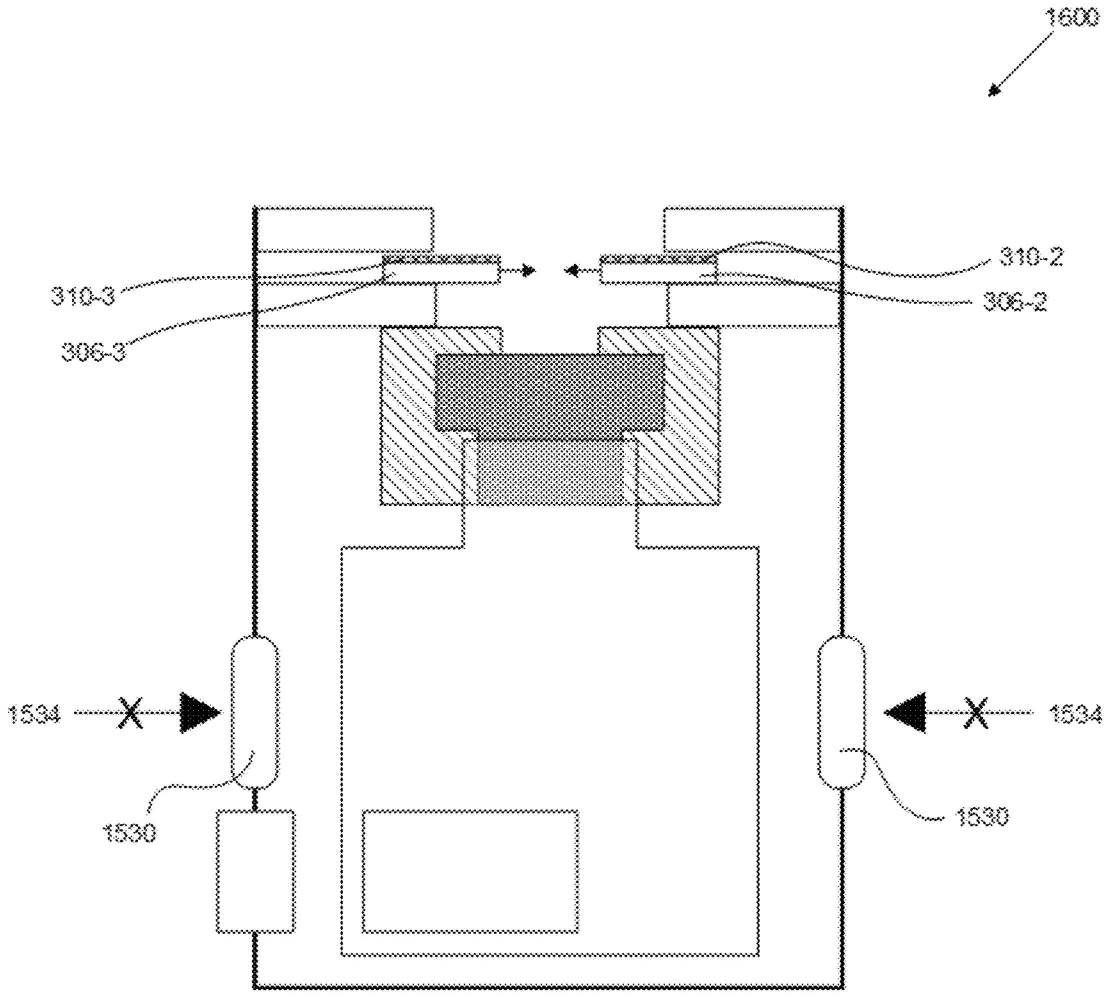
Figure 21D:
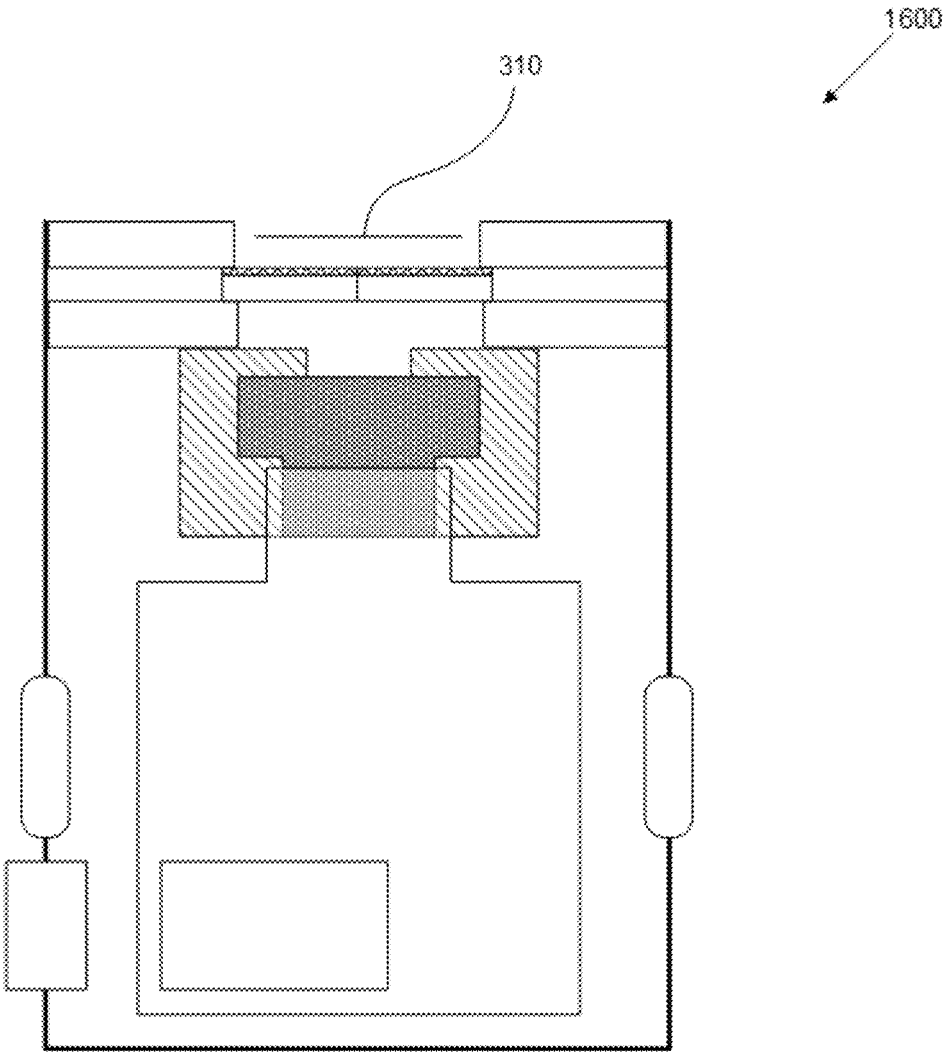

Referring to FIG. 21C, the switches 1530 may be configured to require a continual engagement (e.g., being pressed continually) for the visual code 310 to remain in its deconstructed state. Thus, after the extraction of the drug and the removal of the drug loading device from the drug vial 1510, the engagement of the switches 1530 may be stopped 1534 to trigger the visual code 310 to reconstruct into a functional visual code and seal the opening 304 of the ISS 1502. Subsequently, referring to FIG. 21D, the functional visual code of the reconstructed visual code 310 may be scanned to indicate (e.g., to eMAR and/or ADM) completion of the drug loading process. In some cases, the switches 1530 may be configured such that an additional engagement of the switches 1530 may not be capable of triggering any more deconstruction of the reconstructed visual code 310.

Figure 22:
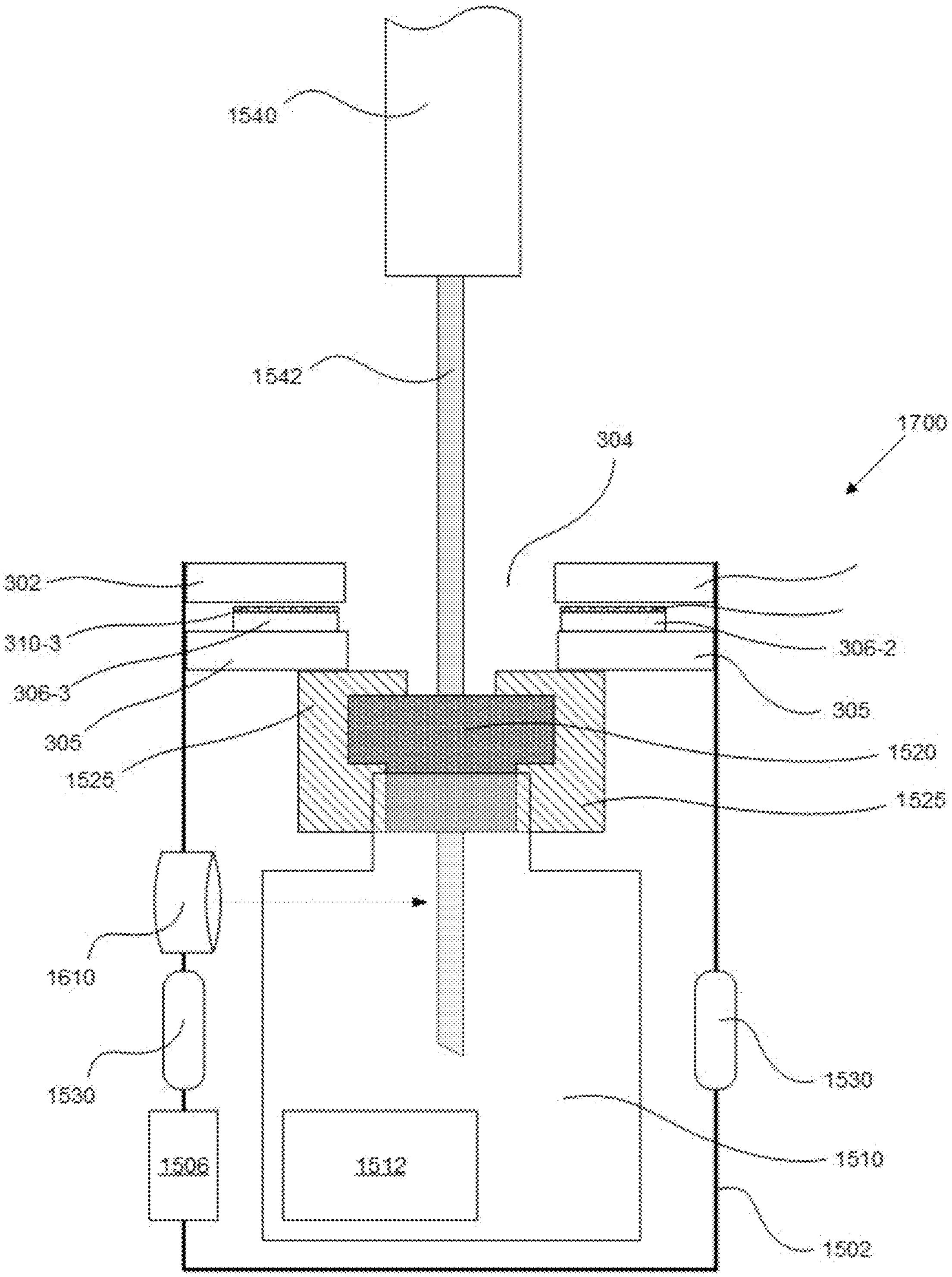
FIG. 22 schematically illustrates an example of a device comprising an injectable drug security system that includes one or more sensors.

FIG. 22 schematically illustrates an example of a device 1700 comprising an ISS 1502 and a drug vial 1510. The device 1700 may comprise one or more components as provided and described for the device 1500 and/or the device 1600. The ISS 1502 of the device 1700 may further comprise one or more sensors 1610. In some cases, the sensors 1610 may comprise a light source or may be operatively coupled to a light source of the ISS 1502. The sensors 1610 may be configured to provide feedback, such as, for example, (i) movement (e.g., insertion and/or extraction) of a drug loading device (e.g., a syringe) within the drug vial 1510, and/or (ii) an amount of the drug in the drug vial 1510. In some cases, the sensors 1610 may be configured to provide a feedback when two or more drug loading devices (e.g., two or more needles of two or more individual syringes) are detected inside the drug vial 1510. In some cases, the sensors 1610 may be configured to provide a feedback when the insertion and extraction of the drug loading device occurs more than once. The sensors 1610 may be useful in monitoring the drug withdrawing process and prevent (or reduce the chance of) drug diversion.

Referring to FIG. 22, the sensors 1610 may detect (i) when the drug loading device (e.g., the needle 1542 of the syringe 1540) is inserted into the drug vial 1510, and/or (ii) when the drug loading device is taken out of the drug vial 1510. In some cases, upon detecting when the drug loading device is inserted into the drug vial 1510, the sensors 1610 may trigger a timer (e.g., a digital timer operatively coupled to at least the reconstructable visual code 310), such that the visual code 310 automatically transforms into its reconstructed state and closes the opening 304 of the device. In such a case, the user (e.g., the practitioner) would be required to withdraw the drug from the drug vial 1510 within a predetermined time period. In some cases, providing such limited time window may help prevent or discourage the practitioner from diverting any excess drug for non-prescribed purposes (e.g., by swapping out the syringe 1542 with an additional syringe while keeping the needle 1542 coupled to the penetrable cover 1520, by removing the needle 1542 and inserting an additional needle of an additional syringe through the penetrable cover 1520, etc.).

Figure 23A:
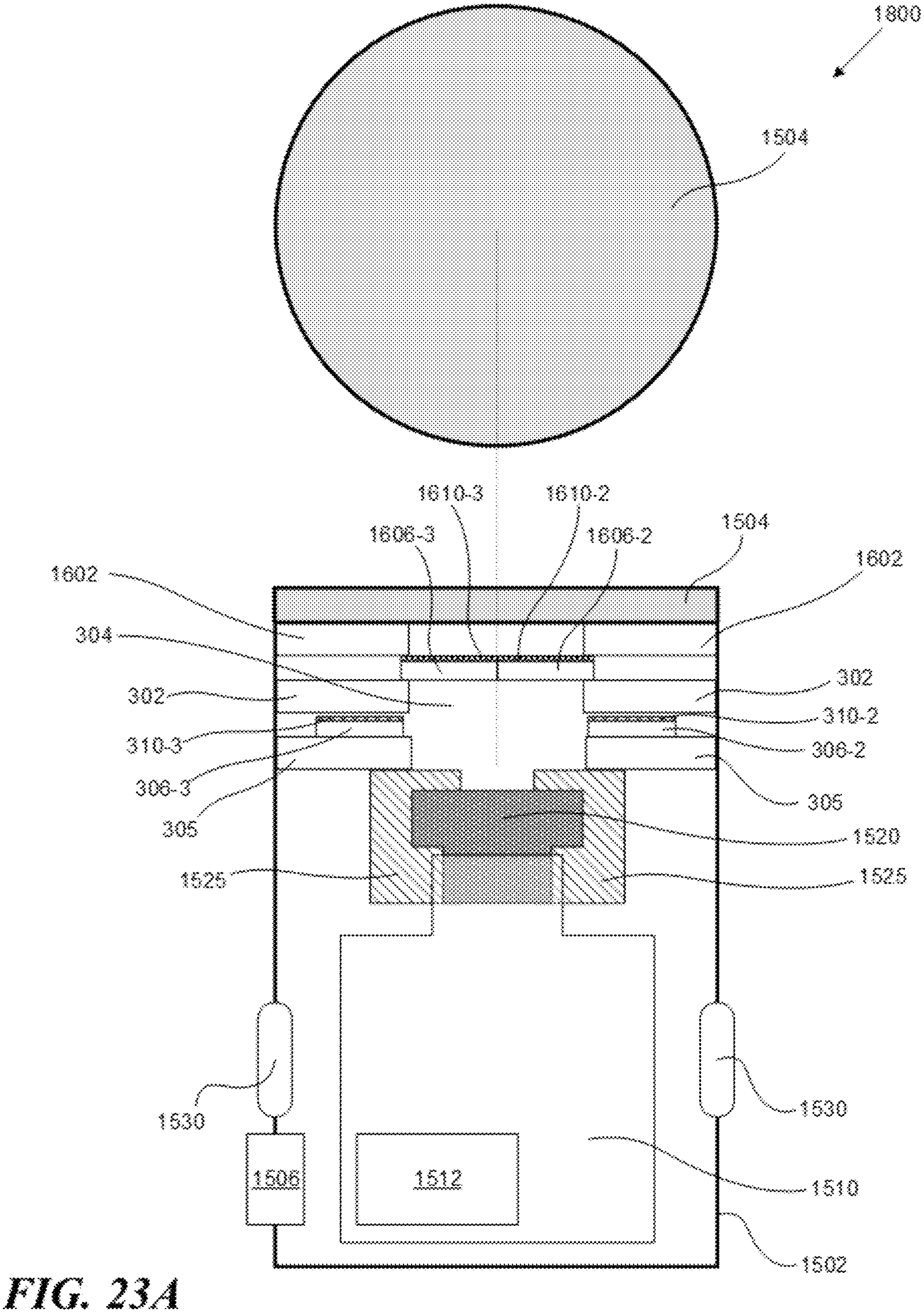
FIGS. 23A-23H schematically illustrate a different example of a device comprising an injectable drug security system.

FIGS. 23A-23H schematically illustrate an example of a device 1800 comprising an ISS 1502 and a drug vial 1510. Prior to use, the drug vial 1510 may be installed and sealed inside the ISS 1502. FIG. 23A schematically illustrates a top view (top) and a cross-sectional view (bottom) of the device 1800. The ISS 1502 of the device 1800 may or may not have a removable cap 1504. The ISS 1502 may comprise a visual code 310 with multiple individual segments, 310-1, 310-2, and 310-3. The individual segments 310-1, 310-2, and 310-3 of the visual code 310 may be reconstructable (e.g., into a functional visual code) and/or deconstructable (e.g., into a nonfunctional visual code). The individual segments 310-1, 310-2, and 310-3 of the visual code 310 may be disposed on or adjacent to the leaflets 306-1, 306-2, and 306-3 of the ISS 1502, respectively. The leaflets 306-1, 306-2, and 306-3 (and thus the individual segments 310-1, 310-2, and 310-3) may be movable relative to an opening 304 of the ISS 1502, thereby to open and/or seal the opening 304. Prior to use of the device 1800, the visual code 310 may be in a deconstructed state (or form), thereby presenting a nonfunctional visual code. In some cases, the deconstructed individual segments 310-1, 310-2, and 310-3 of the visual code 310 may be "hidden" by a cover 302 comprising the opening 304. In some cases, the ISS 1502 may comprise a plate 305 (e.g., a ring-shaped plate) that has the opening 304, wherein the leaflets 306-1, 306-2, and 306-3 (and thus the individual segments 310-1, 310-2, and 310-3) may be movable relative to the plate 305.

Additionally, referring to FIG. 23A, the ISS 1502 of the device 1800 may comprise an additional visual code 1610 with multiple individual segments, 1610-1, 1610-2, and 1610-3. The individual segments 1610-1, 1610-2, and 1610-3 of the additional visual code 1610 may be reconstructable (e.g., into a functional visual code) and/or deconstructable (e.g., into a nonfunctional visual code). The individual segments 1610-1, 1610-2, and 1610-3 of the additional visual code 1610 may be disposed on or adjacent to additional leaflets 1606-1, 1606-2, and 1606-3 of the ISS 1502, respectively. The additional leaflets 1606-1, 1606-2, and 1606-3 (and thus the individual segments 1610-1, 1610-2, and 1610-3) may be movable relative to the opening 304 of the ISS 1502, thereby to open and/or seal the opening 304. Prior to use of the device 1800, the additional visual code 1610 may be in a reconstructed state, thereby presenting a functional visual code. The additional visual code 1610 in the reconstructed state may seal the opening 304 of the ISS 1502, thereby to prevent any access through the opening 304 and into the drug vial 1510 in the system 1800. When the additional visual code 1610 is deconstructed, the deconstructed individual segments 1610-1, 1610-2, and 1610-3 may be disposed under an additional cover 1602 comprising the opening 304.

Referring to FIG. 23A, the drug vial 1510 of the device 1800 may comprise a penetrable cover 1520, an impenetrable cover 1525, and/or the label 1512, as provided for the device 1500. The ISS 1502 of the device 1800 may comprise a label, as provided for the device 1500. In some cases, the ISS 1502 of the device 1800 may comprise one or more switches 1530. In use, upon engaging (e.g., pressing) the switches 1530, the switches 1530 may be capable of deconstructing the additional visual code 1610 into individual segments 1610-1, 1610-2, and 1610-3 that are separated, thereby to provide access through the opening 304 of the ISS and towards the penetrable cover 1520 of the drug vial 1510.

Figure 23B:
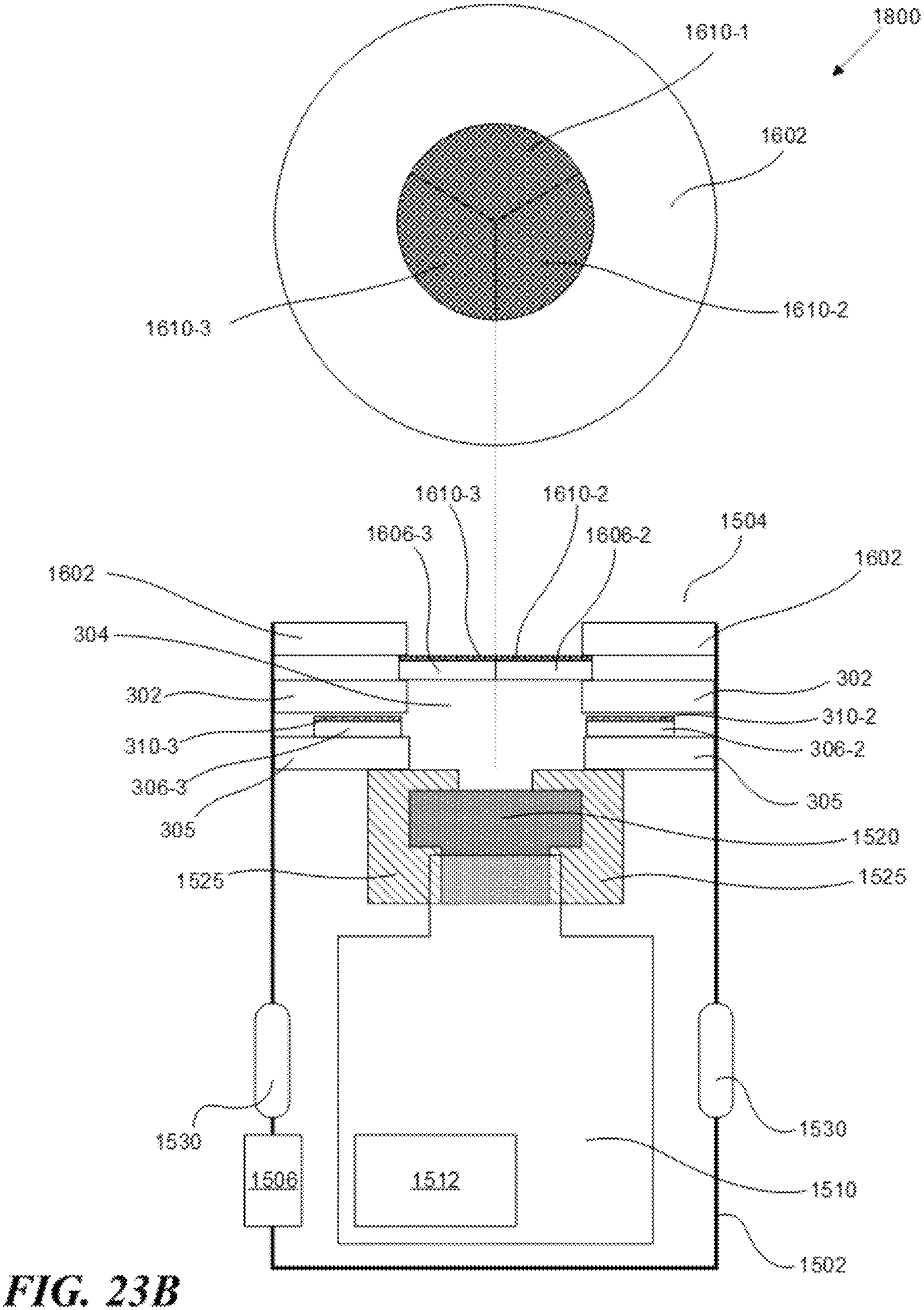

Referring to FIG. 23B, the top view (top of the figure) of the device 1800 schematically illustrates that, upon removal of the removable cap 1504 from the ISS 1502, the additional visual code 1610 in its reconstructed form is visible. In the reconstructed form, the segments 1610-1, 1610-2, and 1610-3 of the additional visual code 1610 block the opening 304, thereby preventing access to the drug vial 1510 inside the ISS 1502. The practitioner may scan the reconstructed and functional visual code 1610 to indicate (e.g., to eMAR and/or ADM) initiation of the drug withdrawing process.

Figure 23C:
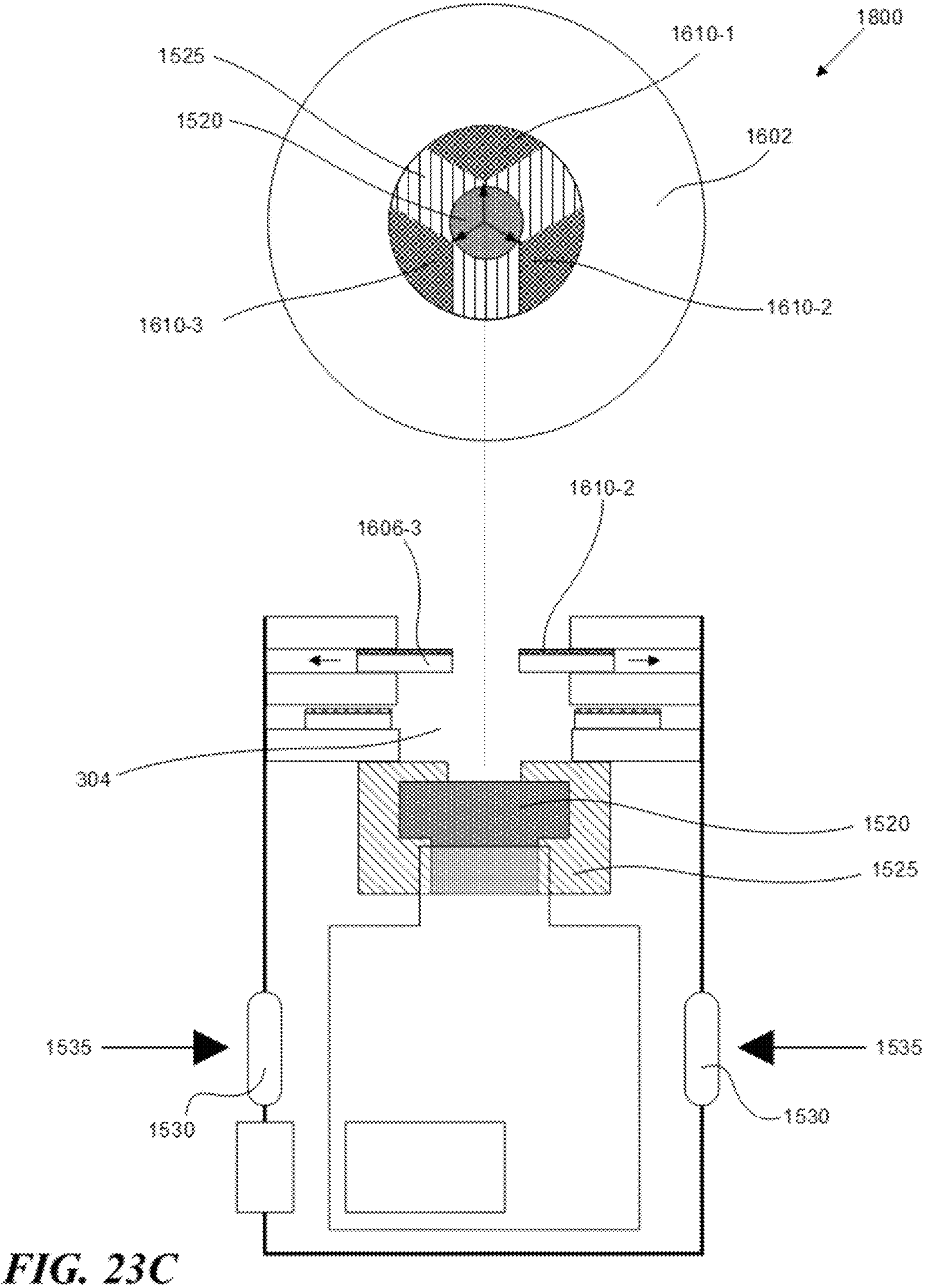

Referring to FIG. 23C, the ISS 1502 of the system 1800 may be activatable to trigger deconstruction (e.g., separation) of the additional visual code 1610, thus transforming the additional visual code 1610 from its reconstructed state to its deconstructed state. In some cases, the practitioner (e.g., a nurse) may initiate drug loading process by engaging 1535 (e.g., pressing) the switches 1530 of the ISS 1502. The switches 1530 may be operatively and/or mechanically coupled to the individual segments 1610-1, 1610-2, and 1610-3 of the additional visual code 1610 and the individual leaflets 1606-1, 1606-2, and 1606-3, such that upon the engagement 1535 of the switches 1530, the switches 1530 trigger the additional visual code 1610 to deconstruct and provide access to the drug vial 1510 through the opening 304. In an example, upon creating the opening 304, a top surface of the penetrable cover 1520 and/or the impenetrable cover 1525 of the drug vial 1510 may be visible.

In some cases, the switches 1530 may require a continual engagement (e.g., being pressed continually) for (i) the additional visual code 1610 to remain in its deconstructed state, and (ii) the visual code 310 to remain in its deconstructed state. In some cases, a single and non-continual engagement (e.g., press and release) of the switches 1530 may be sufficient to (i) direct the visual code 310 to deconstruct and remain in its deconstructed state while (ii) the visual code 310 also remains in its deconstructed state.

Figure 23D:
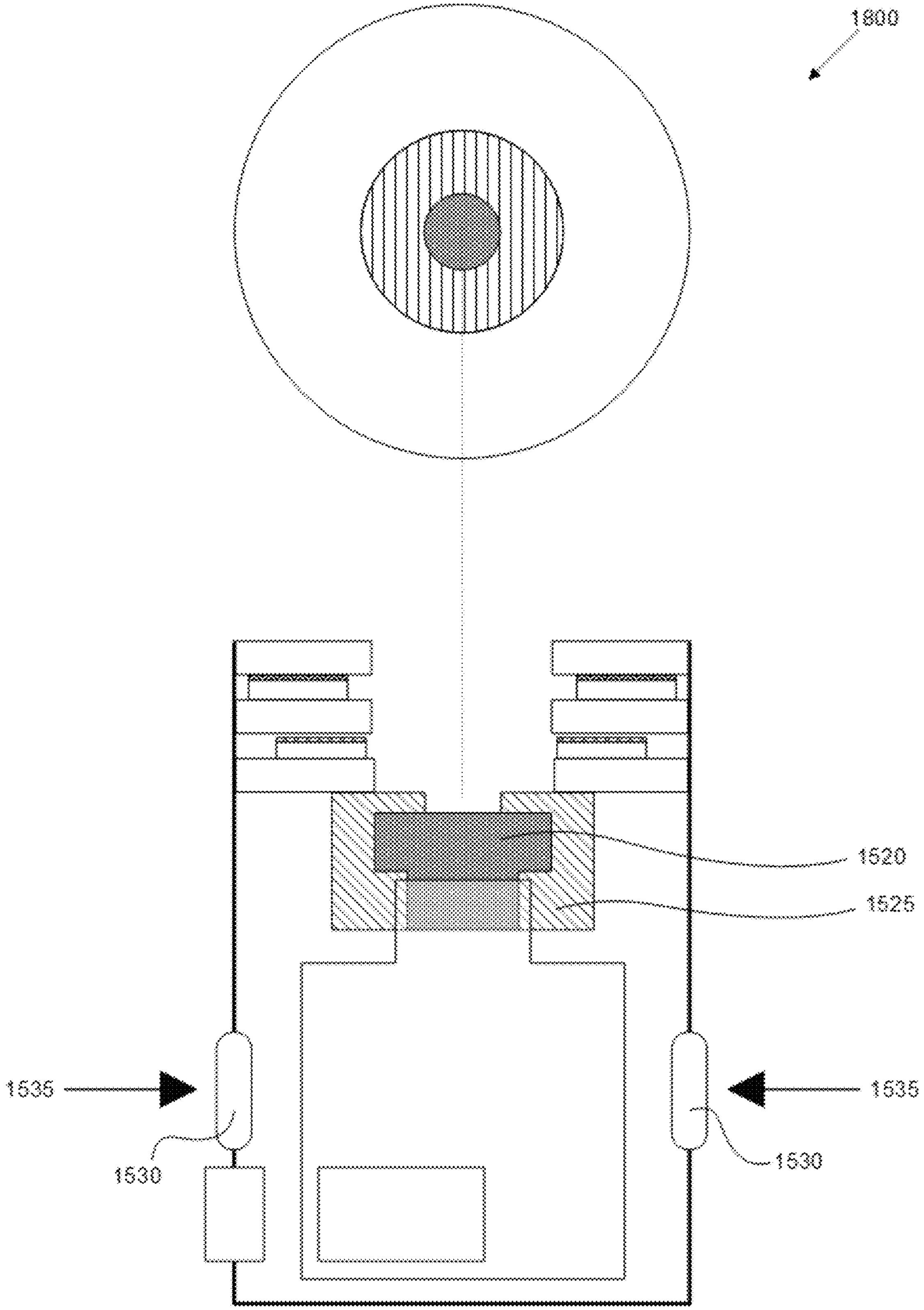

Referring to FIG. 23D, the individual segments 1610-1, 1610-2, and 1610-3 of the additional visual code 1610 may be deconstructed to create the opening 304 of the ISS 1502. In some cases, the switches 1530 may require a continual engagement 1531 for the additional visual code 1610 and the visual code 310 to remain in their respective deconstructed states. In an example, the practitioner may be required to keep pressing 1535 on the switches 1530 to keep the additional visual code 1610 and the visual code 310 in their respective deconstructed states.

Figure 23E:
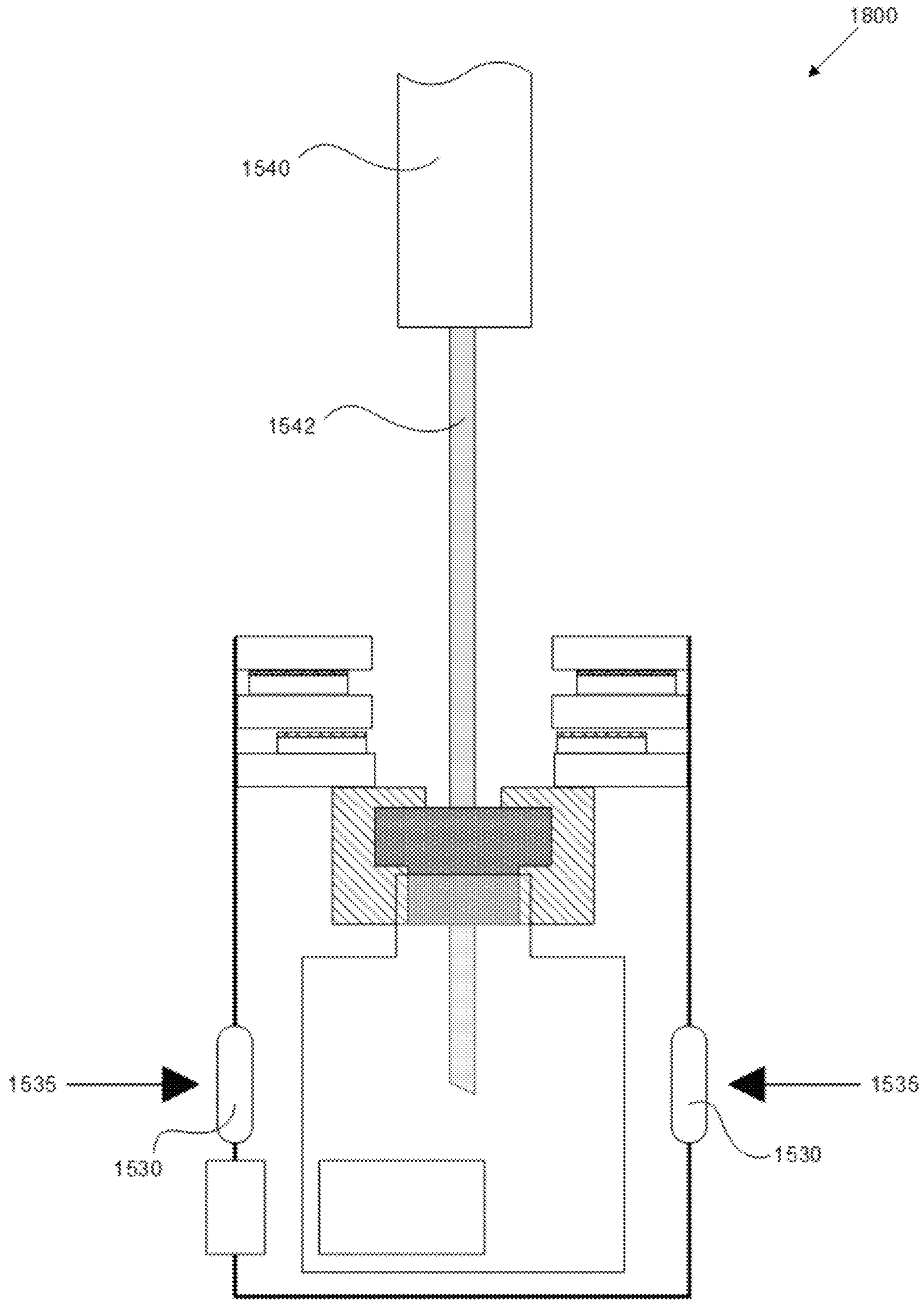

Referring to FIG. 23E, the practitioner may insert a drug loading device (e.g., a needle 1542 of a syringe 1540) through the opening 304 of the ISS 1502 and towards the drug vial 1510. The switches 1530 may need to be engaged 1535 during this process. The needle 1542 may penetrate through the penetrable cover 1520 of the drug vial 1510 to allow the practitioner to withdraw a dose (e.g., a prescribed dose) of the drug for a subject (e.g., a patient).

Figure 23F:
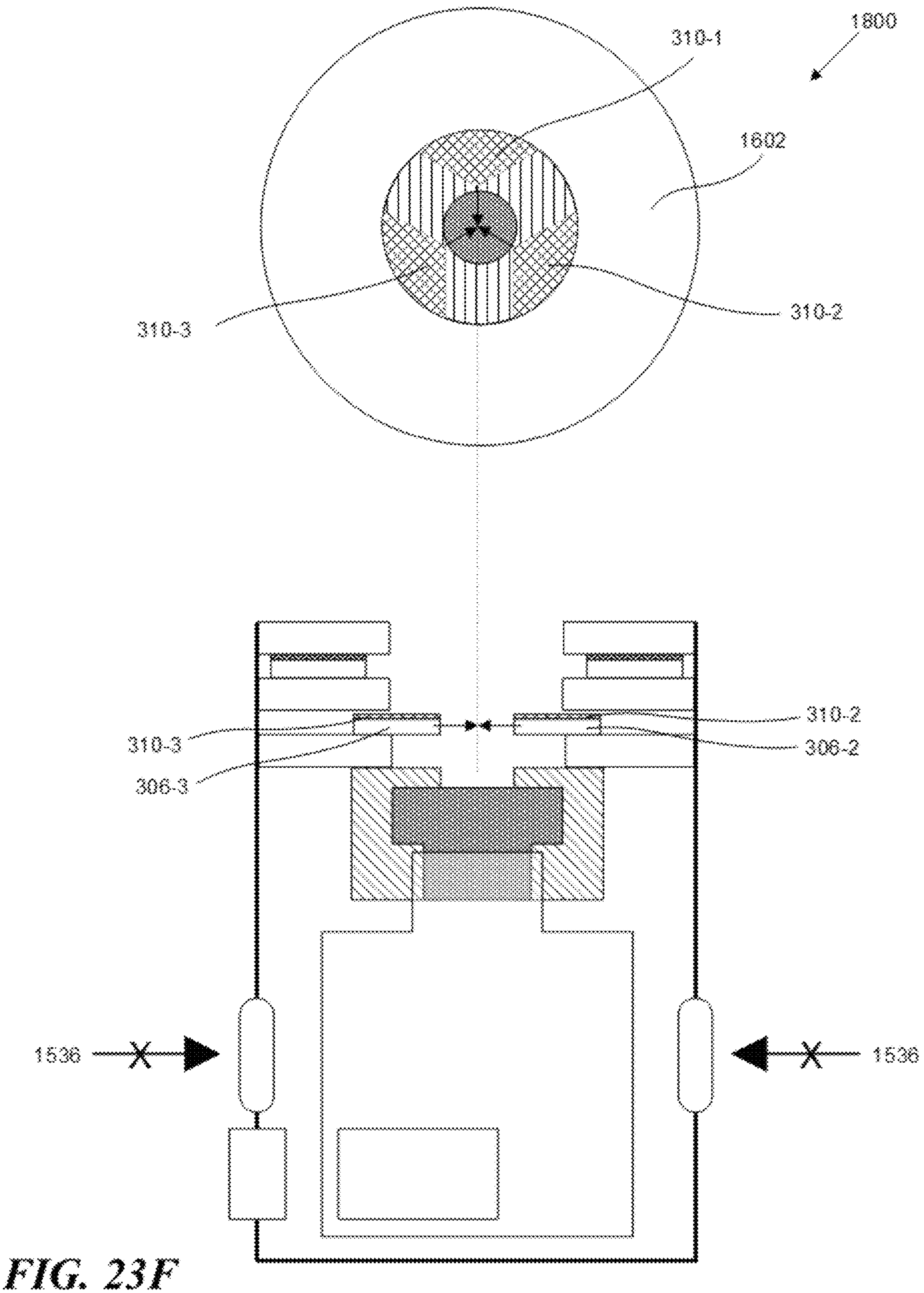

Referring to FIG. 23F, subsequent to the withdrawal of the drug from the drug vial 1510 and the removal of the drug loading device from the drug vial 1510, the practitioner may stop 1536 engaging the switches 1530 of the ISS 1502. Upon stopping 1536 the engagement of the switches 1530, the visual code 310 may be triggered to transform from its deconstructed state to its reconstructed state, thereby to close (and seal) the opening 304 of the ISS 1502.

Figure 23G:
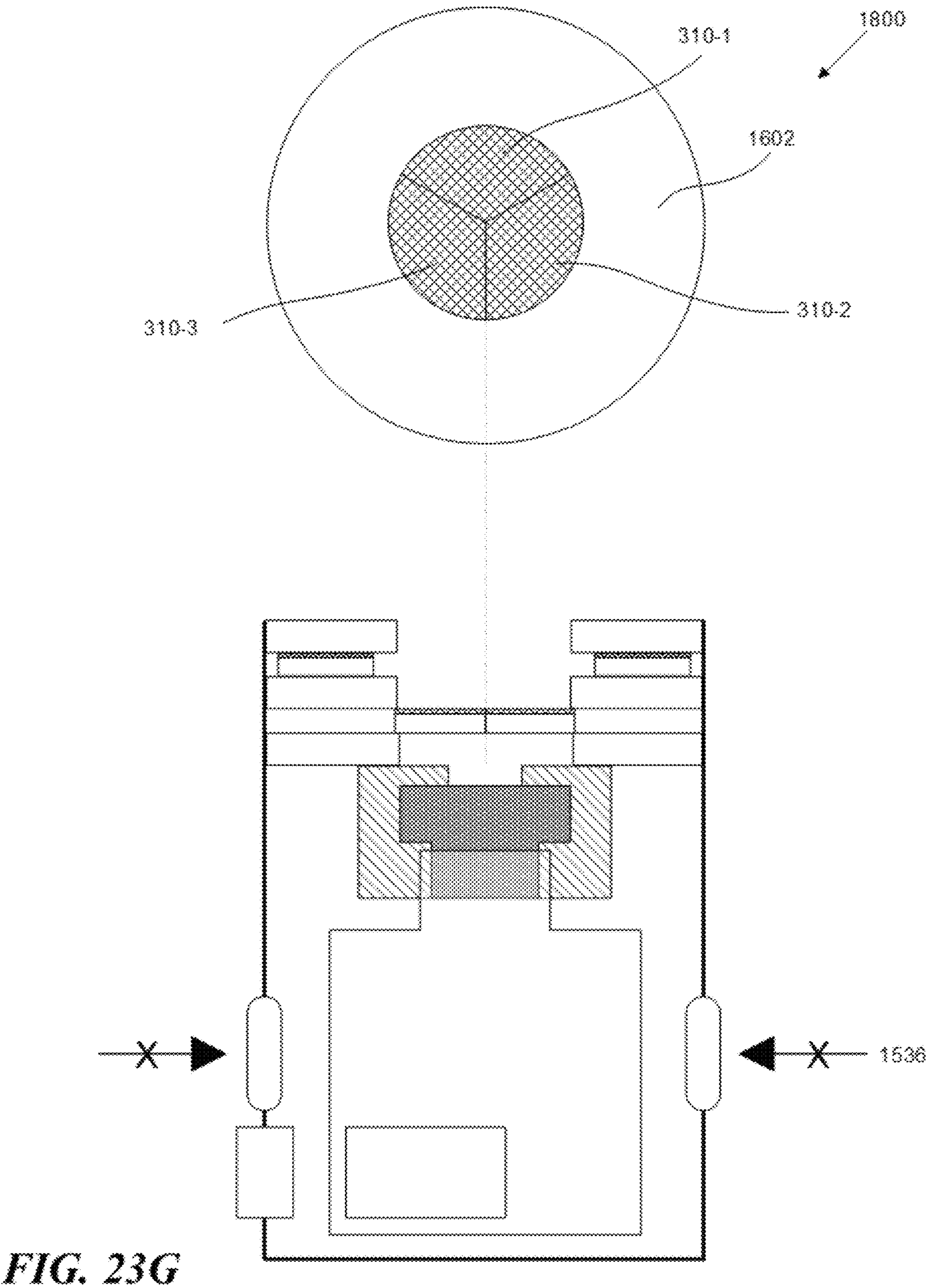
Figure 23H:
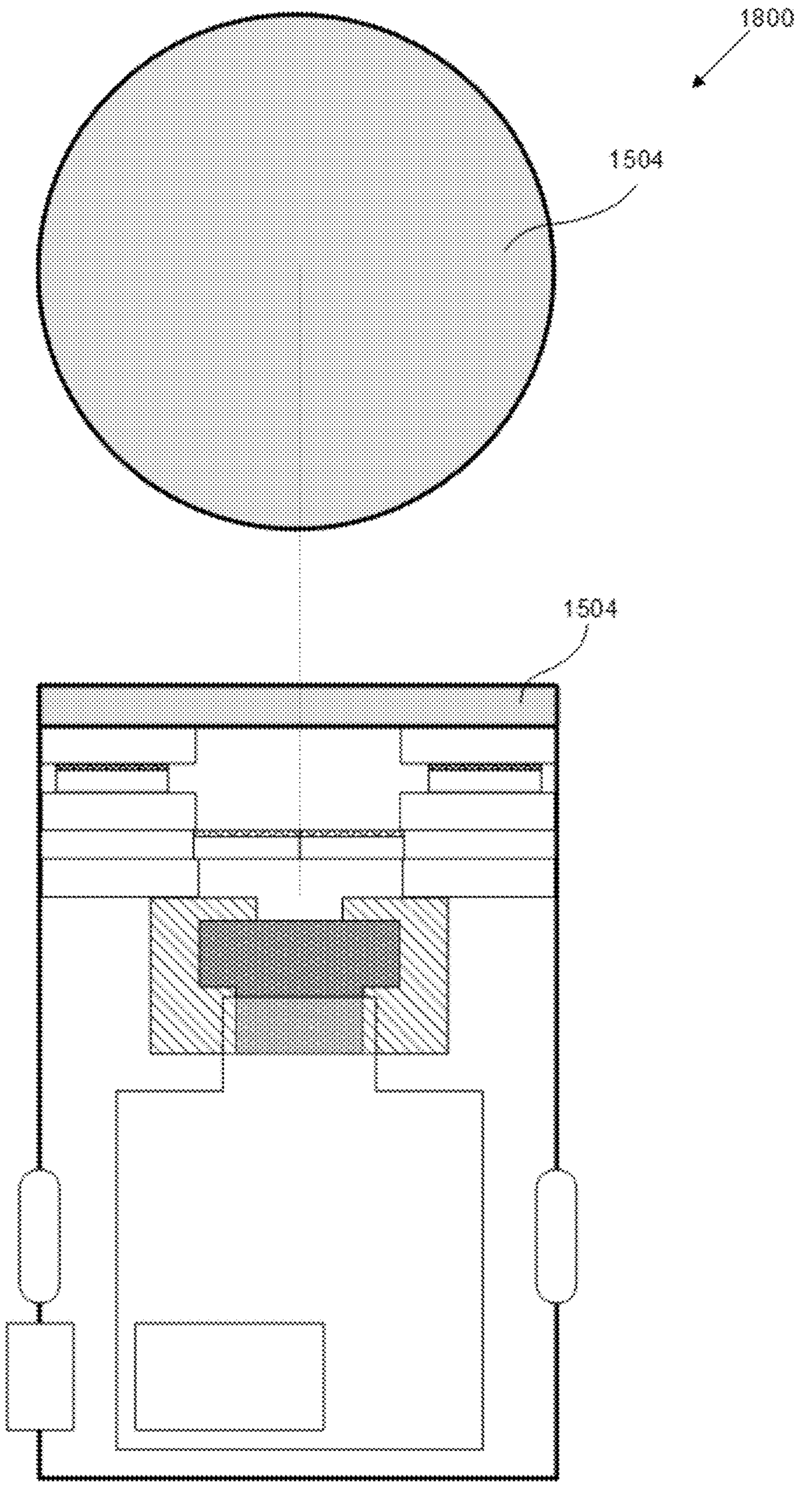

Referring to FIG. 23G, the reconstructed visual code 310 may seal the opening 304 of the ISS 1502 and prevent any further access to the drug vial 1510 inside the ISS 1502. The reconstructed visual code 310 may present a functional visual code that can be scanned by the practitioner to indicate (or record) that the drug withdrawal process from the ISS 1502 is completed. In some cases, the functional visual code of the visual code 310 may be the same or different than the functional visual code of the additional visual code 1610. In an example, the functional visual code of the visual code 310 may be different than the functional visual code of the additional visual code 1610, such that closure of the ISS 1502 by reconstruction of the visual code 310 is necessary for the practitioner to indicate completion of the drug withdrawing process. In some cases, the switches 1530 may be configured such that an additional engagement of the switches 1530 may not be capable of triggering any more deconstruction of the visual code 310, thereby preventing a possible diversion of the drug remaining inside the drug vial 1510.

Referring to FIG. 2311, subsequent to scanning the reconstructed visual code 310 of the ISS 1502, the practitioner may put the removable cap 1504 on the ISS 1502. The practitioner may place the used device 1800 to a pre-designated place, such as the ADM.

In some cases, such as for one or more devices provided in FIGS. 14, 15, and 17-23, a contact force between edges of the segments of the visual code during reconstruction of the visual code may be sufficient to damage or deform any needle that is in the way. In some cases, the segments of the visual code 310 may be on different horizontal planes, such that when portions (or entirety) of the segments overlap with one another to reconstruct the visual code, the overlapping movement is sufficient to damage or deform the needle that is in the way. This may be advantageous in cases when a user (e.g., a practitioner) attempts to divert any excess drug for non-prescribed purposes (e.g., by swapping out the syringe 1542 with an additional syringe while keeping the needle 1542 coupled to the penetrable cover 1520, by removing the needle 1542 and inserting an additional needle of an additional syringe through the penetrable cover 1520, etc.). Such system may prevent or discourage the user form drug diversion.

One or more features of the different examples of the ISS, as provided in FIGS. 14, 15, and 17-23, may be modified and/or combined to generate a new ISS.

The ISS and/or medication vial as described herein can be returned (e.g., for medication wasting and/or tracking) by medication management systems and methods (e.g., institutional medication management and/or retail medication management), for example as described in International Patent Application No. PCT/US2020/026434, which is entirely incorporated herein by reference.

Blockchain

The database of the present disclosure to store information (e.g., time, date, location, and/or identity of a practitioner responsible for retrieving medication from an ADM, transporting the medication to the patient, administering of the medication, and the return/waste of unused medication) for closed loop tracking of medications (e.g., prescription medications, non-prescription medications) can comprise or utilize a block chain (or "blockchain") database. The term "blockchain," as used herein, can refer to a suite of distributed ledger technologies that can be programmed to record and track anything of value (e.g., financial transactions, land titles, medical records, etc.). The blockchain can be a peer-to-peer (P2P) decentralized open ledger (or computer architecture thereof) that relies on a distributed network shared among its users. Each of the users can hold a public ledger of every transaction carried out using the architecture, and each public ledger can be checked against one another to ensure accuracy and accountability. Thus, a blockchain-based database (or blockchain database) can be used in place of a physical, centralized database, to record and handle one or more transactions of digital objects (e.g., data). Maintenance of the blockchain can be performed by a P2P network of communicating nodes (or computer systems) that are running a software. The software can be programmed with a specific application (e.g., cryptocurrency software, financial services software, supply chain software, smart contracts software, etc.). Transactions such as "party X transfers an object (e.g., a digital object, such as, for example, cryptocurrency, prescriptions, etc.) Y to party Z" can be broadcasted to the P2P network (e.g., by using one or more software applications). The network nodes can validate the transactions, add them to their copy of the ledger, and then broadcast these ledger additions to other nodes. Thus, the blockchain can be a distributed database, wherein, in order to independently verify the chain of ownership or validity of any and every transferred object, each network node stores its own copy of the blockchain. In some cases, a new group of transactions (i.e., a block) is created (e.g., at a predetermined frequency, such as, for example, 6 times per hour), added to the blockchain, and quickly published to all nodes in the P2P network. Thus, each block can contain a cryptographic hash of the previous block to keep the previous block "accountable."

Tampering with transactions on the blockchain can become exponentially harder as time progresses, and can require extreme quantities of computing power to attempt, let alone succeed. In some cases, data stored in the blockchain can be included in integrity checks, in which transactions are assembled into a transaction merkle tree and hashed to produce a block header. Any alterations to transactions in a blockchain database can become apparent as the block would be invalid when indexed. As such, the blockchain's consensus mechanism can allow a data's hash to be published to the blockchain as irrefutable proof that the data existed at a given time in the past. Both the timestamp and the hash may be unalterable.

The ISS as disclosed herein can have a code or an identifier (e.g., an identification device or a MRC). Scanning of such code or identifier may be updated to the blockchain database for closed loop tracking of medications, e.g., to track (i) supply, retrieval, transport, use, and return or waste of the contents (e.g. medications), (ii) personal linking (e.g., recording identification of practitioner(s) responsible for retrieving, transporting, and administering a drug to the patient), (iii) user or patient linking, (iv) pharmacy tracking, and/or (v) destroying the carrier containing the contents), etc. In an example, the blockchain database may provide a record (e.g., a permanent or irrefutable record) of each transaction as the valued contents (e.g., medications) are moved along the supply chain, to or within a hospital (e.g., in an ADM), to a carrier, to a user (e.g., a patient), and back to a collection chain for discarding any unused medication. The blockchain database, as provided herein, can be an alterable and secured P2P network among patients, prescribers, pharmacy, government agencies (e.g., FDA, DEA, etc.), medication manufacturer, etc., to record and transfer data (e.g., medical history, prescription history, dates of prescription, retrieval, transport, administration, return, waste, etc.).

Computer System

Figure 24:
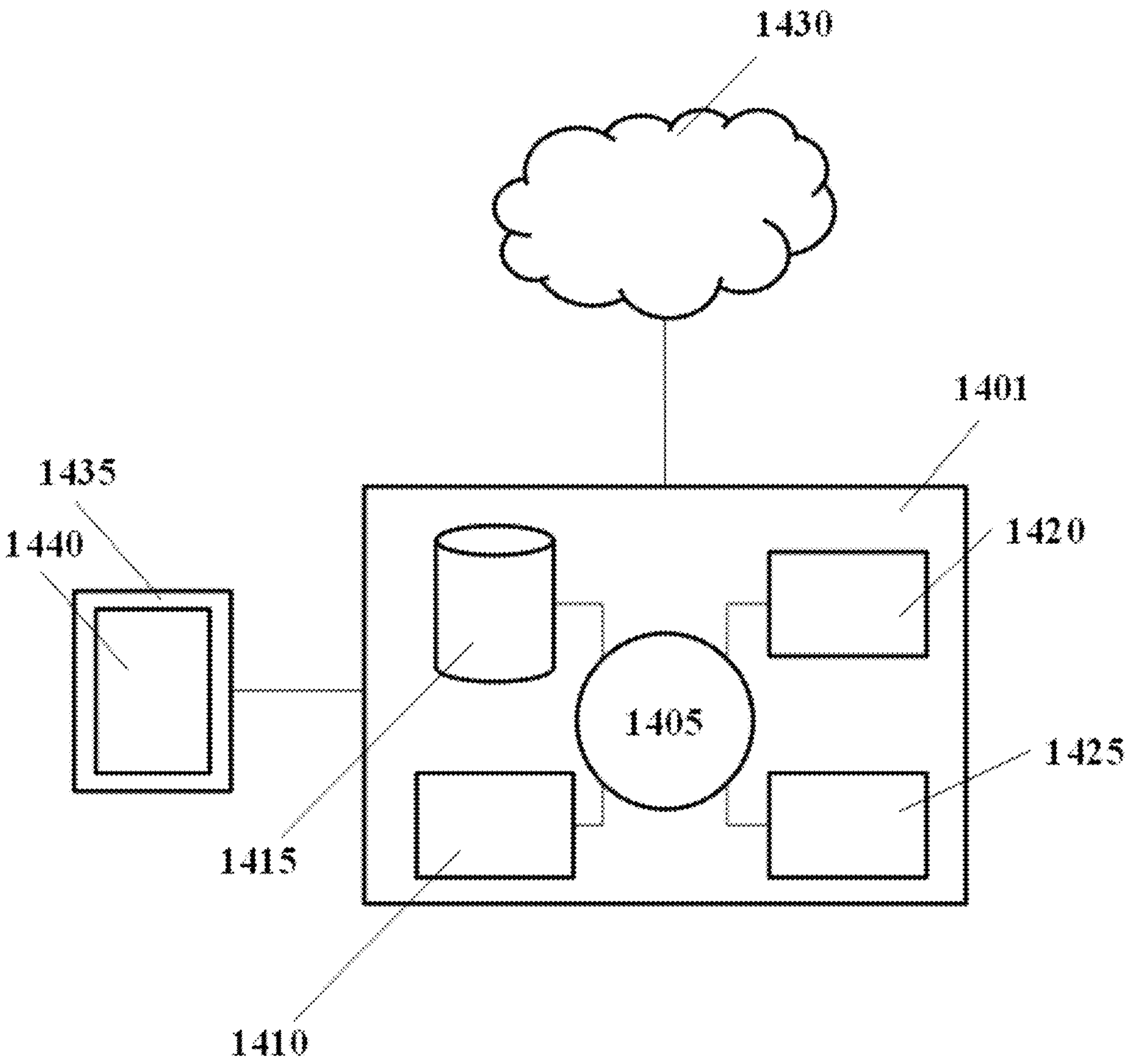
FIG. 24 shows a computer system that is programmed or otherwise configured to implement methods provided herein.

FIG. 24 shows a computer system 1401 that is programmed or otherwise configured to communicate with and regulate various aspects of operation or scanning of reconstructable visual codes. The computer system 1401 can communicate with the one or more articles (e.g., one or more devices comprising the reconstructable visual codes), or one or more visual scanning systems (e.g., sensors) that are configured to scan and analyze reconstructed visual codes. The computer system 1401 can be an electronic device of a user or a computer system that is remotely located with respect to the electronic device. The electronic device can be a mobile electronic device.

The computer system 1401 includes a central processing unit (CPU, also "processor" and "computer processor" herein) 1405, which can be a single core or multi core processor, or a plurality of processors for parallel processing. The computer system 1401 also includes memory or memory location 1410 (e.g., random-access memory, read-only memory, flash memory), electronic storage unit 1415 (e.g., hard disk), communication interface 1420 (e.g., network adapter) for communicating with one or more other systems, and peripheral devices 1425, such as cache, other memory, data storage and/or electronic display adapters. The memory 1410, storage unit 1415, interface 1420 and peripheral devices 1425 are in communication with the CPU 1405 through a communication bus (solid lines), such as a motherboard. The storage unit 1415 can be a data storage unit (or data repository) for storing data. The computer system 1401 can be operatively coupled to a computer network ("network") 1430 with the aid of the communication interface 1420. The network 1430 can be the Internet, an internet and/or extranet, or an intranet and/or extranet that is in communication with the Internet. The network 1430 in some cases is a telecommunication and/or data network. The network 1430 can include one or more computer servers, which can enable distributed computing, such as cloud computing. The network 1430, in some cases with the aid of the computer system 1401, can implement a peer-to-peer network, which may enable devices coupled to the computer system 1401 to behave as a client or a server.

The CPU 1405 can execute a sequence of machine-readable instructions, which can be embodied in a program or software. The instructions may be stored in a memory location, such as the memory 1410. The instructions can be directed to the CPU 1405, which can subsequently program or otherwise configure the CPU 1405 to implement methods of the present disclosure. Examples of operations performed by the CPU 1405 can include fetch, decode, execute, and writeback.

The CPU 1405 can be part of a circuit, such as an integrated circuit. One or more other components of the system 1401 can be included in the circuit. In some cases, the circuit is an application specific integrated circuit (ASIC).

The storage unit 1415 can store files, such as drivers, libraries and saved programs. The storage unit 1415 can store user data, e.g., user preferences and user programs. The computer system 1401 in some cases can include one or more additional data storage units that are external to the computer system 1401, such as located on a remote server that is in communication with the computer system 1401 through an intranet or the Internet.

The computer system 1401 can communicate with one or more remote computer systems through the network 1430. For instance, the computer system 1401 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1401 via the network 1430.

Methods as described herein can be implemented by way of machine (e.g., computer processor) executable code stored on an electronic storage location of the computer system 1401, such as, for example, on the memory 1410 or electronic storage unit 1415. The machine executable or machine readable code can be provided in the form of software. During use, the code can be executed by the processor 1405. In some cases, the code can be retrieved from the storage unit 1415 and stored on the memory 1410 for ready access by the processor 1405. In some situations, the electronic storage unit 1415 can be precluded, and machine-executable instructions are stored on memory 1410.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1401 can include or be in communication with an electronic display 1435 that comprises a user interface (UI) 1440 for providing, for example, (i) activating one or more actuation elements to reconstruct the reconstructable visual codes to generate unique visual codes, (ii) controlling the visual scanning systems (e.g., a handheld QR reader, a personal device comprising one or more cameras, etc.) to capture and analyze images/videos of such unique visual codes of the reconstructable visual codes, and (iii) storing the images/videos and their respective analysis over time. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1405. The algorithm can, for example, distinguish a reconstructed visual code from a non-reconstructed visual code.

EXAMPLES

Example 1: Injectable Drug Security System

An injectable drug security system (ISS) can be applied to a medication vial (e.g., comprising an injectable medication) while a removable cap (e.g., a snap cap) of the medication vial remains intact on the medication vial. Having the removable cap intact can ensure no tampering of the medication vial prior to the use of the ISS device.

In step 1, the ISS device snaps onto the medication vial with pre-manufactured snap cap on the medication vial still intact. The ISS device is configured to fit any size vial or bottle or other container of injectable or infusible medications (e.g., liquid, suspension, or other consistency). Examples of the vials can include, but are not limited to, small single-use vials and large multi-use large bottles of medications (e.g., propofol).

In step 2, the configuration of the ISS device is such that the snap cap in its original manufactured position is visible either directly or through a fenestration (e.g., a window) to the eye of a user (e.g., a nurse) or a medication retrieval and/or a recording device (e.g., institutional medication management and/or retail medication management system) in order to confirm, validate, and/or verify that the vial has not been tampered with prior to the insertion of the vial into the ISS device. When the vial has been determined to be tampered with prior to insertion of the vial into the ISS device (e.g., by detecting that the snap cap is partially or completely removed relative to the vial to expose at least a portion of the rubber stopper underneath), the vial may not be accepted into the ISS device. As such, only an unadulterated/untampered vial may be received by the ISS device.

In step 3, after the ISS device is loaded with the vial, the ISS device lifts cap off the injectable vial through mechanical means. In some cases, the ISS device comprises one or more actuation mechanisms to remove the cap from the vial. In an example, the cap can be lifted upward, downward, sideways, halfway, etc. The removed snap cap can be secured within the ISS device to preserve it for later repositioning. Alternatively, the removed snap cap may not and need not be secured within the ISS device. A triggering event to lift the cap may be (1) pressing of the side panels and/or (2) twisting of the ISS device onto the vial.

Once the vial is loaded into the ISS device, the vial cannot be removed from the ISS device for any purpose or by any means, in order to (1) preserve the integrity of the connection between the vial and the ISS connection and (2) reduce or prevent changes for tampering with the vial (e.g., removal of contents and/or substitution of a counterfeit substance into the vial for diversion or contamination purposes).

In step 4, once the cap is lifted by paddles (or switches) being depressed, an alcohol swab of the ISS device may be used by the end user to swab the top of the injectable vial. Alternatively, the alcohol swab of the ISS device may be operatively coupled to one or more actuation mechanisms, such that the alcohol swab is automatically moved (either on the side, horizontally, vertically etc) to clean the top of the injectable vial.

In step 5, after the cap is lifted and the rubber stopper swabbed with alcohol, the end user can insert the needle of a syringe into the rubber stopper of the vial to withdraw a desired volume of the medications within the vial. In some cases, the cap may remain in a lifted position until the withdrawal of the medications and the needle of the syringe is withdrawn from the vial.

In step 6, after completing the withdrawal of both the medications and the needle of the syringe, the medication vial is inverted and placed on a flat surface. The side paddles are released and an aperture of the ISS device is closed, and a lid of the vial is placed back on the ISS. Insertion of the lid back on the ISS may be via a perpendicular movement, vertical movement, rotational movement, etc. The visualization of the installed cap may be accessible to the eye or to a medication retrieval and/or a recording device (e.g., institutional medication management and/or retail medication management system) to document the integrity of the use of the medication vial and the purity of its medication contents.

Example 2: Propofol Vial

Medication management systems (e.g., institutional medication management and/or retail medication management) can be used for healthcare provides to return and/or waste medications and medication vials, regardless of size or type of the medication vials. As such, the medication management system can secure any excess or leftover medication contents of the vial and prevent unauthorized secondary and tertiary needle insertions into the vial for diversion or other tampering purposes.

In some cases, a well-intentioned, responsible nurse may need to access the contents of an injectable vial (e.g., a previously used injectable vial), but would be prevented from doing so after wasting the vial into the medication management system. For example, a medical vial such as a propofol vial may be designed for multiple doses or uses that require multiple insertion of the syringe needle into the vial. In such a case, a modified ISS device (i.e., ISS-Multi) may be applied to the medication vial to control multiple access and uses of the medication vial.

Once a multi-use medication vial is opened (e.g., a snap cap of the medication vial is removed), the ISS-Multi device can be placed on the neck of the multi-use vial (e.g., similar to the ISS configuration described in FIGS. 14, 15, and 17-23). Insertion of a needle of a syringe into the medication vial would trigger a unique code, as described herein. For one or more subsequent (after the first) insertion of a needle into that vial, another unique code can be generated to document electronically the subsequent vial insertion(s). The ISS-Multi can keep track of the needle insertion(s) (e.g., using metering, multiple insertion holes similar to those on the top of a Baby Powder bottle top, etc.). In some cases, each time a needle goes in, additional information (e.g., "who went in", "for what patient", "when was it inserted") may be obtained or captured (e.g., verbally or electronically by the nurse) as part of the electronic medication administration record (eMAR) component of the institution's electronic medical record (EMR) system. This can help keep track of all of the uses of the medication vial, e.g., for which patients, and by which caregivers.

When a nurse determines that the medication vial should no longer be accessed (e.g., due to a lack of a full dose remaining in the vial, past expiration, etc.), the ISS-Multi device can be used to lock (e.g., permanently lock) the medication vial. This can be done mechanically, breaking a seal, electrically, chemically, etc.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An injectable medication security device, comprising:

a recess provided on a first portion of the device, wherein the recess is configured to receive and couple to a neck portion of a vial containing the injectable medication;

an opening provided on a second portion of the device, wherein the opening permits access to a penetrable cover located near the neck portion of the vial;

at least one aperture located at the opening and configured to control access to the opening; and a depressible switch operatively coupled to the at least one aperture, wherein the depressible switch is configured to (1) cause the at least one aperture to open and provide access to the opening when the depressible switch is depressed, thereby permitting the medication to be drawn from the vial, and (2) cause the at least one aperture to lock and close the opening when the depressible switch is released, thereby preventing further access to any residual medication within the vial.

2. The injectable medication security device of claim 1, wherein the at least one aperture comprises a scannable visual code that is revealed when the depressible switch is released.

3. The injectable medication security device of claim 1, wherein the at least one aperture is closed prior to withdrawing the medication from the vial; and wherein the depressible switch is configured to (1) cause the at least one aperture to open and provide access to the opening when the depressible switch is depressed, and (2) cause the at least one aperture to lock and close the opening when the depressible switch is released.

4. The injectable medication security device of claim 2, wherein the scannable visual code is segmented into a plurality of partial codes.

5. The injectable medication security device of claim 4, wherein the plurality of partial codes are disposed on a plurality of movable segments of the at least one aperture.

6. The injectable medication security device of claim 5, wherein the plurality of partial codes are reconstructed to form the scannable visual code when the at least one aperture is closed.

7. The injectable medication security device of claim 1, further comprising a cap removal device configured to remove a cap of the vial to permit access to the penetrable cover of the vial.

8. The injectable medication security device of claim 1, further comprising a removable safety device configured to prevent movement of the depressible switch.

9. The injectable medication security device of claim 1, further comprising a sensor configured to detect a frequency of insertion of a needle (1) through the penetrable cover or (2) into the vial.

10. A method of monitoring a use of a vial containing an injectable medication, comprising:

(a) providing an injectable medication security device, comprising:

a recess provided on a first portion of the device, wherein the recess is configured to receive and couple to a neck portion of the vial;

an opening provided on a second portion of the device, wherein the opening permits access to a penetrable cover located near the neck portion of the vial;

at least one aperture located at the opening and configured to control access to the opening; and a depressible switch operatively coupled to the at least one aperture, wherein the depressible switch is configured to (1) cause the at least one aperture to open and provide access to the opening when the depressible switch is depressed, thereby permitting the medication to be drawn from the vial, and (2) cause the at least one aperture to lock and close the opening when the depressible switch is released, thereby preventing further access to any residual medication within the vial;

(b) coupling the recess of the injectable medication security device to the neck portion of the vial;

(c) depressing the depressible switch to direct the at least one aperture to open; and (d) releasing the depressible switch to direct the at least one aperture to close.

11. The method of claim 10, wherein the at least one aperture comprises a scannable visual code that is revealed when the depressible switch is released, and wherein the method further comprises, subsequent to (d), scanning the scannable visual code.

12. The method of claim 10, wherein the at least one aperture is closed prior to withdrawing the medication from the vial; and wherein the depressible switch is configured to (1) cause the at least one aperture to open and provide access to the opening when the depressible switch is depressed, and (2) cause the at least one aperture to lock and close the opening when the depressible switch is released.

13. The method of claim 11, wherein the scannable visual code is segmented into a plurality of partial codes.

14. The method of claim 13, wherein the plurality of partial codes are disposed on a plurality of movable segments of the at least one aperture.

15. The method of claim 14, further comprising reconstructing the plurality of partial codes into the scannable visual code.

16. The method of claim 10, further comprising removing, with aid of a cap removal device, a cap of the vial to permit access to the penetrable cover of the vial.

17. The method of claim 10, further comprising removing a removable safety device, wherein the removable safety device is configured to prevent movement of the depressible switch when coupled to the injectable medication security device.

18. The method of claim 10, further comprising detecting, with aid of a sensor, a frequency of insertion of a needle (1) through the penetrable cover or (2) into the vial.

* * * * *